US007890215B2

(12) United States Patent
Duncan

(10) Patent No.: US 7,890,215 B2
(45) Date of Patent: Feb. 15, 2011

(54) OPTIMIZED CONTROL SYSTEM FOR COOLING SYSTEMS

(76) Inventor: Scot M. Duncan, 21382 Countryside, Lake Forest, CA (US) 92630

( * ) Notice: Subject to any disclaimer, the term of this patent is extended or adjusted under 35 U.S.C. 154(b) by 375 days.

(21) Appl. No.: 11/959,294

(22) Filed: Dec. 18, 2007

(65) Prior Publication Data

US 2009/0171512 A1    Jul. 2, 2009

Related U.S. Application Data

(60) Provisional application No. 60/876,754, filed on Dec. 22, 2006.

(51) Int. Cl.
| G05B 21/00 | (2006.01) |
| G05B 13/00 | (2006.01) |
| G05B 15/00 | (2006.01) |
| G01M 1/38 | (2006.01) |
| G05D 23/00 | (2006.01) |
| F25D 17/00 | (2006.01) |

(52) U.S. Cl. ........................................ 700/276; 62/179
(58) Field of Classification Search ................ 700/276, 700/277; 165/201, 205, 208, 209, 212, 214; 236/51; 62/132, 177, 179
See application file for complete search history.

(56) References Cited

U.S. PATENT DOCUMENTS

| 3,625,022 A | | 12/1971 | Johnson |
| 4,270,363 A | * | 6/1981 | Maring et al. ................. 62/179 |
| 4,407,134 A | | 10/1983 | Snaper |
| 4,642,992 A | * | 2/1987 | Julovich ....................... 60/661 |
| 5,142,396 A | * | 8/1992 | Divjak et al. ................. 398/108 |
| 5,390,206 A | * | 2/1995 | Rein et al. ................... 375/130 |
| 5,435,147 A | | 7/1995 | Mochizuki et al. |

(Continued)

FOREIGN PATENT DOCUMENTS

EP    1 335 166 A2    6/2003

(Continued)

OTHER PUBLICATIONS

International Search Report for related patent PCT/US08/75491 performed by International Searching Authority/US on Nov. 19, 2008.

(Continued)

*Primary Examiner*—Crystal J Barnes-Bullock

(57) ABSTRACT

A cooling system for providing conditioned air to a facility includes a chiller or other cooling subsystem, a cooling tower subsystem and one or more air handling units or process cooling units. The cooling subsystem may advantageously include one or more chillers (e.g., variable speed chillers, constant speed chillers, absorption chillers, etc.) and chilled fluid pumps. The cooling tower subsystem includes one or more cooling tower units and condenser fluid pumps. In some implementations, the air handling unit has a cooling coil and a variable volume fan. In some implementations, direct expansion (DX) cooling systems comprise compressors, evaporators and air-cooled, water-cooled or evaporatively-cooled condensing systems. Such systems can be controlled to reduce energy waste, improve occupant comfort and/or improve the thermal characteristics of the process cooling unit. The cooling system further comprises a control system which is configured to evaluate a cooling load value at the air handling unit and use the cooling load value to calculate at least one operational setpoint. The operational setpoint may advantageously be selected to improve the energy efficiency of the overall cooling system.

12 Claims, 8 Drawing Sheets

U.S. PATENT DOCUMENTS

| | | | |
|---|---|---|---|
| 5,640,153 A | 6/1997 | Hildebrand et al. | |
| 5,909,378 A | 6/1999 | De Milleville | |
| 6,115,713 A * | 9/2000 | Pascucci et al. | ............. 1/1 |
| 6,227,961 B1 * | 5/2001 | Moore et al. | ............. 454/229 |
| 6,260,366 B1 | 7/2001 | Pan | |
| 6,286,764 B1 * | 9/2001 | Garvey et al. | ............. 236/12.12 |
| 6,645,016 B1 * | 11/2003 | Andersen et al. | ............. 440/6 |
| 7,216,698 B2 * | 5/2007 | Catzel | ............. 165/214 |
| 2002/0173929 A1 * | 11/2002 | Seigel | ............. 702/130 |
| 2003/0192328 A1 | 10/2003 | Kikuchi et al. | |
| 2004/0044502 A1 | 3/2004 | Ito et al. | |
| 2005/0038567 A1 | 2/2005 | Maeda et al. | |
| 2005/0097905 A1 | 5/2005 | Kwon et al. | |
| 2005/0262865 A1 * | 12/2005 | Yabutani | ............. 62/323.4 |
| 2008/0033599 A1 * | 2/2008 | Aminpour et al. | ............. 700/276 |
| 2009/0050703 A1 * | 2/2009 | Lifson et al. | ............. 236/51 |
| 2010/0057263 A1 * | 3/2010 | Tutunoglu | ............. 700/282 |

FOREIGN PATENT DOCUMENTS

| | | |
|---|---|---|
| EP | 1 335 166 A | 8/2003 |
| EP | 1 335 166 A3 | 12/2003 |
| EP | 1 426 703 A | 6/2004 |
| EP | 1 426 703 A1 | 6/2004 |
| EP | 1 429 083 A | 6/2004 |
| EP | 1 429 083 A1 | 6/2004 |
| EP | 1 437 558 A1 | 7/2004 |
| GB | 2 258 743 A | 8/1992 |
| GB | 2 258 743 A | 2/1993 |
| WO | WO 2006/019909 | 2/2006 |

OTHER PUBLICATIONS

Written Opinion of International Searching Authority for related patent PCT/US08/75491 performed by International Searching Authority/US on Nov. 19, 2008.

International Search Report for related patent PCT/US2007/088007 performed by International Searching Authority/EP on Jul. 17, 2008.

Written Opinion of International Searching Authority for related patent PCT/US2007/088007 performed by International Searching Authority/EP on Jul. 17, 2008.

* cited by examiner

OPTIMIZED CONTROL SYSTEM FOR COOLING SYSTEMS

CROSS REFERENCE TO RELATED APPLICATION

The present patent application claims priority under 35 U.S.C. §119 to U.S. Provisional Patent Application Ser. No. 60/876,754, filed on Dec. 22, 2006, and entitled, "OPTIMIZED CONTROL SYSTEM FOR COOLING SYSTEMS," the entire disclosure of which is incorporated by reference herein.

BACKGROUND

1. Field of the Invention

This application relates in general to the field of climate control systems, and in particular, to improved control systems and methods for operating cooling plants and distributed cooling systems.

2. Description of the Related Art

Cooling systems that utilize various system components to remove heat from an unconditioned or partially conditioned air stream or process load are common in medium and large buildings and other facilities. Such cooling systems typically include absorption, centrifugal, rotary screw or scroll water chillers, direct expansion (DX) based cooling systems, air handling units (AHUs), other process cooling units, cooling towers, pumps and the like. If not properly controlled, such cooling systems can waste substantial amounts of energy. In addition, improper control of such cooling systems results in undesirable fluctuations in the temperature of conditioned offices and other spaces within a facility and/or thermal variations in process loads.

SUMMARY

In one implementation, a control system for a cooling system incorporates control routines that are configured to detect actual end use cooling loads and adjust one or more operational setpoints to reduce energy consumption while desirably satisfying the cooling load demands.

In some implementations, a cooling system for providing conditioned air to a facility comprises a chiller subsystem, a cooling tower subsystem, one or more air handling units and a control system. The chiller subsystem includes one or more absorption, constant speed, variable speed or other types of chillers and constant speed, variable speed or other types of chilled fluid pumps. Further, the cooling tower subsystem comprises one or more cooling tower units, which include a cooling tower inlet and outlet, and one or more constant speed or variable speed condenser fluid pumps. The condenser fluid pumps are configured to convey a volume of condenser fluid from the cooling tower outlet to the cooling tower inlet through the chiller. The air handling unit comprises a cooling coil and a variable volume fan. The cooling coil is configured to receive a volume of chilled fluid from the chiller, and the fan is configured to deliver a volume of air or draw a volume of air past the cooling coil for heat exchange between the air and the chilled fluid.

In some implementations, the control system of the cooling system is configured to evaluate a cooling load value at the air handling unit or zone thermal unit and use the cooling load value to calculate at least one operational setpoint, which can be selected to improve the energy efficiency of the overall cooling system.

In other implementations, the operational setpoint includes the chilled fluid temperature, chilled fluid flowrate, chilled fluid differential pressure, condenser fluid temperature, condenser fluid temperature differential, condenser fluid flowrate, air handling unit fan static pressure, conditioned air temperature or another parameter. In one implementation, the chiller, chilled fluid pump, condenser fluid pump and air handling unit are each controlled or connected to a local control panel. In other implementations, the control system is configured to communicate with each local control panel. In still another implementation, the control system is further configured to provide an operational instruction to at least one local control panel.

In some implementations, a method of improving the energy efficiency of a cooling system comprises determining a cooling load value at a process cooling load, calculating at least one target setpoint and providing the target setpoint to at least one component of the cooling system. Further, at least one component is configured to modify its operation to satisfy the target setpoint.

In other implementations, a process cooling load comprises a process cooling unit. In another implementation, a process cooling load comprises an air handling unit. In several implementations, the setpoint comprises the chilled fluid temperature, chilled fluid flowrate, chilled fluid differential pressure, condenser fluid temperature, condenser fluid temperature differential, condenser fluid flowrate, air handling unit fan static pressure, conditioned air temperature or another parameter. In other implementations, providing the target setpoint to a component comprises delivering a command to a local control panel that is configured to modify the operation of a component.

In some implementations, a control system for improving the energy efficiency of a cooling system, the control system includes a main processor configured to interface with at least one local control panel by sending or receiving data regarding the operation of the cooling system and a translator member configured to convert data communicated between a local control panel and the main processor so that both the control panel and the main processor can identify the data. Further, the main processor is configured to use the data received from the control panel to calculate at least one setpoint and transmit an operational instruction to a control panel. In other implementations, the main processor comprises a CPU. In still another implementation, the setpoint includes the chilled fluid temperature, chilled fluid flowrate, condenser fluid temperature, condenser fluid temperature differential, condenser fluid temperature differential, condenser fluid flowrate, air handling unit fan static pressure, conditioned air temperature or another parameter.

BRIEF DESCRIPTION OF DRAWINGS

These and other features, aspects and advantages of the present specification are described with reference to drawings of certain preferred implementations, which are intended to illustrate, but not to limit, the disclosure herein. The drawings include seven (8) figures. It is to be understood that the attached drawings are for the purpose of illustrating concepts and may not be to scale.

DETAILED DESCRIPTION

The discussion below and the figures referenced herein describe various implementations of a control system configured to integrate with a variety of air conditioning and process cooling equipment. A number of these implementations are particularly well suited for implementation in mid- to large-size commercial, industrial, and institutional (CII) facilities, campus-type facility groupings and/or other buildings. However, it will be appreciated that the features and advantages related to the different implementations described herein may be incorporated into other types of systems comprising equipment whose operation may be optimized.

Figure 1:
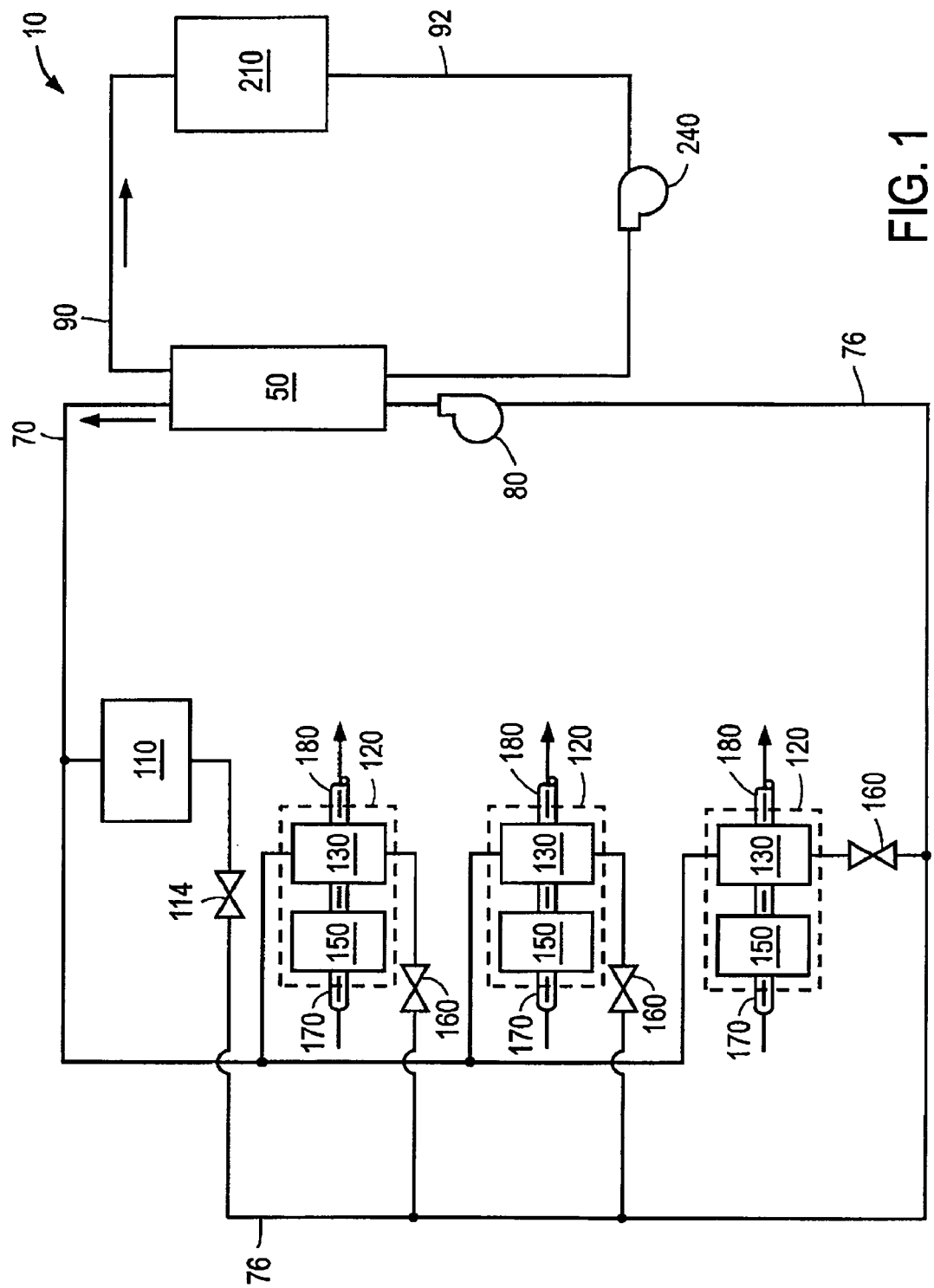
FIG. 1 illustrates a schematic view of a cooling system in accordance with one implementation.

With reference to the schematic of FIG. 1, in some implementations, a cooling system 10 includes one or more chillers 50, air handling units (AHUs) 120, process cooling loads 110, cooling towers 210, pumps 80, 240, valves 114, 160 and the like. In some implementations, water or other fluid is cooled in a chiller 50 and conveyed through a chilled fluid piping system 70 towards one or more process cooling loads 110 and/or AHUs 120. Typically, the cooled water or other fluid can be conveyed through the chilled fluid piping system 70 with the help of one or more pumping units 80.

Figure 2:
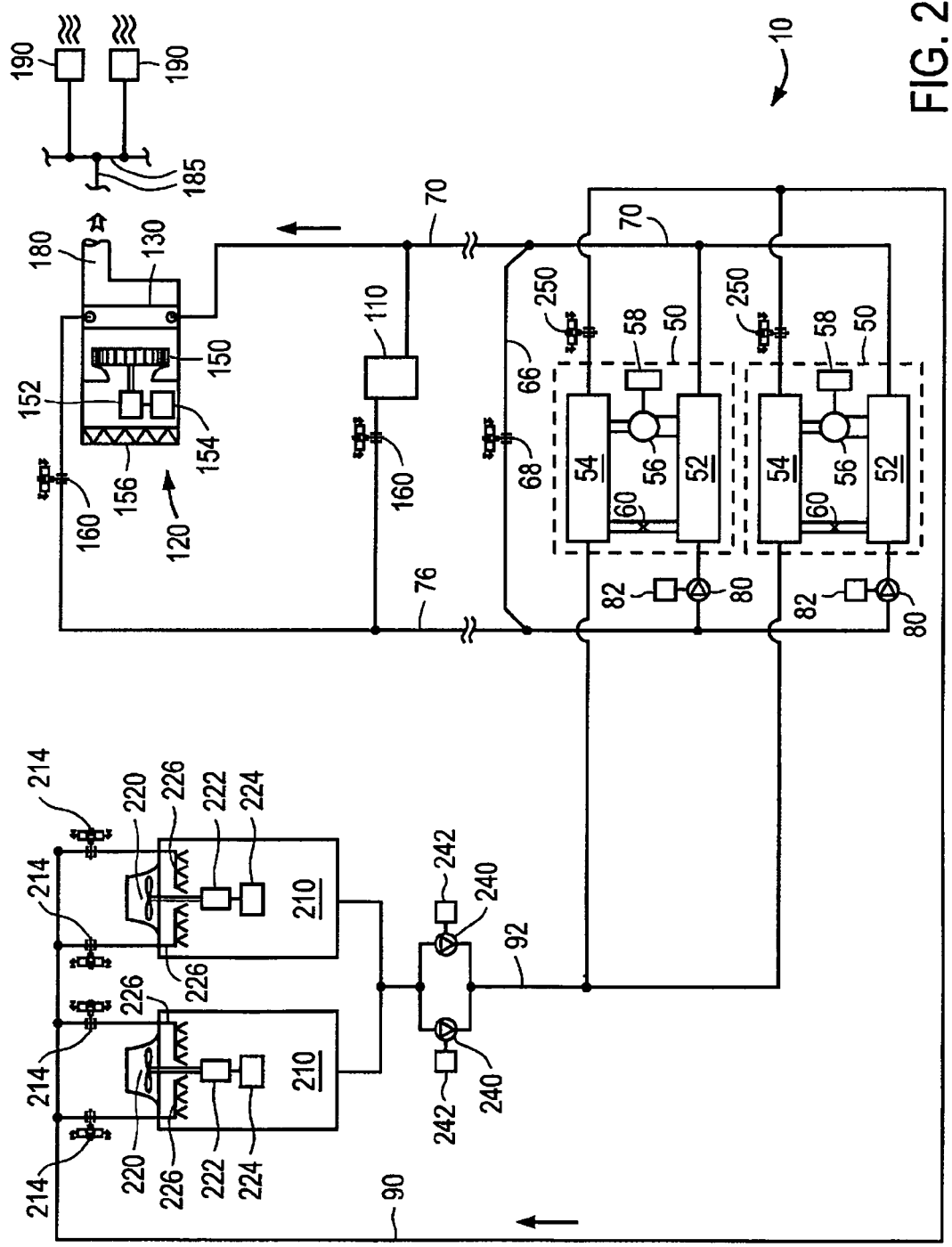
FIG. 2 is a more detailed schematic view of the cooling system illustrated in FIG. 1.
Figure 5:
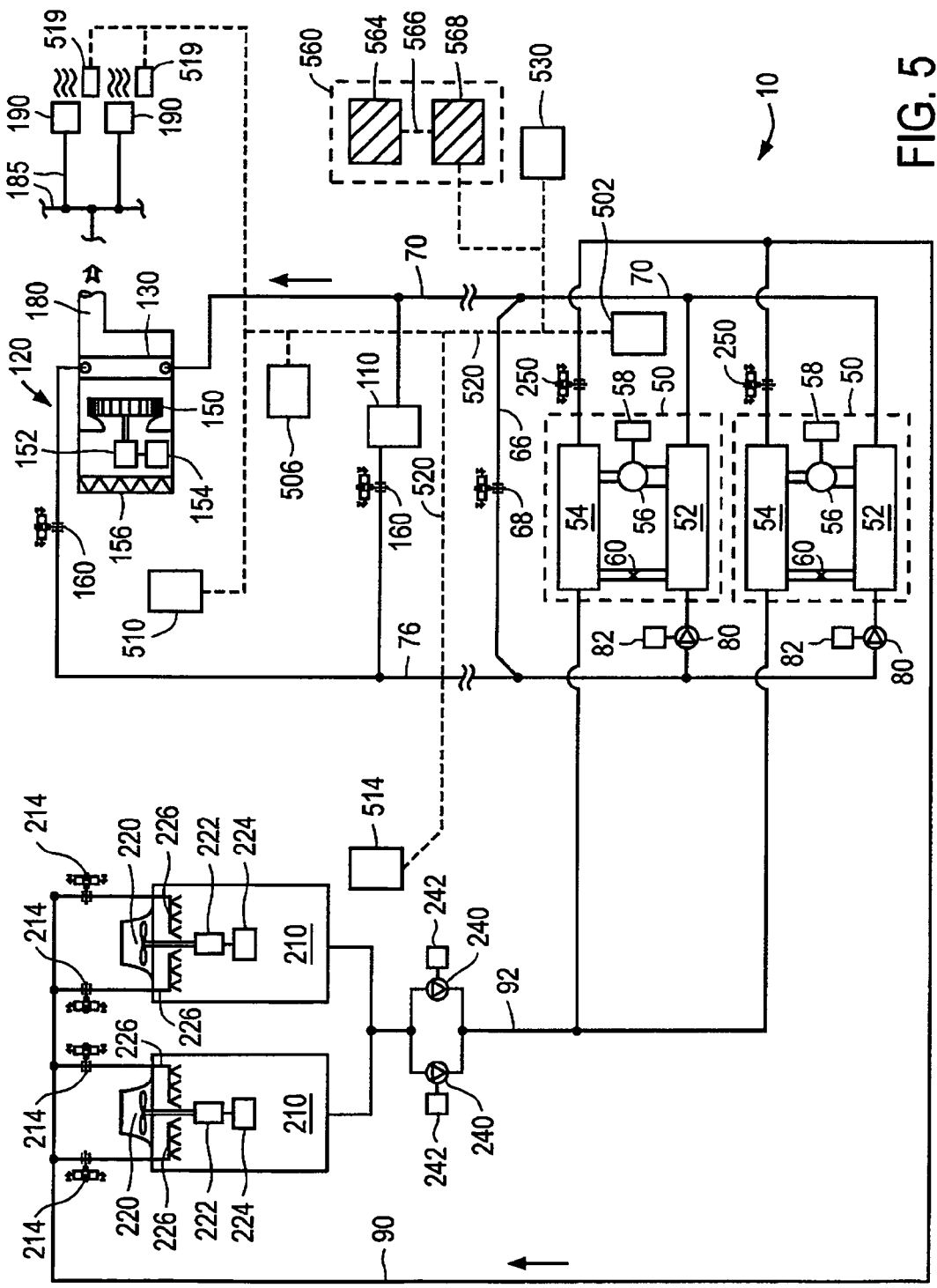
FIG. 5 is illustrates one implementation of control system components located within the cooling system of FIG. 2.

The flow of chilled water or other fluid to a process cooling load 110 and/or an AHU 120 can be controlled by selectively modulating a flow control valve 114, 160. In the implementation, illustrated in FIG. 1, the flow control valves 114, 160 are positioned downstream of the process cooling load 110 and the AHUs 120, respectively. Alternatively, however, the valves 114, 160 may be situated upstream of a process cooling load 110 and/or an AHU 120. Chilled fluid (e.g., water) can be used to condition air or to remove heat from one or more other sources. For example, chilled water can be distributed through cooling coils 130 or other heat exchange units of an AHU 120. Fans 150 or blowers can receive a volume of unconditioned or partially conditioned air from an inlet source 170 and deliver it through one or more cooling coils 130. As air moves passed the coils 130, heat from the unconditioned or partially conditioned air may be removed by the chilled water or other fluid being conveyed therein. Thus, conditioned air can be delivered to individual offices, rooms or other locations within a facility's interior through a discharge duct 180 or other conveyance system. As illustrated in FIGS. 2 and 5, in some implementations, air or other fluid exiting the AHUs 120 is routed to an air distribution duct system 185 before it is ultimately delivered to a plurality of zone terminals 190 or other temperature control zones (TCZs).

As a result of the heat exchange occurring at the cooling coils 130 and/or the process cooling loads 110, the temperature of the fluid passing therethrough increases. As illustrated in FIG. 1, this volume of heated or spent chilled water or other fluid can be collected in a separate spent fluid piping system 76 and delivered to the inlet of the chiller 50. In addition, as a result of the heat transfer from the unconditioned or partially conditioned air to the chilled water occurring at or near the coils 130, the process can also act to dehumidify the air.

Upon returning to the chiller 50, chilled water can be passed through a refrigerant evaporator portion of the chiller 50. As is discussed in greater detail below, a refrigerant evaporator portion of the chiller, which can be referred to as "cooler," may include a refrigerant. Consequently, the temperature of the fluid passing through the refrigerant evaporator portion can be lowered to a desired temperature before it is returned to one or more process cooling loads 110 and/or AHUs 120 via the chilled fluid piping system 70. The heat removed from the chilled water in the refrigerant evaporator portion typically results in a temperature increase of the refrigerant contained within the chiller 50 and conversion of refrigerant liquid into refrigerant vapor. In some implementations, heat from the refrigerant can be subsequently transferred to a volume of condenser water or other fluid being conveyed through a refrigerant condenser portion of the chiller 50.

With continued reference to FIG. 1, condenser water can be transferred from the chiller 50 to one or more cooling towers 210. The condenser water can be conveyed through a condenser water return piping system 90 with the help of one or more condenser water pumping units 240. Typically, a cooling tower 210 is designed to be the final heat rejection source for a facility. In some implementations, at least a portion of the heat absorbed by the condenser water can be dissipated by dispersing it over relatively cooler ambient air. Consequently, the evaporation or cooling of heated condenser water in a cooling tower 210 can be used to remove heat from a chiller 50 and the entire cooling system 10. Cooled condenser water exiting a cooling tower 210 can be returned to the refrigerant condenser portion of the chiller 50 for additional heat removal.

The temperature and comfort level of conditioned spaces (e.g., offices, lobbies, conference rooms, restrooms, etc.) within a facility can be regulated by adjusting the operational characteristics of one or more of the various components that comprise the cooling system 10. Controlling such operational parameters of a cooling system can offer desirable energy savings. For example, in some implementations, the differential pressure or speed of one or more chilled water pumps 80 and/or the condenser water pumps 240 can be modified. In addition, or in lieu of or in addition to adjustment of the pump differential pressure or speed, one or more other parameters can be regulated, such as, for example, the temperature of chilled water discharged from a chiller 50 and/or the temperature of condenser water delivered to a chiller 50. In yet other implementations, one or more parameters related to the operation of the AHUs 120, process cooling loads 110, cooling towers 210 and/or any other subsystem can be strategically modified or controlled.

Detailed Description of Climate Control System

With reference to FIG. 2, a cooling system 10 can include one or more chillers 50 which are configured to remove heat from water or other liquid. In the implementation illustrated in FIG. 2, the cooling system 10 comprises two chillers 50. However, it will be appreciated that fewer or additional chillers 50 can be included in a particular cooling system 10. As shown, a chiller 50 can include a refrigerant evaporator 52 and a refrigerant condenser 54.

It will be appreciated that in other implementations, absorption chillers, direct expansion (DX) packaged systems, built-up DX systems and/or any other device can be used to produce chilled water or other fluid for a cooling system.

The refrigerant evaporator 52, which is sometimes referred to as a "cooler," can contain liquid and/or vapor refrigerant. As return chilled water (or other fluid) from the AHUs 120 and/or process cooling loads 110 is passed through the chiller 50, the refrigerant contained within the refrigerant evaporator 52 can help remove heat from the chilled water. As a result of such a heat transfer, the refrigerant contained within the refrigerant evaporator 52 may be heated. In one implementation, the return chilled water can be directed into a system of tubing, piping or conduits located within the refrigerant evaporator 52. This can further facilitate the heat transfer between the return chilled water and the refrigerant. The tubing within the refrigerant evaporator 52 through which the chilled water is routed can be copper, steel, other metals, alloys thereof and/or the like.

The refrigerant contained within the evaporator 52 can be of the low pressure, medium pressure or high pressure type. Further, the refrigerant may include blends or non-blends. In some implementations, the refrigerant can comprise chlorofluorocarbons (CFCs), hydrochlorofluorocarbons (HCFCs), hydrofluorocarbons (HFCs), ammonia, water and/or any other fluids.

As the return chilled water is distributed through the tubing of the refrigerant evaporator 52, heat from the warmer chilled water may be transferred to the refrigerant. Consequently, the refrigerant within the evaporator 52 may be heated accordingly. In some implementations, such heat transfer may cause at least a portion of the liquid refrigerant to evaporate and be converted into a vapor. With continued reference to FIG. 2, evaporated refrigerant from a refrigerant evaporator 52 can be collected by one or more refrigerant compressors 56, which may compress it to a higher pressure and temperature.

The refrigerant compressors 56 can be operated by single speed, variable speed and/or multi-speed motors. It will be appreciated that the type of refrigerant compressor 56 used to compress the evaporated refrigerant may vary. For example, the refrigerant compressor 56 can be reciprocating, centrifugal, screw, scroll or the like.

With continued reference to FIG. 2, a volume of refrigerant compressed by a refrigerant compressor 56 can be directed to one or more refrigerant condensers 54. As will be described in greater detail below, refrigerant discharged from the refrigerant compressor 56 can be condensed by cool condenser water discharged from the cooling towers 210. This condensation process can be accomplished by the transfer of heat from the refrigerant to the cooler condenser water. Thus, in some implementations, evaporated refrigerant discharged from the refrigerant compressor 56 can be condensed to create a higher pressure refrigerant liquid.

Heat transfer between the condenser water and the refrigerant within a refrigerant condenser 54 can be facilitated by directing the condenser water through a series of tubing or other conduits that are surrounded by the refrigerant vapor and/or liquid. Thus, higher temperature refrigerant can be condensed within the refrigerant condenser 54 by the cooler condenser water. Heat from the warmer refrigerant can be transferred across the walls of the tubing or conduits to the condenser water passing therein. In some implementations, the refrigerant can condense on the surface of the condenser water tubing or conduits. The tubing or conduits can comprise materials with relatively high heat transfer properties, such as, for example, copper, brass, aluminum, steel, combinations or alloys thereof and the like.

A volume of condensed refrigerant from a refrigerant condenser 54 can be transferred to a refrigerant evaporator 52 through one or more refrigerant expansion devices 60. These refrigerant expansion devices 60 can be configured to meter and regulate the flow of refrigerant into the refrigerant evaporators 52. The pressure drop associated with the flow of refrigerant through a refrigerant expansion device 60 can lower the pressure, and thus, the temperature of the refrigerant. As discussed, once within a refrigerant evaporator 52, this cooled refrigerant can cool the chilled water or other fluid passing therethrough. These heat transfer processes between the chilled water, the refrigerant contained within the chiller 50 and the condenser water can be repeated during the operation of the chiller 50.

As illustrated in FIG. 2, each chiller 50 can include one or more ancillary systems 58, such as, for example, starters, control panels and the like. In the depicted implementation, the cooling system 10 comprises two chillers 50 which are arranged in a parallel orientation. However, in other implementations more or fewer chillers 50 can be included. The cooling system 10 can be configured so that one, some or all of the chillers 50 operate simultaneously. In other implementations, two or more chillers 50 or other devices can be arranged in series.

The difference in temperature of the refrigerant located within the refrigerant evaporator 52 and the refrigerant condenser 54 can be referred to as the "refrigerant lift." As discussed, under normal operating conditions, the refrigerant's temperature and pressure is higher in the refrigerant condenser 54 than in the refrigerant evaporator 52. Typically, chillers 50 and other similar cooling devices operate more efficiently when refrigerant lift is reduced. Therefore, in order to lower energy costs, it may be desirable to decrease this temperature difference by lowering the temperature of the refrigerant within the refrigerant condenser 54 and/or increasing the temperature of the refrigerant within the refrigerant evaporator 52.

One or more other devices can be used to remove heat from chilled water circulating through a cooling system 10, either in lieu of or in addition to chillers 50, such as, for example, absorption chillers or the like.

As illustrated in the schematic of FIG. 2, after passing through the refrigerant evaporator 52 of the chiller 50, chilled water or other fluid can be directed into a chilled fluid piping system 70. From the chiller 50, chilled water can be delivered to one or more process cooling loads 110 and/or AHUs 120. In some implementations, the energy required to convey the chilled water from the chillers 50 to the process cooling loads 110 and/or AHUs 120 can be supplied by one or more chilled water system pumps 80. It is to be understood that any chilled fluid can be used instead of chilled water. As used herein, the term "chilled water" is a broad term and is used in accordance with its ordinary meaning and may include, without limitation, water, refrigerant, other liquids and gases, etc. The terms "chilled water" and "chilled fluid" are used interchangeably herein.

In the implementation of FIG. 2, one chilled water system pump 80 is positioned upstream of each chiller 50. Alternatively, the chilled water system pumps 80 can be located downstream of the chillers 50. In the illustrated arrangement, a single pump 80 is dedicated to each chiller 50. However, it will be appreciated that a cooling system 10 can include more or fewer chilled water system pumps 80 than shown in FIG. 2. Further, these chilled water system pumps 80 can be arranged in many different configurations.

Figure 7:
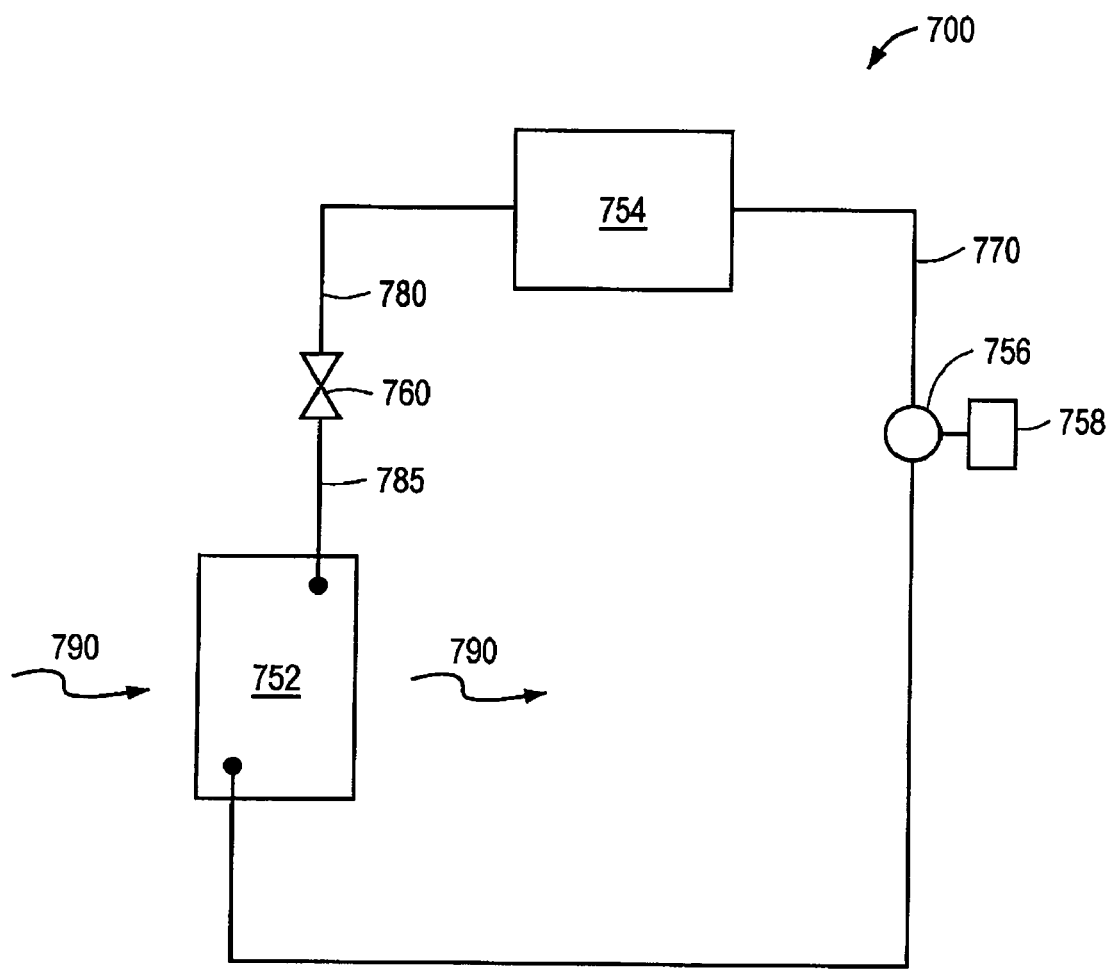
FIG. 7 illustrates a schematic view of a direct expansion cooling system according to one implementation.

In other implementations, a direct expansion (DX) cooling system is used to provide cooling to the facility or system requiring cooling. As illustrated in FIG. 7, the refrigerant evaporator 752 can contain liquid and/or vapor refrigerant. As warm mixed, return and/or fresh air (or other fluid) is passed through or over the evaporator 752, the refrigerant contained within the refrigerant evaporator 752 can help remove heat from the airstream 790 or fluid. As a result of such a heat transfer, the refrigerant contained within the refrigerant evaporator 752 is typically heated. In one implementation, the mixed, return and/or fresh air 790 can be directed through or over the refrigerant evaporator 752. This can further facilitate the heat transfer between the airstream 790 and the refrigerant. The tubing within the refrigerant evaporator 752 over which the airstream 790 is routed can be copper, steel, other metals, alloys thereof and/or the like. In some implementations, the evaporator 752 can be manufactured as an integral part of the direct expansion cooling system 700. In other implementations, the evaporator 752 can be located remotely from the refrigerant compressor 756 and refrigerant condenser 754.

The refrigerant contained within the evaporator 752 can be of the low pressure, medium pressure or high pressure type. Further, the refrigerant may include blends or non blends. In some implementations, the refrigerant can comprise chlorofluorocarbons (CFCs), hydrochlorofluorocarbons (HCFCs), hydrofluorocarbons (HFCs), ammonia, water and/or any other fluids.

In some implementations, as the airstream 790 is distributed over the tubing of the refrigerant evaporator 752, heat from the warmer airstream 790 is transferred to the refrigerant. Consequently, the refrigerant within the evaporator 752 is heated accordingly. In some implementations, such heat transfer may cause at least a portion of the liquid refrigerant to evaporate and be converted into a vapor. With continued reference to FIG. 7, evaporated refrigerant from a refrigerant evaporator 752 can be collected by one or more refrigerant compressors 756, which may compress it to a higher pressure and temperature.

The refrigerant compressors 756 can be operated by single speed, variable speed and/or multi-speed motors. It will be appreciated that the type of refrigerant compressor 756 used to compress the evaporated refrigerant may vary. For example, the refrigerant compressor 56 can be reciprocating, centrifugal, screw, scroll or the like.

With continued reference to FIG. 7, a volume of refrigerant compressed by a refrigerant compressor 756 can be directed to one or more refrigerant condensers 754. As will be described in greater detail below, refrigerant discharged from the refrigerant compressor 756 can be condensed by several different methods, including water discharged from the cooling towers 210 as described in FIG. 2, or alternately by directing air over the condenser system, or by spraying water over the condenser system and allowing evaporation to assist in the heat rejection process. This condensation process can be accomplished by the transfer of heat from the refrigerant to the cooler condenser water, air, or evaporative system. Thus, in some implementations, evaporated refrigerant discharged from the refrigerant compressor 756 can be condensed to create a high pressure refrigerant liquid.

Heat transfer between the condenser water, air or evaporative system and the refrigerant within a refrigerant condenser 754 can be facilitated by directing the condenser water through a series of tubing or other conduits that are surrounded by the refrigerant vapor and/or liquid. In other implementations, the refrigerant is contained with the tubing, and relatively cool ambient air is passed over the tubing, or this process is enhanced by passing water and air over the tubing and allowing the water to evaporate, to enhance the efficiency of the heat transfer process. Thus, higher temperature refrigerant can be condensed within the refrigerant condenser 754 by the cooler condenser water, cooler air, or evaporative system. Heat from the warmer refrigerant can be transferred across the walls of the tubing or conduits to the condenser water passing therein, or to the ambient air or evaporative system passing over the tubing. In some implementations, the refrigerant can condense on the external surface of the condenser water tubing or conduits. In other implementations, the refrigerant can condense on the internal surface of the condenser water tubing or conduits. The tubing or conduits can comprise materials with relatively high heat transfer properties, such as, for example, copper, brass, aluminum, steel, combinations or alloys thereof and the like. In some implementations, the refrigerant condenser 754 can be manufactured as an integral part of the direct expansion cooling system 700. In other implementations, the refrigerant condenser 754 can be located remotely from the refrigerant compressor 756 and refrigerant evaporator 752.

A volume of condensed refrigerant from a refrigerant condenser 754 can be transferred to a refrigerant evaporator 752 through one or more refrigerant expansion devices 760. These refrigerant expansion devices 760 can be configured to meter and regulate the flow of refrigerant into the refrigerant evaporators 752. The pressure drop associated with the flow of refrigerant through a refrigerant expansion device 760 can lower the pressure, and thus, the temperature of the refrigerant. As discussed, once within a refrigerant evaporator 752, this cooled refrigerant can cool the airstream passing thereover. These heat transfer processes between the airstream, the refrigerant contained within the evaporator 752 and the condenser water can be repeated during the operation of the direct expansion cooling system 700.

As illustrated in FIG. 7, each direct expansion cooling system 700 can include one or more ancillary systems 758, such as, for example, starters, control panels and the like. In the depicted implementation, the direct expansion cooling system 700 comprises one direct expansion cooling system 700. However, in other implementations more direct expansion cooling system 700 can be included. The direct expansion cooling system 700 can be configured so that one, some or all of the direct expansion cooling system 700 operate simultaneously.

The difference in temperature of the refrigerant located within the refrigerant evaporator 752 and the refrigerant condenser 754 can be referred to as the "refrigerant lift." As discussed, under normal operating conditions, the refrigerant's temperature and pressure is higher in the refrigerant condenser 754 than in the refrigerant evaporator 752. Typically, direct expansion cooling system 700 and other similar cooling devices operate more efficiently when refrigerant lift is reduced. Therefore, in order to lower energy costs, it may be desirable to decrease this temperature difference by lowering the temperature of the refrigerant within the refrigerant condenser 754 and/or increasing the temperature of the refrigerant within the refrigerant evaporator 752.

As illustrated in the schematic of FIG. 7, after passing through the refrigerant evaporator 752 of the direct expansion cooling system 700, refrigerant or other fluid can be directed into a refrigerant piping system 775. From the refrigerant compressor 756, refrigerant can be delivered to one or refrigerant condensers 754, through refrigerant discharge piping 770. Refrigerant is then carried through refrigerant piping system 780 to the refrigerant expansion device 760. The refrigerant expansion device is typically located in close proximity to the refrigerant evaporator 752. Refrigerant liquid and/or vapor is carried from the refrigerant expansion device 760 to the refrigerant evaporator 752 through refrigerant piping system 785.

The chilled water system pumps 80 can be of the single speed, variable speed or multi-speed type. As will be discussed in greater detail below, these chilled water pumps 80 can be used as part of a cost reduction cooling plant control scheme. In addition, starters 82 can be provided for the motors of the chilled water system pumps 80. The starters 82 can be single speed, variable speed or multi speed, as desired or required by a particular cooling system.

With continued reference to FIG. 2, a volume of chilled water or other fluid discharged by the chiller 50 can be directed into the minimum flow bypass piping system 66. As shown, fluid directed into this bypass piping system 66 may be delivered into the spent fluid piping system 76, thereby bypassing downstream process cooling loads 110 and AHUs 120. The minimum flow bypass piping system 66 can ensure that a desired flow of chilled water is directed into the inlet of a chiller 50. This can be especially important when cooling loads are relatively light and/or when chilled water flowrates are otherwise reduced. For example, if the chilled water flowrate through a chiller 50 drops below a desired lower threshold, additional chilled water can be directed into the bypass piping system 66. Conversely, if the chilled water flowrate through a chiller 50 increases above a desired higher threshold, less or no chilled water can be diverted through the bypass piping system 66.

In some implementations, the cooling system 10 can be configured to determine if chilled water needs to be diverted from the chilled fluid piping system 70 to the spent fluid piping system 76 through the minimum flow bypass piping system 66. In the arrangement illustrated in FIG. 2, a modulating valve 68 positioned on the bypass piping system 66 is used to regulate the bypass flowrate.

The position of the modulating valve 68 on the minimum flow bypass piping system 66 can be controlled electrically, electronically, pneumatically, hydraulically and/or by some other method. The valve 68 can be a ball valve, a globe valve, a butterfly valve, a plug valve or any other type of valve capable of being modulated.

As discussed, chilled water discharged from a chiller 50 can be directed into a piping system 70 which carries chilled water to the various end uses throughout a facility or campus-type grouping of facilities. From the chilled fluid piping system 70, chilled water can be delivered to one or more process cooling loads 110. Depending on its size, function, complexity and other characteristics, a facility can comprise many different process cooling loads. In some implementations, a process cooling load 110 can be associated with an air distribution system, such as, for example, an AHU or the like. Thus, as described below, chilled water can cool or condition a volume of air by non-contact heat transfer. Alternatively, chilled water can be configured to directly contact a particular load for cooling purposes.

With continued reference to the schematic of FIG. 2, each process cooling load 110 can include a process cooling load control valve 114 which may be configured to regulate the flowrate of chilled water directed to that particular load 110. As will be discussed in greater detail below, the flowrate and/or temperature of chilled water to each process cooling load 110 can be strategically regulated to lower the overall energy costs of a cooling system 10.

Like with other flow control valves included in the cooling system 10, the position of the process cooling load control valve 114 can be regulated electrically, electronically, pneumatically, hydraulically and/or using some other method. For example, in some implementations, the control valve 114 can comprise a remotely-controlled pneumatic or electrical actuator.

Depending on its number of floors, overall size and other details, a facility may comprise a plurality of AHUs 120. A campus type system may comprise a plurality of facilities. As shown in FIG. 1, the chilled fluid piping system 70 can deliver chilled water from one or more chillers 50 to each AHU 120. However, for simplicity, the schematic illustration of FIG. 2 includes only a single AHU 120. Thus, it will be appreciated that chilled water can be delivered to more than one AHU 120. For example, in some implementations, a building may comprise one or more AHU 120 on each floor. Consequently, a facility can comprise dozens or hundreds of AHUs 120.

As schematically illustrated in FIG. 2, chilled water can be directed to a cooling coil system 130 of an AHU 120. The cooling coil system 130 can include one or more coils. Each coil may be constructed of individual tubing or other piping that is strategically routed through the cooling coil system 130 to enhance heat transfer with adjacently passing air. The tubing can be constructed of copper, brass, steel, aluminum, combinations or alloys thereof or the like. In order to facilitate the heat transfer efficiency between the chilled water and the volume of air delivered across the cooling coil system 130, the coil tubing can include one or more heat exchange enhancers (e.g., fins). Such heat exchange enhancers can be manufactured from aluminum, copper, steel, brass and/or the like.

In some implementations, a cooling coil system 130 can include between one and sixteen rows of tubing. However, a cooling coil system 130 can include more than sixteen rows as desired or needed. Chilled water from the chilled fluid piping system 70 can be delivered through the tubing of the cooling coil system 130. As unconditioned or partially-conditioned air is passed over the outside of the heat exchange members (e.g., finned surfaces of the coil tubing), heat from the air can be transferred to the chilled water. Consequently, the air is cooled and the chilled water is heated.

With continued reference to FIG. 2, air can be delivered across each cooling coil system 130 by a fan 150 or other blower. In the illustrated implementation, the fan 150 is configured to blow air through the coil system 130. Alternatively, the fan 150 can be adapted to draw air through the coil system 130. Regardless of the exact manner in which it is moved relative to the cooling coil system 130, the air can be forced passed the heat exchange members of the coil tubing and into a conditioned air distribution header 180. From the distribution header 180, conditioned air can be routed to individual offices, other spaces and/or other process loads. In some implementations, conditioned air is delivered to those spaces through zone thermal units which may be constant volume or variable in nature. As illustrated in FIGS. 2 and 5, in some implementations, air or other fluid exiting the AHUs 120 is routed to an air distribution duct system 185 before it is ultimately delivered to a plurality of zone terminals 190 or other temperature control zones (TCZs). Preferably, as illustrated in FIG. 5, the terminals 190 or TCZs include one or more temperature sensors 519 or other controls that are connected to the control system 10.

As shown, each fan 150 can comprise an electric motor 152 and a starter 154 for the motor 152. The motor 152 can be single speed, variable speed or multi-speed. As will be discussed in greater detail below, the fan 150 preferably comprises a variable speed or multi-speed motor 152 to permit the flow of air across the cooling coil system 130 to be strategically controlled. The motor starter 154 can be a single speed, variable speed or multi-speed starter, as desired or required for the particular application. In addition, other means and methods for controlling the volume of air delivered can be used, such as, for example, inlet guide vanes, variable pitch mechanisms, discharge dampers and the like.

In order to remove any undesirable substances (e.g., dust, particulates, etc.) from the air stream, an AHU 120 can include an air filtration system 156 upstream of the fan 150. The air filtration system 156 can comprise an air filter or other similar screening member. In some implementations, the air drawn into a fan 150 can include a fresh ambient air portion and/or recirculated air portion returned from inside the particular facility being cooled.

A flow control valve 160 can be used to regulate the flowrate of chilled fluid (e.g., water) delivered to each AHU 120. In the implementation illustrated of FIG. 2, the control valve 160 is positioned downstream of the AHU 120. However, it will be appreciated that a control valve 160 can be positioned upstream of the AHU 120. As with other control valves used throughout the cooling system 10, the flow control valve 160 for each AHU 120 can be controlled electrically, electronically, pneumatically, hydraulically and/or by some other method. The control valve 160 may be a ball valve, a globe valve, a butterfly valve, a plug valve or any other type of modulating or multi-position (e.g., two position) valve. As discussed in greater detail below, the flow of chilled water through each cooling coil system 130 of an AHU 120 can be used to regulate the temperature of the conditioned air passing therethrough.

Chilled water exiting the process cooling loads 110 and/or the AHUs 120 of a cooling system 10 can be collected in a spent fluid piping system 76. As shown, this volume of chilled water, along with any chilled water routed through the minimum flow bypass piping system 66, can be returned to the inlet of one or more chillers 50. Thus, chilled water entering a chiller 50 can be re-cooled and re-delivered to the process cooling loads 110 and/or the AHUs 120 via the chilled fluid piping system 70.

As discussed, heat from the refrigerant condensers 54 of the chillers 50 can be removed using a cooling tower system. Condenser water delivered to the chillers 50 through the condenser water supply piping system 92 can condense warmed refrigerant contained within the refrigerant condensers 54. Consequently, heat can be transferred from the refrigerant to the condenser water. As illustrated in FIG. 2, heated condenser water can be collected in a condenser water return piping system 90 and delivered to one or more cooling towers 210.

With continued reference to FIG. 2, cooling tower isolation valves 214 positioned upstream of the cooling towers 210 can be used to selectively convey heated condenser water to one or more cooling tower units. For instance, if a cooling tower 210 is not in operation, the isolation valves associated with that tower 210 can be closed. The position of the isolation valves 214 can be selectively controlled using electrical, electronic, pneumatic, hydraulic or other types of methods. For example, in one implementation, the isolation valve 214 is remotely controlled using a pneumatic or electric actuator.

Therefore, under certain light load conditions, one or more cooling towers 210 can be taken out of service in order to maintain a minimum desired flow through the cooling tower system. This can help ensure that fill or media contained within the cooling towers remain adequately wetted.

The cooling towers 210 can have a cross-flow or a counter-flow design. Moreover, the cooling tower fans 220 may be of the forced draft or induced draft type. It will be appreciated that other types of cooling tower and/or flow schemes can also be used. As illustrated in FIG. 2, depending on the position of the cooling tower isolation valves 214, condenser water from the condenser water return piping system 90 can be routed to one or more cooling towers 210. Condenser water entering a cooling tower 210 can be sprayed or otherwise distributed over fill or media using one or more distribution nozzles 226. The distribution nozzles 226 can be configured to be gravity fed or pressure fed.

The fill or media contained within a cooling tower 210 can increase the contact surface area and/or contact time between the condenser water and the air to which it is exposed, thereby improving the cooling capacity of the cooling tower 210. The fill or media, which in one implementation is positioned below the distribution nozzles 226, can comprise one or more ceramic, plastic, fiber-reinforced and/or other materials. The fill preferably includes a large surface area to volume ratio to help improve the heat transfer properties of a cooling tower 210.

As shown, a cooling tower 210 may comprise a fan system 220 configured to direct or draw ambient air across the surface of the fill or media positioned therein. The fan system 220 can comprise a vane-axial, centrifugal, propeller or other type of fan. In addition, a fan system can include a motor 222 which is used to drive the fan. The fan motor 222 can be of the single speed, variable speed or multi-speed type, as required by a particular application. A gear drive, belt drive, direct drive or other method of transferring energy between the motor and the fan can be used. As discussed below, a variable speed or multi-speed fan motor 222 can be used to advantageously regulate the temperature of the condenser water exiting a cooling tower 210. Further, each fan motor 222 can comprise a motor starter 224, which may be of the single speed, variable speed or multi-speed type.

Thus, the fan systems 220 can deliver ambient air toward and/or draw ambient air through the fill or media located inside a cooling tower 210. As warm condenser water is sprayed over the fill, heat exchange between the condenser water and the ambient air can occur. Consequently, at least a portion of the condenser water may be evaporated or cooled. Condenser water flowing past the fill or media can be collected near the bottom of the cooling tower 210, and subsequently returned to the refrigerant condenser 54 of a chiller 50 for additional heat transfer.

With continued reference to the schematic of FIG. 2, the system 10 can comprise one or more pumps 242 that are configured to convey condenser water through the chillers 50 and back to the cooling towers 210. As with other pumps contained within the cooling system 10, the condenser water pumps 242 can include single speed, variable speed or multi-speed motors. As described in greater detail below, variable speed or multi-speed condenser water pumps 242 can permit the rate of heat transfer occurring at a chiller 50 and/or a cooling tower 210 and the amount of pumping energy consumed by the pumps to be advantageously controlled. Each condenser water pump 242 can comprise a motor which may of the single speed, variable speed or multi-speed type, as required by the particular application.

Condenser water discharged by the condenser water pumps 240 can be delivered to a common condenser water supply piping system 92. Chiller isolation valves 250, which may be located either upstream or downstream of the chillers 50, can be used to control the flow of condenser water into each refrigerant condenser 54.

The condenser water pumps 242 may be installed upstream or downstream of the chiller. Further, the condenser water pumps 242 can be dedicated to one chiller 50, or configured to service two or more chillers 50.

General Optimization Strategy

As discussed with reference to the implementations of FIGS. 1 and 2, equipment contained within a chiller system, a cooling tower system, an AHU system and/or other systems or subsystems that comprise a cooling system 10 can be strategically controlled. For example, the operation of one or more chillers 50, chilled water pumps 80, condenser water pumps 240, cooling tower fans 220, AHU fans 150, cooling coil valves 160 and/or other devices can be adjusted. Consequently, in an effort to preserve occupant comfort level within a facility and to improve the energy efficiency of the overall cooling system 10, one or more of these devices can be regulated to maintain certain desired system setpoints.

As described in greater detail below, a control system for a cooling system can be configured to detect certain parameters related to the operation of one or more system components. The control system may interact with various field panels and other instrumentation and control devices of the cooling system to detect the approximate magnitude and direction of the cooling loads in a particular facility or group of facilities. In response, the control system can modify one or more operational setpoints of the cooling system in a manner that reduces energy consumption and costs yet still maintains a desired level of occupant comfort.

The control system can modify operation setpoints related to the chiller system, the cooling tower system, the DX system, the AHUs and/or any other system or component. For example, in some implementations, a chilled water system differential pressure setpoint, a chilled water supply temperature setpoint, a condenser water temperature setpoint, a condenser water flowrate setpoint, a condenser water temperature differential setpoint, a supply air static pressure setpoint, a supply air temperature setpoint and/or the like may be modified by a particular control system.

Through the use of certain optimization routines, the control system can adjust one or more operational setpoints to increase the energy efficiency of the cooling system. Thus, such optimization routines can be configured to detect and recognize the energy efficiency and other operational characteristics of the various devices and components that comprise a cooling system. Preferably, the optimization routines can also be adapted to recognize how the different system components interact with each other, and how such interactions can affect overall cooling system performance and energy costs. Consequently, the control system can utilize such optimization routines to minimize or decrease energy waste.

Figure 3:
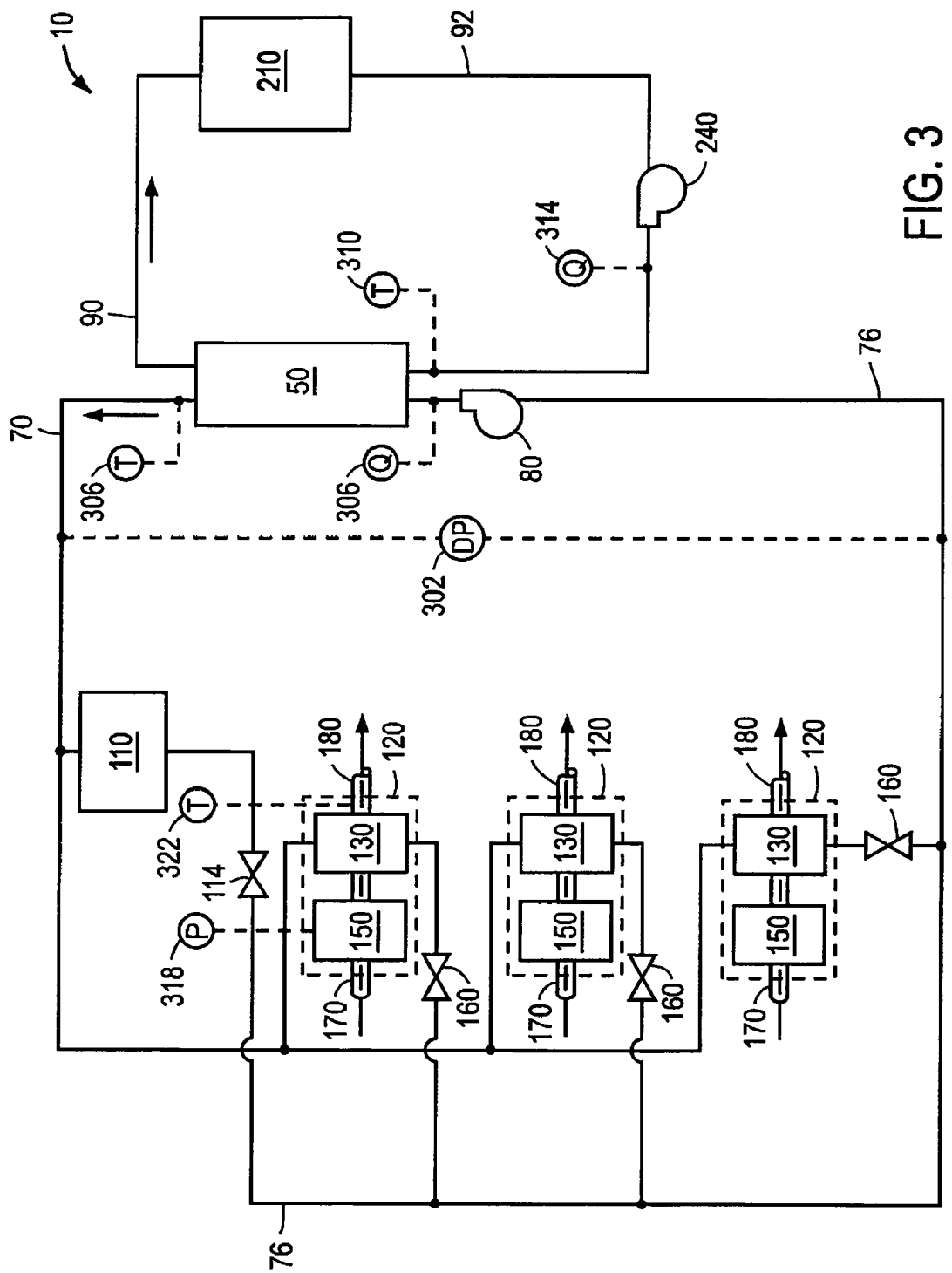
FIG. 3 illustrates a number of system setpoints located within the cooling system of FIG. 1 according to one implementation.

As illustrated in FIG. 3 and discussed in greater detail below, possible modifiable operational setpoints for a cooling system 10 can include the differential pressure (DP) across the cooling loads in the chilled water piping system 302, the flowrate (Q) of the chilled water 304, the temperature (T) of the chilled water discharged by the chiller 306, the temperature (T) of the condenser water entering the chiller 310, the flowrate (Q) of the condenser water through the chiller 314, the temperature differential of the condenser water measured across the chiller (TD), the static pressure (P) of an AHU 318, the temperature (T) of the conditioned air exiting an AHU 322 or the like. It will be appreciated that a cooling system can include more or fewer setpoints than indicated herein.

One or more of these setpoints can be reset or otherwise adjusted in order to operate the cooling system 10 in a more energy efficient manner. As described in greater detail below, modifications to these setpoints can be realized by adjusting the operational parameters of certain equipment and devices, such as, for example, chillers, chilled water pumps, condenser water pumps, cooling tower fans, AHU fans, control valves and/or the like. Such modifications and adjustments can be implemented using control algorithms included as part of a cooling system optimization software and hardware system.

Figure 4:
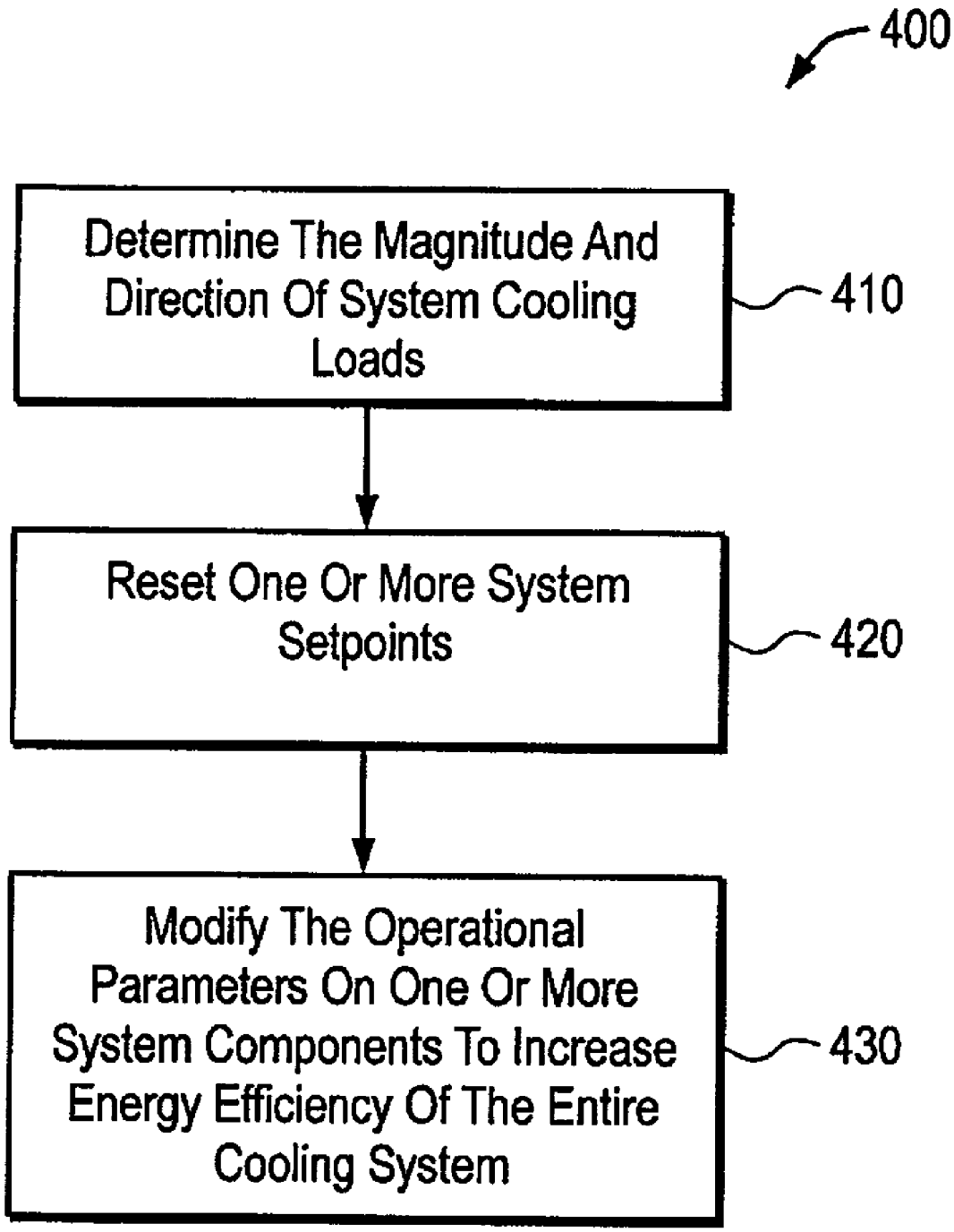
FIG. 4 illustrates a flow diagram of a control strategy according to one implementation.

With reference to FIG. 4, a control method 400 executed by a control system includes first determining the magnitude and direction of the system's cooling loads 410. Preferably, the control system that executes the control method 400 is configured to make this determination by examining the cooling loads at the end uses. For example, the control system can evaluate and consider the actual loads for each process cooling load, AHU and any other load included in a particular cooling system. The control system can also be configured to evaluate the gross overall cooling load magnitude and direction, and use one or both of these determinations as inputs to the control routine.

As is discussed in greater detail below, depending on the magnitude and direction of the various cooling loads, the control system can be adapted to reset one or more system setpoints 420. In some implementations, the control system can reset one or more setpoints related to the chiller system, such as, for example, the chiller water temperature setpoint or the chiller water differential pressure setpoint. In addition to or in lieu of adjusting chiller system setpoints, the control system can be configured to reset one or more cooling tower and/or AHU setpoints, such as, for example, the condenser water temperature or flowrate setpoint, the supply air static pressure or temperature setpoint or the like.

Next, the control system can adjust the operational parameters of one or more cooling system components to achieve the desired setpoints in a manner that increases the system's energy efficiency 430. For instance, the control system can be configured to directly or indirectly adjust the motor speed of a chiller, chilled water pump, condenser water pump, cooling tower fan, AHU fan and/or some other system component. The control system can also adjust the position of one or more control valves, inlet guide vanes, variable pitch mechanisms and discharge dampers in order to attain the desired setpoints.

Optimization Strategy for Chiller and Cooling Tower Systems

The software, hardware and other components of a control system can be designed according to one or more reset strategies. As discussed below, a reset strategy can be configured to reset the chilled water differential pressure setpoint, the chilled water supply temperature setpoint, the condenser water supply temperature setpoint, the condenser water temperature differential setpoint and/or the condenser water flowrate setpoint.

Initially, the chilled water differential pressure setpoint can be reset using the magnitude and direction of the cooling load as indicators. The cooling load of a facility can be based on one or more control logic determinations. For example, a Worst Case Air Handler (WCAH) or a Worst Case Process Load (WCPL) control logic can be used. However, it will be appreciated that one or more other types of control logic determinations may be used.

Under a WCAH control logic scheme, the system can be configured to monitor one or more variables of each AHU included in the cooling system. In one implementation, the control system can monitor the static pressure of the AHU fans, the fan speed or volume command, the return air temperature from the load being served, the air temperature of the conditioned air exiting and AHU, the valve position and/or the like. Similarly, under a WCPL control logic scheme, the system can monitor one or more process cooling load variables, such as, for example, the actual temperature at the process cooling load, the flow of chilled water directed to the process cooling load and the like. Consequently, the control system can determine which AHU or process cooling load has the greatest need for cooling.

In one implementation, the control system is configured to recognize that the cooling requirement is increasing if it detects that the cooling load value of the WCAH and/or the WCPL is also increasing. Thus, the control system can raise the chilled water differential pressure setpoint based on one or more variables. By way of example, such variables can include the actual cooling load value of the WCAH and/or the WCPL, the temperature of the chilled water at the WCAH and/or the WCPL, the ambient temperature and the like.

As a result of the new chilled water differential pressure setpoint, the control system can be configured to inform one or more of the chilled water system pumps, either directly, through a local control panel or otherwise, to increase their pumping capacity. Consequently, the flow of chilled water through the AHUs and/or the process cooling loads can increase to satisfy the cooling demand.

Alternatively, if the cooling load value of the WCAH and/or the WCPL is decreasing, the control system may be informed that the cooling requirement is decreasing. Under such scenarios, an adequate flow of chilled water is being delivered to the AHUs and the process cooling loads. Thus, the chilled water differential pressure setpoint can be maintained or reduced to improve the energy efficiency of the system. If the differential pressure setpoint is lowered, the control system can be configured to direct one or more of the chilled water system pumps, either directly, through a local control panel or otherwise, to decrease their pumping capacity accordingly.

In addition to or in lieu of resetting the chilled water differential pressure setpoint, the control system can be configured to reset the chilled water supply temperature setpoint. Like the chilled water differential pressure setpoint, the chilled water supply temperature setpoint can be reset using the magnitude and direction of the system's cooling loads. As discussed, the cooling loads for a facility can be assessed using one or more methods, such as, for example, a Worst Case Air Handler (WCAH) or a Worst Case Process Load (WCPL) control logic scheme. However, it will be appreciated that a system's cooling loads may be evaluated and monitored using one or more other types of control logic schemes.

In some implementations, the control system can be configured to coordinate the reset strategies for the chilled water differential pressure setpoint and the chilled water supply temperature setpoint to further improve the energy efficiency of the cooling system. Thus, in response to rising cooling loads, the control system may increase the chilled water differential pressure setpoint and/or lower the chilled water supply temperature setpoint.

The control system may be configured to determine a desired reset strategy involving two or more setpoints that satisfies the rising cooling demands and increases (or maximizes) the overall energy efficiency of the cooling system. For example, in one arrangement, the control system can modify both the chilled water differential pressure setpoint and the chilled water supply temperature setpoint to satisfy a particular increasing or decreasing cooling load.

If the chilled water supply temperature setpoint is changed, the operational details of one or more chillers may need to be modified. For example, the speed of a variable speed centrifugal chiller can be directly and/or indirectly adjusted to alter the temperature of chilled water discharged therefrom. The energy efficiency of a variable speed centrifugal chiller can improve substantially when its speed is reduced. Additionally, a higher chilled water temperature can increase the efficiency of other types of chiller systems, such as, for example, absorption, rotary screw, scroll, reciprocating and the like.

To compensate for the warmer chilled water being discharged by the chiller units, the control system can direct the differential pressure of the chilled water system pumps to increase. However, as the chilled water temperature increases, the energy efficiency benefit to the chillers may be offset by the energy efficiency burden to the faster moving chilled water system pumps.

Consequently, the control system can be configured to adjust one or more cooling system setpoints with the operational and energy efficiency characteristics of the various system components in mind. Thus, in one implementation, the control system can employ a strategy that increases the chilled water differential pressure as the cooling loads begin to rise. Such a control system can be configured to begin reducing the temperature of the chilled water if cooling loads continue to rise above a particular threshold. It will be appreciated that in other implementations, the control system can take a different adjustment strategy in response to rising or declining cooling loads. For example, the control system can be configured to reduce the chilled water temperature before or at the same time as it increases the chilled water differential pressure. Alternatively, the control system can be configured to only adjust the chilled water differential pressure or temperature, but not both.

There may be various reasons why a control system may adjust the chilled water differential pressure setpoint before adjusting the chilled water temperature setpoint. Typically, increasing the chilled water flowrate can provide a relatively easy and quick way to stabilize rising cooling loads. Thus, adjusting the chilled water differential pressure setpoint can help maintain the occupant comfort level in a particular facility and/or sustain the desired level of heat removal from one or more process cooling loads. Further, quick stabilization of cooling loads may provide a more energy efficient solution, as the cooling system is not permitted to deviate too far from the target operational setpoints.

By way of example, if a control system attempts to meet rising cooling loads by decreasing the chilled water temperature, there may be a relatively long time delay (e.g., 15 to 45 minutes or more) for the colder chilled water to reach a process cooling load (e.g., AHU). During such a delay, the cooling loads may have continued to increase, and thus, may have further deviated from their target levels. As a result, the control system may have to further decrease the temperature of the chilled water, resulting in even higher energy costs. Moreover, when the colder chilled water actually reaches a cooling load, the chilled water may be too cold, causing one or more control valves that regulate the flow of chilled water to modulate to a more closed position. Such flow restrictions and flow variations can complicate the operation of the cooling system and/or decrease its energy efficiency.

Another reason why a control system is configured to initially modify the chilled water differential pressure setpoint in response to rising cooling loads may be related to energy efficiency. Variable speed centrifugal chillers are typically energy efficient when the system's cooling loads are low, the chilled water supply temperature is high and the condenser water supply temperature is low. For example, a chiller can consume 0.20 kW per ton or less under such operating conditions. Thus, is several implementations, the control system is adapted to maintain the chilled water supply at a relatively warm temperature, especially when compared to the temperature of chilled water discharged by a comparable constant speed chiller. The efficiency of constant speed chillers, absorption chillers and direct expansion (DX) cooling systems can also be increased by raising the temperature of the fluid being supplied in order to meet the cooling load. In order to improve the energy efficiency of the cooling system, the control system can increase the chilled water differential pressure setpoint to compensate for the higher chilled water temperature setpoint. Consequently, regardless of the number and types of setpoints that a cooling system comprises, a control system can be configured to adjust one or more of those setpoints in an effort to maintain occupant comfort and/or achieve a desired level of cooling at the process cooling loads, while reducing energy costs.

As discussed, the control system can be configured to adjust one or more setpoints related to the cooling tower units, either in addition to or in lieu of any modifications to other chiller plant or AHU setpoints. In some implementations, for example, the condenser water supply temperature setpoint and/or the condenser water flowrate and/or temperature differential setpoint can be reset.

Significant improvements to the energy efficiency of variable-speed chillers can be realized when the chilled water supply temperature is relatively high and/or the condenser water supply temperature is relative low. Additionally, lower condenser water temperatures can increase the efficiency of other types of chiller systems, such as, for example, absorption chillers, rotary screw chillers, scroll chillers, reciprocating chillers, DX cooling systems and the like. Thus, based on the cooling load of the chillers and/or the energy efficiency of the cooling tower equipment, the control system can modify the condenser water supply temperature setpoint. For instance, when the cooling loads are comparatively low and the surrounding ambient air is relatively cool and dry, the control system can improve the energy efficiency of the cooling system by strategically lowering the condenser water supply temperature setpoint or the condensing temperature setpoint for DX systems.

Moreover, control systems that are configured to adjust one or more operational setpoints based on cooling load values and energy optimization routines can eliminate or reduce errors that are common in other types of systems. For example, some control systems may alter the operation of a cooling system based on one or more unreliable sensors which require frequent calibration (e.g., relative humidity sensors, wet bulb temperature sensors, etc.).

Furthermore, the control system can be configured to regulate the condenser water flowrate setpoint and/or the setpoint for the desired temperature differential across the condenser system. Adjustment of the condenser water flowrate setpoint and/or the setpoint for the desired temperature differential across the condenser system can be based on the cooling load of the chillers and/or any other operational parameter. In some implementations, for example, when the cooling loads are relatively light, the control system can lower the condenser water flowrate setpoint and/or increase the temperature differential setpoint in an effort to improve the cooling system's energy efficiency. As a result, one or more variable speed condenser water pumps can be slowed to reduce wasted pump energy and/or improve cooling tower efficiency.

In some implementations, the reduced speed of the condenser water pumps may lead to higher temperature condenser water exiting the chillers. However, the reduced condenser water flowrate setpoint can improve cooling tower efficiency and capacity, as the flowrate of condenser water passing therethrough is also decreased. If cooling loads increase, the control system can be configured to increase the condenser water flowrate setpoint or reduce the temperature differential setpoint in an effort to make the chillers more energy efficient. As discussed in relation to the adjustment of other cooling plant setpoints, the timing and extent of setpoint adjustments can be advantageously regulated by the control system based on the operational characteristics of the various system components.

Air Handling Unit (AHU) Optimization

A cooling system's control system can be configured to adjust one or more operational setpoints of an AHU, either in addition to or in lieu of its ability to modify chiller and/or cooling tower setpoints. For example, in some implementations, the control system can regulate the AHU's static pressure setpoint and the supply air temperature setpoint. Moreover, the control system may be configured to regulate an AHU in other ways. For instance, as discussed in greater detail below, the control system can implement demand limitation sequences of operation and/or a cooling load-based coasting cycle routine.

The control system can be configured to reset an AHU's static pressure setpoint based on AHU load, temperature data for target zones within the cooled facility and/or one or more other variables. In several implementations, if the control system detects that the overall system and/or AHU cooling load is increasing or decreasing, the static pressure setpoint for one or more AHUs within the cooling system can be adjusted. For example, when the cooling load is rising, the control system can increase the static pressure setpoint of one or more AHUs. As the static pressure setpoint in increased, the supply air flowrate of a particular AHU can be increased in an attempt to satisfy the cooling demand in the portions of the facility conditioned by that AHU.

Alternatively, if the control system senses that the cooling load is decreasing, the static pressure setpoint for one or more AHUs can be lowered accordingly. Consequently, the supply air flowrate of such AHUs may be decreased, thereby reducing the amount of wasted energy.

In other implementations, the control system can be configured to reset an AHU's cold deck and/or cold plenum temperature setpoint, either in addition to or in lieu of adjusting an AHU's static pressure setpoint. Control of an AHU's cold deck and/or cold plenum temperature setpoint can be based on the AHU load, one or more operational parameters of an AHU fan or blower (e.g., magnitude or direction of fan speed or volume) or the like. For example, if the speed of an AHU fan and/or the air delivery volume is increasing, the cooling load can also be increasing, and vice versa.

In response to increasing or decreasing fan speed or fan volume, the control system can be configured to modify the supply air temperature setpoint accordingly. Thus, when an AHU's fan speed and/or volume is increasing, the control system can be adapted to lower the supply air temperature setpoint for that AHU. Decreasing the supply air temperature setpoint can cause the cooling capacity delivered to the conditioned spaces (e.g., offices, conference rooms, other rooms, etc.) of a facility to increase, thereby satisfying the increased cooling demand in such spaces.

Conversely, when an AHU's fan speed or volume is decreasing, the control system can be configured to recognize that the cooling load for that AHU is either also decreasing or is currently under control. Thus, in response, the control system can raise the supply air temperature setpoint to reduce energy waste.

In some implementations, it may be advantageous from an energy efficiency standpoint for the supply air temperature setpoint to operate at higher levels. For example, a higher supply air temperature setpoint typically requires less and/or warmer chilled water being delivered to the cooling coils of an AHU. Thus, the energy efficiency of the chiller plant, cooling tower plant and/or the overall cooling system can be increased. In addition, a higher supply air temperature can reduce the magnitude of the dehumidification load of an AHU, which may result in additional energy cost savings.

However, it will be appreciated that there are practical limitations regarding how high the supply air temperature setpoint can be set. For instance, if the supply air temperature is excessively high, the AHU fans can be required to deliver a greater volume of conditioned air to the various offices, rooms and other spaces within a facility. Thus, the amount of additional fan energy required to satisfy a cooling demand and/or process cooling load may outweigh any energy savings realized by the chiller plant and/or cooling tower systems. In addition, the additional noise and other problems associated with delivering a greater volume of air through a facility's duct system may be undesirable.

Moreover, the control system can be configured to implement demand limitation sequences of operation which permit reduction in power consumption and energy waste at various stages of AHU operation (e.g., at start-up, during normal operation, etc.). Such sequences can be adapted to limit fan speeds during various portions of a day or based on a command from the control system to further reduce energy waste.

As discussed, the control system can also be configured to implement a cooling load-based coasting cycle routine to reduce cooling demands prior to powering down one or more AHUs. Under such an arrangement, the control system can measure the cooling load magnitude to determine when one or more AHUs should be operated in a coasting cycle mode. When an AHU is operated in accordance with a coasting cycle routine, the AHU's fan speed and cooling output can be advantageously limited in order to lower energy consumption. In some implementations, such a coasting cycle operation can start to reduce capacity and fan energy during the last 30 minutes or 60 minutes prior to the end of a scheduled occupancy period. However, it will be appreciated that implementation of the coasting cycle operation may begin more than 60 minutes or less than 30 minutes prior to the end of a scheduled occupancy period.

Packaged Control System

As discussed, a control system can be configured to integrate, interface and communicate with a wide variety of air conditioning and other process cooling equipment. In addition, a hardware platform can be used to facilitate the communication between the different subsystems incorporated into such a control system. In some implementations, the necessary optimization software and hardware can be incorporated into a single computer or other central processing unit (CPU). If properly configured to interface with individual field control panels and other control devices included in a cooling system, such a computer or CPU can obtain and process the necessary operational information from the various cooling system components, determine a desired set of operational setpoints and communicate these setpoints to the appropriate cooling system components. The cooling system components can be adapted to receive such communications from the computer or CPU and make the necessary operational adjustments.

Thus, the control schemes described herein can be incorporated into an existing cooling system that comprises a variety of components and individual control subsystems. For example, a cooling system may include field control panels made by one or more different manufacturers. Further each field control panel or similar control device can utilize a different control scheme to operate a particular cooling system component, system or subsystem. Therefore, the control system described herein can advantageously provide a single platform that can be applied to control systems which are configured differently and/or are manufactured by different control system providers.

Typically, field processing panels for individual cooling system components do not possess the required processing power to implement detailed operational sequences. Further, the cost to upgrade such underpowered field panels so that they are capable of implementing detailed operational sequences can be significant. Although most field panels may be configured to control the individual cooling plant components to which they are attached, they normally lack the ability to make operational changes in light of the desire to reduce energy waste in the larger cooling system.

As discussed, the control system can be configured to integrate with a variety of system equipment, components, controls and the like. Therefore, the various implementations of the control system disclosed herein can eliminate the time, effort and expense typically required to develop and implement the desired operational sequences and schemes on a site by site basis. For example, the implementation of such site-specific endeavors can require valuable engineering and programming time and effort, system testing, commissioning time and the like.

Further, the control system can be configured to visually display various data related to the operation and optimization of the cooling on graphic screens and/or other user interface devices. The control system can allow users to customize the operation of a cooling system to meet their individual air conditioning needs. In some implementations, users can be permitted to enter their operational preferences through the graphic screens or other user interface devices.

With reference to FIG. 5, a cooling system 10 can comprise one or more local control panels 502, 506, 510, 514 which may be associated with various cooling system components. For example, in the illustrated implementation, local control panels 502, 506, 510, 514 are provided for the chiller system, process cooling unit 110, AHU 120 and cooling tower system. It will be appreciated that local control panels can be provided for other devices, apparatuses and/or systems associated with the cooling system 10. In addition, a particular device or system (e.g., the chiller system, cooling tower system, etc.) can include more than one control panel. The total number of local control panels within a cooling plant 10 may depend on the size, complexity, age, capacity and other characteristics of a particular cooling system 10.

As discussed, local field control panels 502, 506, 510, 514 may not possess a requisite amount of processing power, memory and/or general computing capacity to adequately operate the various cooling systems components (e.g., chillers 50, chilled water pumps 80, process cooling units 110, AHUs 120, condenser water pumps 240, cooling towers 210, etc.) according to a desired optimization control strategy (e.g., control strategy to reduce energy waste, improve system performance, etc.). Further, local control panels 502, 506, 510, 514 may not provide a user-friendly or graphical interface, making it additionally difficult or complicated to understand, adjust and/or operate them. Typically, such local control panels 502, 506, 510, 514 may comprise their own control routines that manage one or more operational aspects of the corresponding equipment or system. For example, the control panels 502, 506, 510, 514 may be configured to start, stop and/or vary the speed of a pump, chiller or the like.

Depending on the cooling system details, the local field control panels 502, 506, 510, 514 can be new and/or existing. In addition, the local field control panels 502, 506, 510, 514 can be provided by from a single manufacturer. However, in other implementations, the control panels can be manufactured from two or more different manufacturers. As discussed, the control system 560 disclosed herein can be configured to communicate and interact with all field control panels 502, 506, 510, 514, regardless of type, manufacturer and/or other characteristics.

As illustrated in the schematic of FIG. 5, the various local control panels 502, 506, 510, 514 can be configured to communicate with each other, the control system computer 568, an operator interface unit 530, a translator system 564 or any other component of the cooling system using one or more connections 520. The connections 520 can be hardwired and/or wireless, such as, for example, network interface cables, fiber optic cables, WiFi connections, internet connections and the like.

With continued reference to FIG. 5, the cooling system 10 can comprise one or more operator interface units 530. Operator interface units 530 can be configured to provide operational data and other information regarding the cooling system 10 to field engineers, operators and other staff members. In one implementation, an operator interface unit 530 can comprise a personal computer which lacks the processing power, memory and computing capability to modify the operation of the cooling system 10. However, it will be appreciated that an operator interface unit 530 can be configured to allow a user to modify one or more aspects of the cooling plant's operation. For example, the operator interface unit 530 can permit a user to turn a component on or off, to modify a component's speed, to modify system setpoints and the like.

As shown, a control system 560 can comprise a main processor 564 and a translator system 568. The main processor 564 can include a personal computer, a CPU, a network computer and/or any other processor which is configured to monitor and manage the operation of the cooling system 10 according to a desired control strategy.

An operator interface unit 530, a main processor 564 and/or any other component of the control system 560 can be advantageously configured to be remotely viewed and/or operated via the internet, a modem or other networking device.

A translator system 568 can be included in a control system 560 to allow the main processor 564, and thus the entire control system 560, to properly receive and provide data from and to the various local field control panels 502, 506, 510, 514. The translator system 568 may comprise processors and/or software that are configured to convert the native computer languages of the various control subsystems (e.g., local field control panels, other control devices, etc.) into one or more languages that the main processor 564 can understand. Likewise, the translator system 568 can also be configured to convert the language of the new control system 560 to the native language of the various control subsystems.

The translator system 568 can be a commercially available system (e.g., off the shelf, etc.) or a customized system designed for a specific application. As illustrated in FIG. 5, the translator system 568 can communicate with the main processor 564 using one or more hardwired or wireless connections 566.

The main processor 564 and/or translator system 568 can be located at the site of the cooling system. Alternatively, the main processor 564 and/or translator system 568 can be located in a remote location and connected to the control system via one or more hardwired and/or wireless connections (e.g., internet, WiFi, phone modem, etc.).

The main processor 564 can obtain real-time data regarding the operation of cooling system components (e.g., chillers, pumps, AHU fans, etc.) from the various field control panels 502, 506, 510, 514. As discussed, if needed, these data can be converted by a translator system 568 into a language or format that the main processor 564 can understand. The energy optimization logic contained by the main processor 564, in the form of one or more software and/or hardware packages installed thereon, can use the load based data received from the various local control panels 502, 506, 510, 514 to determine a set of desired operational setpoints. These setpoints can then be sent to the corresponding local control panels 502, 506, 510, 514, which can modify the operation of one or more cooling system components.

Since optimization calculations can be performed by the main processor 564, the need to upgrade or perform major modifications to the local control panels 502, 506, 510, 514 can be eliminated. In some implementations, the main processor can be equipped with sufficient memory and computing power so as to reduce or minimize processing time.

Software

The software that enables a main processor 564 to operate a cooling system 10 in accordance with a load based optimization strategy can be pre-programmed, pre-tested and/or pre-commissioned before a control system is installed. Consequently, valuable time and labor costs can be reduced.

The control system software can be used to optimize or otherwise control one or multiple cooling plant systems. In one implementation, the software includes three different modules: the first directed to chiller plant system optimization, the second directed to cooling tower system optimization and the third directed to AHU and/or process cooling system optimization. It will be appreciated that more or fewer modules can be included in a particular software configuration. Thus, software can be configured to regulate one, two or more cooling plant systems at any one time.

Therefore, owners may be able to implement one, two or more optimization routines, as desired or needed for a particular cooling system. As discussed, in some implementations, an optimization routine can be configured to operate in harmony with one or more other routines. Alternatively, when being used to control a particular cooling system, an optimization routine can ignore one, some or all of the other routines.

Figure 6A:
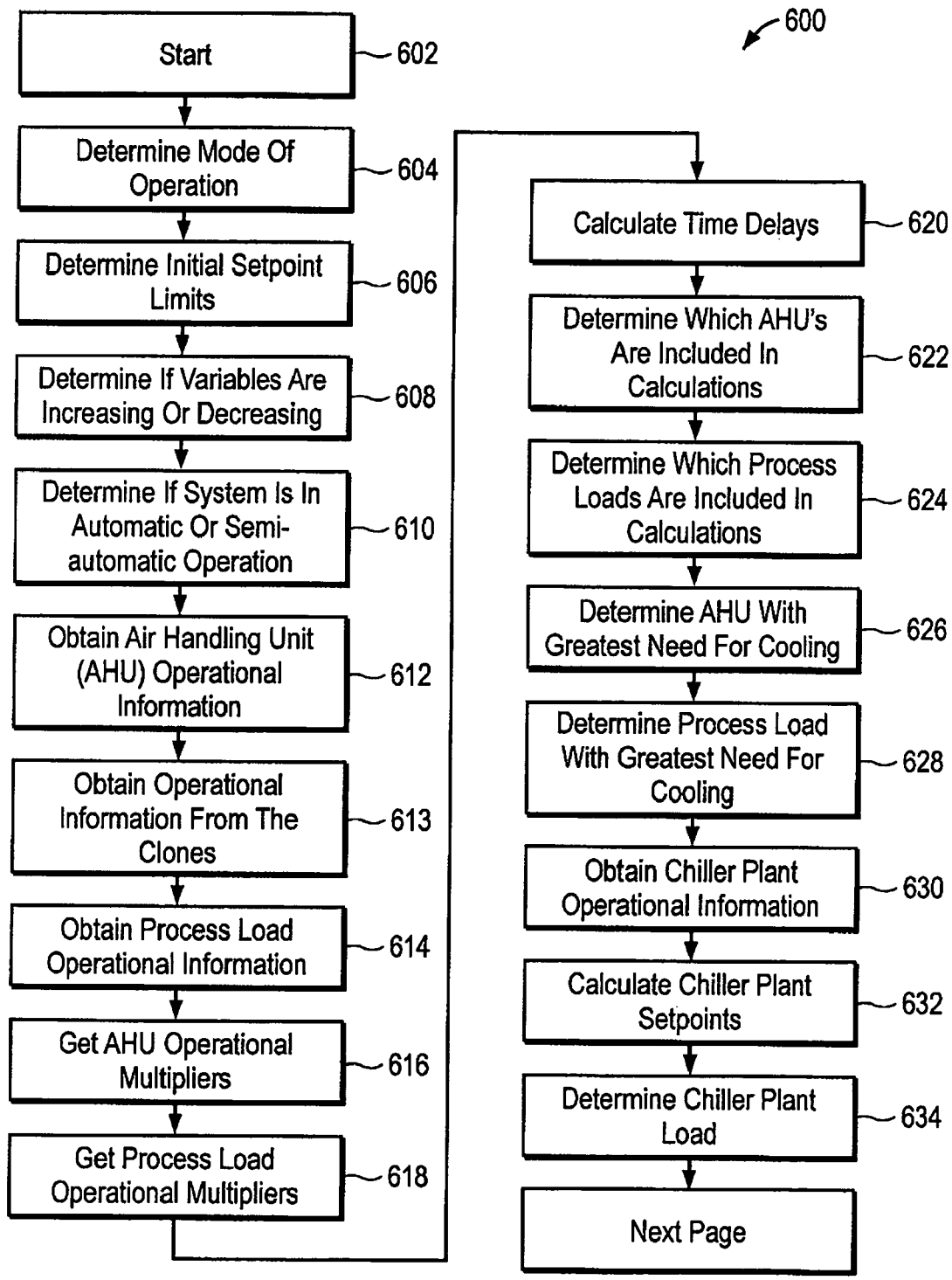
FIG. 6A is the first part of a flowchart illustrating the various steps of a chiller plant optimization routine according to one implementation.

FIG. 6A is a flowchart of one implementation of an optimization routine 600 for a chiller plant. Once the optimization routine is started 602, the mode of operation can be determined 604. In some implementations, this can comprise searching for the last known mode of operation or searching for preprogrammed instructions. Alternatively, the routine may prompt a user to select a mode of operation.

Next, the routine can determine the initial setpoint limits 606. Thus, there may exist certain low and high setpoint thresholds regarding the operation of one or more cooling system components that may not be exceeded.

As discussed, using the data provided by the various field control panels, the routine can then determine if certain cooling load variables are increasing or decreasing 608. After determining whether the cooling system is in automatic or semi-automatic operation mode 610, the routine may obtain operational information regarding one or more AHUs 612 or zone terminals 613 and process load units 614. For example, the static pressure or the temperature of the supply air, the temperature at a process load unit and the like can be obtained.

The routine can then get operational multipliers for one or more AHUs and process load units 616, 618. As shown in the flowchart, the multipliers can be used to calculate corresponding time delays. Next, a determination can be made as to which AHUs and/or process cooling load units should be used to in the calculation of the critical cooling loads 626,

628, such as, for example, the Worst Case Air Handler (WCAH) or the Worst Case Process Load (WCPL).

With continued reference to FIG. 6A, based on the chiller plant operational data it obtains 630, the routine can calculate one or more chiller plant setpoints 632, such as, for example, the chilled water temperature, chilled water system pump differential pressure and the like. As discussed, the setpoints can be configured to improve the operational efficiency of the cooling system. Next, the routine can determine the chiller plant load 634.

Figure 6B:
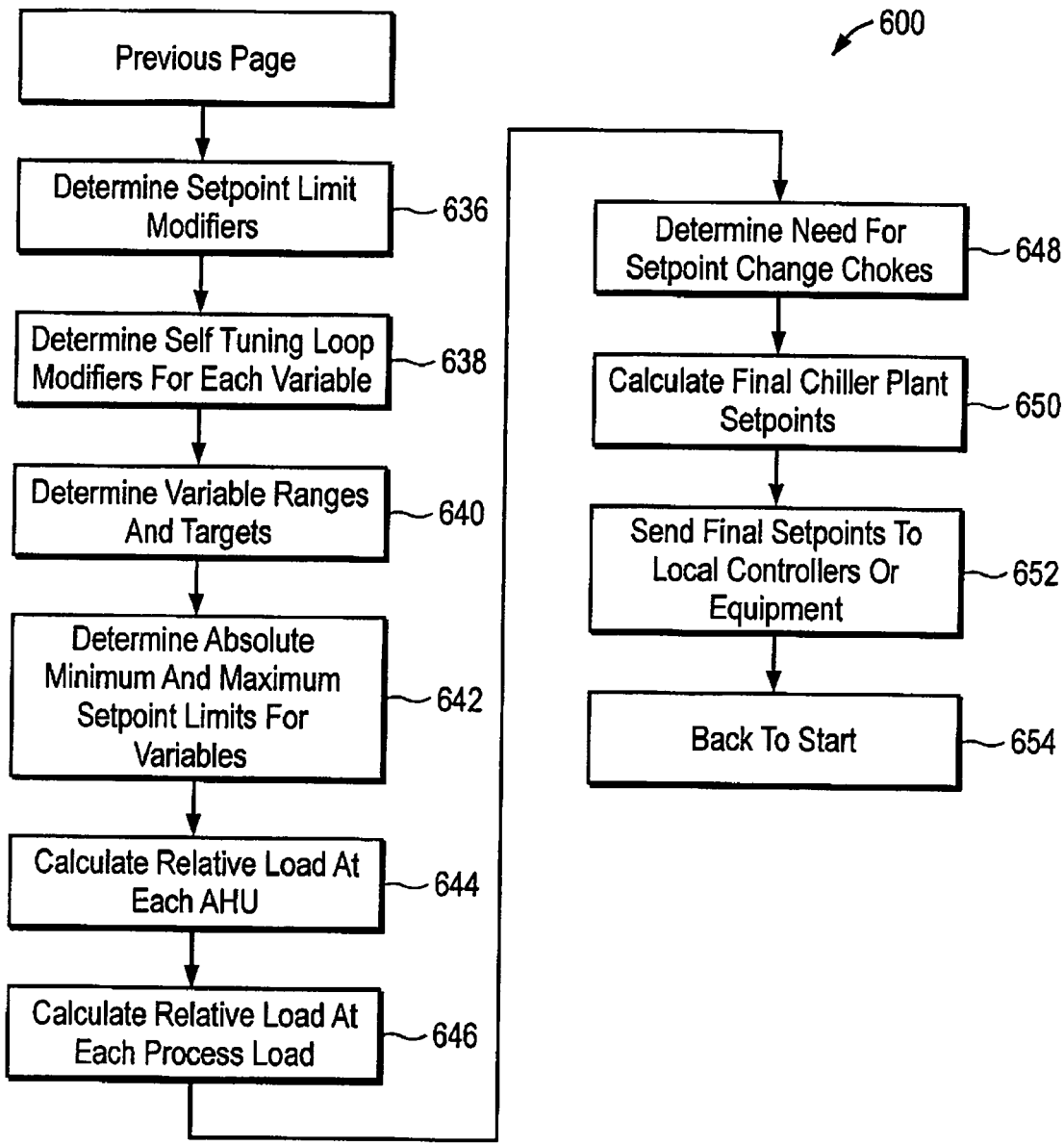
FIG. 6B is the second part of the flowchart of FIG. 6A.

With reference to FIG. 6B, the setpoint limit modifiers, the self tuning loop modifiers for each variable, the variable ranges and targets and the absolute minimum and maximum setpoint limit for the variables can then be determined 636, 638, 640, 642.

After the relative load at each AHU and process load unit has been calculated 644, 646, the routine can determine the need for setpoint change chokes 648. Once the final chiller plant setpoints have been calculated 650, they can be sent to the appropriate local controllers or equipment 652.

It will be appreciated that in other implementations, the control schemes and systems can be more or less complex than described above with relation to FIGS. 6A and 6B. In addition, the routine can be modified to permit the control system to operate the chiller plant and/or any other cooling system component differently.

Example

The following is one implementation of the detailed sequence steps that the control systems can use to reduce the overall energy costs of a cooling system.

Cooling Plant

I. Sequences

A. Integral Windup Prevention

1. Typical sequence for control loops: When the HVAC systems are shut down each night, and again when the systems are started up each morning, all integral terms in the controller are zeroed out so that there is no residual "integral windup" to interfere with normal system operation.

2. Similarly, when time delays are invoked that lock in a specific setpoint or speed, the tendencies of the control system will be to windup the integral term. When the time delay is released, the integral could drive the setpoint to one extreme or the other.

3. At the end of the time delay period, when the normal sequences are about to take over control of the variable, the integral term shall be zeroed out as required to maintain stable system operation.

B. Modes of Operation

1. There are ten (10) software switches that can be configured to change setpoint limits and rates.

2. These switches or triggers can be described in the body of the text in the section that is affected by the trigger.

3. Triggers or switches may be tripped by time of day, temperatures, WCAHLoad, RAT, OSAT, WCAH, WCAH-SCD or other variables as described in the section that they are applicable.

4. According to this implementation, a description of the 10 different modes includes the following. It will be appreciated that in other implementations, more or fewer modes can:

a. Startup Mode (Mode 1)
　b. Weekday Mode (Mode 2)
　c. Night Mode (Mode 3)
　d. Weekend Mode (Mode 4)
　e. TES Precool Mode (Mode 5)
　f. TES Charge Mode (Mode 6)
　g. TES End of Charge Mode (Mode 7)
　h. TES Discharge Mode (Mode 8)
　i. 24/7 Mode (Mode 9)
　j. Unknown Mode (Mode 10)

C. Setpoints and Virtual Points

1. Each piece of equipment or system can have its own setpoints and virtual points so each piece of equipment or system can be tuned separately.

D. To Determine if a Variable is Increasing or Decreasing

1. The system determines whether the load is increasing or decreasing. The system treats increasing loads differently than it treats decreasing loads.

2. The system develops a 6 minute sliding average for each affected variable, taking six samples at the rate of one sample every 60 seconds. The system subsequently compares the 6 minute sliding average to the current most recently read value of the variable.

a. If the current most recently read value of the variable is greater than the 6 minute average value of the variable, the variable is increasing.

b. If the current most recently read value of the variable is less than the 6 minute average value of the variable, the variable is decreasing.

c. If value is the same, the system can be configured to assume that the load is increasing.

E. Semi-Automatic Control Mode

1. Description of this Mode a. This mode can be invoked either manually by an operating engineer, or automatically by the control routine that will have fixed or adjustable (by the operators) setpoints, for 6 stages of load response. The chilled water supply temperature and chilled water differential pressure setpoint shall be adjustable in each of these stages.

2. Automatic Selection of this Mode a. A software "Auto-Manual" Switch can be provided to allow the operators to select whether they want this routine to function automatically or manually.

3. Manual Selection of this Mode a. If the switch is in the manual mode, the setpoints for the chillers and secondary chilled water pumps can be commanded as described for the selected stage of load.

F. Worst Case Air Handler (WCAH) Control Feedback

1. WCAH Discussion a. To reduce system energy waste while maintaining occupant comfort, the system examines each individual AHU and determines the position of the chilled water cooling coil control valve and how far above or below the desired supply air temperature setpoint the AHU is operating.

b. Based on the conditions of the various AHUs, the chilled water supply differential pressure setpoint will be increased, decreased or left alone.

c. The control system evaluates the most recently read (MRR) actual supply air temperature and the MRR supply air temperature setpoint, along with the MRR position of the chilled water valve for each AHU, to determine whether an AHU is satisfied, or is in need of more or less cooling capacity. The selected AHUs can be periodically polled for the required information (e.g., AHU on/off status, AHU supply air temperature (SAT) setpoint, actual supply air temperature, chilled water cooling coil control value position and/or other information). For example, the selected AHUs can be polled every minute. In other implementations, the polling frequency can be less or more than a minute.

d. The control system can calculate a value for each AHU which describes the chilled water valve position and the temperature offset from a particular setpoint. This can be referred to as the Worst Case Air Handler (WCAH) value.

e. The control system can poll each selected AHU to obtain information that may be used to calculate the WCAH and/or WCAHSCD values. By high signal selecting the WCAHSCD information that is being calculated by the control system for each of the selected AHUs, the control system can then determine which AHU imposes the greatest need for additional cooling on the system.

f. The AHU that is furthest from the setpoint (on the high side) after the Size, Criticality and Distance (SCD) multipliers have been incorporated can be referred to as the Worst Case Air Handler (WCAHSCD). In one implementation, a 3-minute continuous rolling average (e.g., 10 samples at 18 second intervals) of the calculated and high signal selected WCAHSCD value can be the controlling variable for the Chilled Water Differential Pressure (CHW DP) setpoint reset routine.

i This does not necessarily require that the system poll every 18 seconds. Rather, the processor can be looking at the MRR Value of WCAHACD every 18 seconds and updating the rolling average every 18 seconds.

ii Since the control system may calculate the worst case AHU situation, other AHUs that are being used in the calculation may have a smaller offset from the desired setpoint.

g. If the calculated and high signal selected (HSS) AHU WCAHSCD value indicates that the supply air temperature is stable and the WCAHSCD value is at the WCAH setpoint value, the AHU system is deemed to be satisfied. Consequently, only minimal changes to the chilled water system are typically required.

h. If the HSS WCAHSCD value is above the WCAH setpoint value, the control system can start increasing the chilled water supply differential pressure setpoint to provide slightly more water to the AHU. This can result in colder air being provided by the AHU, and a corresponding drop in the supply air temperature and WCAHSCD value.

i. If the HSS WCAHSCD value is below the WCAH setpoint value, the control system can start decreasing the chilled water supply differential pressure setpoint to provide slightly less water to the AHU. This can result in the chilled water valve opening (e.g., if it was less than 100% open) and slightly warmer air being provided by the AHU. Consequently, a corresponding increase in the WCAHSCD value can be realized.

2. Calculating the Worst Case Air Handler (WCAH) Value a. If an AHU is operating, and that AHU has been selected for use in this control routine, information from that AHU can be incorporated in the WCAH/WCAHSCD routines. Even if an AHU is not selected for use in the WCAH/WCAHSCD control logic, the values for WCAH/WCAHSCD can be calculated and displayed.

b. In one implementation, a calculated value is determined that will give an indication of the chilled water cooling coil valve position and the extent above the supply air temperature setpoint that an AHU is operating.

i Such a calculated value can be used as the worst case air handler or "WCAH" value, which, when multiplied by the size, criticality and distance multipliers (WCAHSCD) can be used to control the chilled water differential pressure setpoint.

ii For example, if the chilled water cooling coil control valve for an AHU is greater than 70% open, a proportional table statement for the actual supply air temperature that is below or above the supply air temperature setpoint can be developed. In some implementations, the extent to which the chilled coil control valve position may be referred to as the chilled water valve proportional switch setpoint.

iii Alternatively, if the chilled water cooling coil control valve for an AHU is less than 70% open, the supply air temperature (SAT) offset from setpoint in the WCAH value may not be included. That part of the WCAH calculation can be set to zero for that AHU, so that only the valve position is reported as the WCAH value.

c. A proportional table can be developed for the actual supply air temperature minus the supply air temperature setpoint. If the SAT is below or above the SAT setpoint (e.g., by $-2°$ F. to $12°$ F.), a proportional calculated value of $-200$ to $1200$ can be provided.

i This can equate to a proportional table statement that multiplies the setpoints ($-2°$ F. to $12°$ F.) by 100 in the programming code.

ii This calculated value of $-200$ to $1200$ can be added to the actual chilled water cooling coil control valve position command of 0 to 100.

iii Thus, in one implementation, the result will be a calculated value of $-129$ to $+1300$. Some examples include:

a) If the valve is 0% open and the supply air temperature (SAT) is $2°$ F. below the setpoint, the WCAH value from that AHU will be zero (the valve position only), since the valve position is less than 70% open.

b) If the valve is 60% open and the SAT is $2°$ F. below the setpoint, the WCAH value from that AHU will be 60 (the valve position only), since the valve position is less than 70%.

c) If the valve is 71% open and the SAT is $2°$ F. below the setpoint, the WCAH value from that AHU will be $-129$ ($71+-200=-129$).

d) If the valve is 80% open and the SAT is $1°$ F. below the setpoint, the WCAH value from that AHU will be $-20$ ($80+-100=-20$).

e) If the valve is 100% open and the SAT is $2°$ F. below the setpoint, the WCAH value from that AHU will be $-100$ ($100+-200=-100$).

f) If the valve is 100% open and the SAT is $3°$ F. above the setpoint, the WCAH value from that AHU will be 400 ($+100, +300=400$).

g) If the valve is 71% open and the SAT is $8°$ F. above the setpoint, the WCAH value from that AHU will be 871 ($71+800=871$).

iv For each AHU, the SCD multipliers can be applied to obtain the WCAHSCD value. The WCAHSCD values from all of the selected AHUs can then be high signal selected and used in the differential pressure (DP) control routine.

v The chilled water supply differential pressure setpoint can be desirably controlled in a manner that maintains the highest WCAHSCD signal at a virtual setpoint value (e.g., 150).

3. WCAH Size, Criticality and Distance (SCD) Multipliers a. In order to provide flexibility in system operations and to recognize that not all AHUs are similar (e.g., an AHU may have a different capacity than the average AHU, an AHU may be more or less critical than the average AHU, an AHU may be closer or further away from the chiller plant than the average AHU, etc.), the calculated WCAH signal for each AHU desirably has multipliers that an operating engineer or other individual can manipulate.

b. In one implementation, once the WCAH value for each AHU has been calculated (e.g., based on the valve position and the difference between the supply air temperature and the supply air temperature setpoint), final multipliers can be applied to determine the WCAHSCD. In one implementation, the control system comprises 3 final multipliers. The WCAHSCD along with the "unmultiplied WCAH value" can be stored for use in the control routine.

c. For example, the final multipliers can include: (1) the size of the AHU unit, (2) the level of criticality of the AHU unit and (3) the distance of the AHU from the cooling plant. In one implementation, the baseline multipliers for each of these items is a value of 1.

d. AHU Size Multiplier: if an AHU is substantially smaller or larger than the average AHU in a particular cooling system, the operating staff can vary this multiplier between 0.8 and 1.2. This can alter (e.g., increase or decrease) the effect that the unit has on the chiller plant resets.

i For example, using a 0.8 multiplier can reduce the effect of an AHU on the chiller plant by keeping the chilled water differential pressure setpoint lower and/or the CHWS temperature higher. In one implementation where a 0.8 multiplier is used, the AHU can actually operate 0.88° F. above the setpoint when the AHU is reporting a WCAH value of 150. Normally, an AHU reporting a WCAH value of 150 may indicate that the AHU is 0.5° F. above the setpoint.

ii Using a 1.2 multiplier can increase the effect of an AHU on the chiller plant by keeping the chilled water differential pressure setpoint higher and/or the CHWS temperature lower. In one implementation where a 1.2 multiplier is used, the AHU can actually operate 0.25° F. above the setpoint when the AHU is reporting a WCAH value of 150. Normally, an AHU reporting a WCAH value of 150 may indicate that the AHU is 0.5° F. above the setpoint.

e. AHU Criticality Multiplier: in one implementation, if an AHU is substantially more or less critical than the average AHU, the operating staff can vary the AHU Criticality Multiplier between 0.25 and 1.75. This will have the effect of making the effect of the AHU unit smaller or larger on the chiller plant resets.

i For example, using the 0.25 multiplier can reduce the effect that that AHU has on the chiller plant. In one implementation where a 0.25 multiplier is used, the AHU can actually operate 5° F. above the setpoint when the AHU is reporting a WCAH value of 150. Normally, an AHU reporting a WCAH value of 150 may indicate that the AHU is 0.5° F. above the setpoint.

ii Alternatively, using the 1.75 multiplier can increase the effect that an AHU has on the chiller plant. In one implementation where a 1.75 multiplier is used, the AHU can operate at or near the exact AHU setpoint when the AHU is reporting a WCAH value of 150, while the chilled water valve is approximately 85% open. Normally, an AHU reporting a WCAH value of 150 may indicate that the AHU is 0.5° F. above the setpoint.

f. AHU Distance Multiplier: in one implementation, the operating staff can vary this multiplier between 0.85 and 1.15, depending on the exact location of a particular AHU (e.g., the AHU's relative distance from the average AHU). Modifying this multiplier can vary the effect that an AHU unit has on the chiller plant resets.

i For example, using an AHU Distance Multiplier of 0.85 can reduce the effect of that AHU on the chiller plant. In one implementation where a 0.85 multiplier is used, the AHU could operate 0.75° F. above the setpoint when the AHU is reporting a WCAH value of 150. Normally, an AHU reporting a WCAH value of 150 may indicate that the AHU is 0.5° F. above the setpoint.

ii Alternatively, using an AHU Distance Multiplier of 1.15 can increase the effect of that AHU on the chiller plant. In one implementation where a 1.15 multiplier is used, the AHU could operate 0.30° F. above the setpoint when the AHU is reporting a WCAH value of 150. Normally, an AHU reporting a WCAH value of 150 may indicate that the AHU is 0.5° F. above the setpoint.

g. Combined effects: such multipliers can provide a facility's operators with the flexibility to tune their chilled water differential pressure (CHW DP) setpoints based on one or more system properties (e.g., site details, system details, etc.), other factors and/or like.

i For example, if an AHU unit is relatively small, not comparatively critical to the operation of the cooling system and/or in close spatial proximity to the cooling plant, the multipliers can be combined to minimize the effects of that AHU unit on the resets. If the unit gets far above the setpoint, it may still have an effect on the system. Advantageously, its effect will not be excluded from the reset schedule logic.

ii Conversely, if an AHU unit is relatively large, comparatively critical to the operation of the cooling system and/or relatively far from the chiller plant, the multipliers can be combined to allow such an AHU unit to have a greater effect on the resets.

h. Limits can be provided for one, some or all multipliers (e.g., those listed herein and/or others) to ensure that operators do not use values that are above or below the numbers shown in the sequence.

i. For example the SCD multipliers would look like this:

(1) Size: smallest—average—largest (2) Criticality: non-critical—average—very critical (3) Distance: very close—average—very far G. The AHUs with the highest WCAH and WCAHSCD values can be tracked. In order to assist in troubleshooting the AHU systems, the operation of the AHUs with the highest WCAH and WCAHSCD values can be tracked. In addition, trends regarding the operation of such units can be developed.

H. Chilled Water System Differential Pressure Control Loop

1. General Discussion: WCAH-Based Reset a. The differential pressure control loop for the chilled water distribution system may consist of the variable speed chilled water supply pumps, having the differential pressure control setpoint reset from the highest of the worst case calculated air handler signal (WCAHSCD) from the air handling units selected for use in this program.

b. In some implementations, it may be possible to select which air handlers are included in the WCAH selection process from a graphic page which depicts the following information for each AHU:

i On/Off status of the AHU;

ii Chilled water valve position command;

iii Supply air temperature setpoints;

iv Actual supply air temperatures;

v Differential between the supply air temperature setpoint and the actual supply air temperature;

vi Calculated WCAH values for each AHU, prior to the application of the multipliers for the Size, Criticality and Distance (SCD);

vii Calculated SCD multiplier for each AHU;

viii Calculated WCAHSCD values for each AHU, after the application of the multipliers for the Size, Criticality and Distance (SCD);

ix Mixed air temperature (if available);

x Return air temperature;

xi Return air temperature setpoint;

xii Fan speed;

xiii Fan speed setpoint;

xv WCAH load value;

xiv Fan Power Usage (e.g., in kW);

xvi Static pressure of each AHU;

xvii Static pressure setpoint for each AHU;

xviii The "selected or deselected" status of an AHU for the WCAH routine;

xix The "selected or deselected" status of an AHU for the WCRAT routine;

c. Initially, all the AHUs can be selected as being included in the selection matrix. In one implementation, AHUs can be easily selected or deselected for the WCAH and WCRAT selection routines from the graphic page depicting information for each AHU. For example, under such a user interface, AHUs can be selected or deselected using a computer mouse (e.g., a simple one, two, three, four or more mouse-click process, etc.).

d. The goal of control system is to minimize or reduce pump energy and chiller energy loss, and promote stable system operation. In some implementations, this can be accomplished by maintaining one of the chilled water valves fully open, while maintaining the worst case AHU slightly above its supply air temperature setpoint. This can be achieved by maintaining the differential pressure at its target setpoint, while varying the chilled water supply temperature.

e. If the High Signal Selected (HSS) WCAHSCD value is below the desired WCAH setpoint (e.g., the SAT is too low), the CHWS DP setpoint PID loops can act to decrease the CHWS DP setpoint. Consequently, this can increase the supply air temperature. An increase in the SAT can increase the WCAHSCD value.

f. If the HSS WCAHSCD value is above the desired WCAH setpoint (e.g., the SAT is too high), the CHWS DP setpoint PID loops can act to increase the CHWS DP setpoint. Consequently, this can decrease the supply air temperature. A decrease in the SAT can reduce the WCAHSCD value.

g. The differential pressure (DP) setpoint can be reset using PID loops by the calculated worst case signal (WCAHSCD) from the selected AHU when the AHUs are operating.

i In one implementation, in order to reduce swings in the process, calculation of the WCAH value from the AHU can be delayed until the cooling plant and the chilled water have been enabled for a desired time period (e.g., 30 minutes). Such process swings can be caused when an air handling unit is started and/or when the supply air temperature is not near the supply air temperature setpoint. Alternatively, the WCAH value can be continuously calculated, as long as it is not used in the reset routine during an initial time period after cooling has been enabled (e.g., 30 minutes).

ii In one implementation, the cooling and chilled water valve can be considered enabled when the chilled water valve has been above 20% open for a 4 minute period and the chiller plant has been providing cooling for 20 minutes. Of course in other implementations, the extent to which the chilled water valve is open and/or the time periods can vary.

iii In some implementations, once a valve is considered to be enabled, the valve will not be considered disabled until the AHU has been shut down or the chilled water valve position is less than 5% open for a 30 minute period.

iv Typically, when an AHU begins to operate, the WCAH and WCAHSCD values can be relatively high. The high WCAHSCD value can cause the chilled water differential pressure (DP) setpoint to reset. However, within 20 to 25 minutes, the AHU may have been under control with no changes to the chilled water system. Thus, unless the inclusion of the WCAHSCD values are delayed for a particular time period, the AHUs that begin to operate can cause a process upset to the cooling system.

h. An initial time delay (e.g., 30 minutes) before including the WCAHSCD signal into the control routine can make the chilled water system less likely to be affected by transient WCAHSCD values on startup, thereby making the chilled water system more stable.

i. In one implementation, in order to determine whether a load is increasing or decreasing, a sliding average of the WCAHSCD value can be calculated (e.g., six minute sliding average in which six samples at the rate of one sample per 60 second interval are taken). Such a calculated WCAHSCD sliding average value can then be compared to the most recent WCAHSCD value.

i The HSS WCAHSCD value can be updated periodically (e.g., once every minute, etc.).

ii If the most recent value of the WCAHSCD is greater than the sliding average value of the WCAHSCD (e.g., six minute sliding average), the load is increasing.

iii Conversely, if the most recent value of the WCAHSCD is less than the sliding average value of the WCAHSCD (e.g., six minute sliding average), the load is decreasing.

j. The Proportional, Integral, Derivative (PID) tuning constants can be placed on the graphic page for these loops, so that the system may be easily tuned without entering the programming code. After the system has been tuned, these PID constants can be removed from the graphic page.

2. Minimum and Maximum Differential Pressure (DP) Setpoint Calculations a. Each mode of operation can be set up with different values for the minimum and maximum Differential Pressure (DP) setpoints. When changing from one mode and another, the control system can be configured so that the DP setpoint in the new mode is equal to the last DP value of the previous mode. When in the new mode, the minimum and maximum DP values of the new mode can be applied. Further, the maximum rate of change limits to the DP setpoint, as required to get the DP setpoint to fall between the minimum and maximum limits of the new mode, can also be applied.

b. The minimum and maximum DP setpoints for each mode can be continuously calculated. When a particular mode is enabled, the new setpoints for that mode can begin to be utilized as the baseline minimum and maximum setpoints from which to start applying the limit modifiers.

c. In one implementation, the operational modes are based on the Mode "X"-based Proportional Minimum and Maximum Differential Pressure Setpoints, as described below.

d. Mode "X"-based Proportional Minimum and Maximum Differential Pressure Setpoint Calculations:

i The Mode "X"-Based Minimum and Maximum Differential Pressure Setpoints can be proportionally reset based on one or more variables selected for use in that particular mode. The variables can include: Outside Air (OSA) temperature, WCRAT, WCAHSCD, time, WCAHLoad, chiller plant tons or any other variable.

ii As the Mode "X"-Based control variable varies between Mode "X" LO and Mode "X" HI:

a) The Mode "X" Minimum Differential Pressure Setpoint (Mode"X" MIN) can vary between Mode"X" MINLO PSID and Mode"X" MINHI PSID.

b) The Mode "X" Maximum Differential Pressure Setpoint (Mode"X" MAX) can vary between Mode"X" MAXLO PSID and Mode"X" MAXHI PSID.

iii These are baseline limits, and thus, may not be final limits. The final limits can be modified by the limit modifiers discussed below.

e. Mode Based Minimum and Maximum Differential Pressure Setpoint Calculations:

f. Startup Mode (Mode 1):

i As the Mode 1 control variable varies between MODE1LO and MODE1HI:

ii The Mode 1 minimum differential pressure setpoint (MODE1MIN) can vary between MODE1MINLO PSID and MODE1MINHI PSID.

iii Further, the Mode 1 maximum differential pressure setpoint (MODE1MAX) can vary between MODE1MAXLO PSID and MODE1MAXHI PSID.

iv In one implementation of this mode, the variables have the following values:
  a) MODE1LO=sS
  b) MODE1HI=sD
  c) MODE1MINLO=sF
  d) MODE1MINHI=sG
  e) MODE1MAXLO=sE
  f) MODE1MAXHI=sR
  iii These limits are baseline, and are not final. The final limits are these limits as modified by one or more limit modifiers.
 g. Weekday Mode (Mode 2)
   As the Mode 2 control variable varies between MODE2LO and MODE2HI:
   a) The Mode 2 minimum differential pressure setpoint (MODE2MIN) can vary between MODE2MINLO PSID and MODE2MINHI PSID.
   b) Further, the Mode 2 maximum differential pressure setpoint (MODE2MAX) can vary between MODE2MAXLO PSID and MODE2MAXHI PSID.
   ii In one implementation of Mode 2, the variables have the following values:
     a) MODE2LO=wS
     b) MODE2HI=wD
     c) MODE2MINLO=wF
     d) MODE2MINHI=wG
     e) MODE2MAXLO=wE
     f) MODE2MAXHI=wR
   iii These limits are baseline, and are not final. The final limits are these limits as modified by the limit modifiers in another section.
 h. Night Mode (Mode 3)
   As the Mode "X" control variable varies between MODE3LO and MODE3HI:
   a) The Mode 3 minimum differential pressure setpoint (MODE3MIN) can vary between MODE3MINLO PSID and MODE3MINHI PSID.
   b) Further, the Mode 3 maximum differential pressure setpoint (MODE3MAX) can vary between MODE3MAXLO PSID and MODE3MAXHI PSID.
   ii In one implementation of Mode 3, the variables have the following values:
     a) MODE3LO=nS
     b) MODE3HI=nD
     c) MODE3MINLO=nF
     d) MODE3MINHI=nG
     e) MODE3MAXLO=nE
     f) MODE3MAXHI=nR
   iii These limits are baseline, and are not final. The final limits are these limits as modified by the limit modifiers.
 i. Weekend Mode (Mode 4)
   As the Mode "X" control variable varies between MODE4LO and MODE4HI:
   a) The Mode 4 minimum differential pressure setpoint (MODE4MIN) can vary between MODE4MINLO PSID and MODE4MINHI PSID.
   b) Further, the Mode 4 maximum differential pressure setpoint (MODE4MAX) can vary between MODE4MAXLO PSID and MODE4MAXHI PSID.
   ii In one implementation of Mode 4, the variables have the following values:
     a) MODE4LO=wnS
     b) MODE4HI=wnD
     c) MODE4MINLO=wnF
     d) MODE4MINHI=wnG
     e) MODE4MAXLO=wnE
     f) MODE4MAXHI=wnR
   iii These limits are baseline, and are not final. The final limits are these limits as modified by the limit modifiers.
 j. TES Precool Mode (Mode 5)
   i The minimums and maximums can be reset based on one or more variables such as cooling load, load previously discharged, ambient conditions, WCAH load and/or other appropriate indicators.
 k. TES Charge Mode (Mode 6)
   i The minimums and maximums can be reset based on one or more variables such as cooling load, load previously discharged, ambient conditions, WCAH load and/or other appropriate indicators.
 l. TES End of Charge Mode (Mode 7)
   i The minimums and maximums can be reset based on one or more variables such as cooling load, load previously discharged, ambient conditions, WCAH load and/or other appropriate indicators.
 m. TES Discharge Mode (Mode 8)
   i The minimums and maximums can be reset based on one or more variables such as cooling load, load previously discharged, ambient conditions, WCAH load and/or other appropriate indicators.
 n. 24/7 Mode (Mode 9)
   i As the Mode "X" control variable varies between MODE9LO and MODE9HI:
   a) The Mode 9 minimum differential pressure setpoint (MODE9MIN) can vary between MODE9MINLO PSID and MODE9MINHI PSID.
   b) Further, the Mode 9 maximum differential pressure setpoint (MODE9MAX) can vary between MODE9MAXLO PSID and MODE9MAXHI PSID.
   ii In one implementation of Mode 9, the variables have the following values:
     a) MODE9LO=24S
     b) MODE9HI=24D
     c) MODE9MINLO=24F
     d) MODE9MINHI=24G
     e) MODE9MAXLO=24E
     f) MODE9MAXHI=24R
   iii These limits are baseline, and are not final. The final limits are these limits as modified by the limit modifiers.
   iv During the operation of the 24/7 Mode, other modes may be started based on time switches. If another mode is started, the variables of the other mode can be used as the controlling factors.
 o. User-Defined Mode (Mode 10)
   i The minimums and maximums can be reset based on one or more variables such as cooling load, load previously discharged, ambient conditions, WCAH load and/or other appropriate indicators.
3. Load Based Minimum and Maximum CHW DP Setpoint Limit Modifiers
 a. The following discussion describes the development of the Minimum and Maximum Chilled Water Differential Pressure Setpoint Limit Modifiers.
 b. Essentially, the control system begins with a set of limits which are based on the conditions described in each of the modes. Subsequently, those limits are modified based on the actual conditions that a facility is experiencing.
 c. When the external loads are relatively high, the Mode "X"-based minimum (Mode"X" MINLO and HI) and maximum (Mode"X" MAXLO and HI) chilled water differential pressure limits may be too low. Thus, routines exists that will raise the minimum and maximum differential pressure setpoints. These setpoints can be referred to as the Modified Minimum DP Setpoint and the Modified Maximum DP Setpoint.

d. When the internal loads are relatively low, routines exist that lower the Mode "X"-based minimum chilled water differential pressure limits (Mode"X" MINLO and HI) and/or the Mode-based maximum limits (Mode"X" MAXLO and HI) in order to reduce system cycling and promote energy conservation.

e. Mode-based differential pressure setpoint limits i The mode-based minimum and maximum setpoints can be modified (increased or decreased) based on actual system performance, as described herein.

f. The final value that combines the mode limits with the load-based modifiers can be used as the actual minimum and maximum limits to control the system.

g. Load-Based Modifications to the Mode based CHW DP Limits i If the chiller system (or other cooling system) has been operating for longer than a particular time period (e.g., 30 minutes), the Mode-based Proportional Chilled Water Differential Pressure Limits can be adjusted as described herein.

ii Minimum Chilled Water Differential Pressure Limit Modifiers a) If the load is high, the minimum Mode-based Chilled Water Differential Pressure Setpoint can be increased. Alternatively, if the load is low, the minimum Mode-based Chilled Water Differential Pressure Setpoint can be lowered. In some implementations, the following sequences can be used to determine if the load is low or high.

b) Decrease the minimum Mode-based Chilled Water Differential Pressure Setpoint (e.g., for low loads) if the following logic is true:

1) The WCAHSCD value is below the WCAH Setpoint and is decreasing, or is more than 50 below the WCAH setpoint; and 2) The Differential Pressure Setpoint is at or below 1 PSID greater than the Mode "X" Minimum Differential Pressure Setpoint; and 3) The chilled water supply temperature setpoint is within 1.5° F. of the maximum Modified CHWS temperature limit (e.g., the SAT and WCAHload based CHWS limit plus or minus the Load Based Reset).

c) If the above logic is true, the minimum differential pressure setpoint can be lowered as described in the below implementation:

1) If the WCAHSCD value is less than the WCAH setpoint minus 10, the minimum differential pressure setpoint is decreased at the rate of 0.002 PSID per minute.

2) If the WCAHSCD value is less than the WCAH setpoint minus 20, the minimum differential pressure setpoint is decreased at the rate of 0.006 PSID per minute.

3) If the WCAHSCD value is less than the WCAH setpoint minus 30, the minimum differential pressure setpoint is decreased at the rate of 0.011 PSID per minute.

4) If the WCAHSCD value is less than the WCAH setpoint minus 40, the minimum differential pressure setpoint is lowered at the rate of 0.03 PSID per minute.

5) If the WCAHSCD value is less than the WCAH setpoint minus 50, the minimum differential pressure setpoint is lowered at the rate of 0.08 PSID per minute.

d) The maximum change from the Mode-based Proportional Chilled Water Differential Pressure Limits can be a decrease of X.X PSID below the Minimum setpoint as described by the Mode Based Proportional Chilled Water Differential Pressure Limits.

1) Mode 1—X.X=67% of Mode "X" Min Lo
2) Mode 2—X.X=63% of Mode "X" Min Lo
3) Mode 3—X.X=49% of Mode "X" Min Lo
4) Mode 4—X.X=59% of Mode "X" Min Lo
5) Mode 5—X.X=37% of Mode "X" Min Lo
6) Mode 6—X.X=42% of Mode "X" Min Lo
7) Mode 7—X.X=58% of Mode "X" Min Lo
8) Mode 8—X.X=57% of Mode "X" Min Lo
9) Mode 9—X.X=50% of Mode "X" Min Lo
10) Mode 10—X.X=56% of Mode "X" Min Lo e) In some implementations, the minimum Mode Based Chilled Water Differential Pressure setpoint can be increased if the following logic is true:

1) The CHWS temperature setpoint is within 1.5° F. of the minimum Modified CHWS limit (e.g., the SAT and WCAHload based CHWS limit plus or minus the Load Based Reset), for a particular time period (e.g., 15 minutes); and 2) The WCAHSCD value is above the WCAH Setpoint by a value of 100 or more, and is increasing; or the WCAHSCD value is above the WCAH Setpoint by a value of 223 or more; and 3) The Differential Pressure Setpoint is increasing and is between the Target Differential Pressure Setpoint and the Maximum Differential Pressure Setpoint;

OR

4) The Differential Pressure Setpoint is at or above 1 PSID less than the Mode based Maximum DP Setpoint.

5) If the above logic is true, the minimum differential pressure setpoint is increased as described below:

(i) If the WCAHSCD value is greater than the WCAH setpoint plus 100, increase the minimum differential pressure setpoint at the rate of 0.003 PSID per minute.

(ii) If the WCAHSCD value is greater than the WCAH setpoint plus 150, increase the minimum differential pressure setpoint at the rate of 0.006 PSID per minute.

(iii) If the WCAHSCD value is greater than the WCAH setpoint plus 250, increase the minimum differential pressure setpoint at the rate of 0.0008 PSID per minute.

(iv) If the WCAHSCD value is greater than the WCAH setpoint plus 350, increase the minimum differential pressure setpoint at the rate of 0.0010 PSID per minute.

(v) If the WCAHSCD value is greater than the WCAH setpoint plus 400, increase the minimum differential pressure setpoint at the rate of 0.012 PSID per minute.

6) The maximum change from the Mode-based Proportional Chilled Water Differential Pressure Limits can be an increase of Y.Y PSID above the Minimum setpoint as described by the Mode Based Proportional Chilled Water Differential Pressure Limits.

(i) Mode 1—Y.Y=183% of Mode "X" Min Lo
(ii) Mode 2—Y.Y=187% of Mode "X" Min Lo
(iii) Mode 3—Y.Y=166% of Mode "X" Min Lo
(iv) Mode 4—Y.Y=191% of Mode "X" Min Lo
(v) Mode 5—Y.Y=159% of Mode "X" Min Lo
(vi) Mode 6—Y.Y=193% of Mode "X" Min Lo
(vii) Mode 7—Y.Y=197% of Mode "X" Min Lo
(viii) Mode 8—Y.Y=192% of Mode "X" Min Lo
(ix) Mode 9—Y.Y=198% of Mode "X" Min Lo
(x) Mode 10—Y.Y=199% of Mode "X" Min Lo f) In this implementation, the Minimum Modified Differential Pressure Setpoint limit is configured not to exceed 3.5 PSID below the Maximum Modified Differential Pressure Setpoint limit.

iii Maximum Chilled Water Differential Pressure (CHW DP) Limit Modifiers a) If the load is relatively light, the maximum Mode Based CHW DP Setpoint can be lowered. Alternatively, if the load is relatively heavy, the maximum CHW DP can be increased up to the Mode Based Maximum limit. The following sequences can be used to determine if the load is light or heavy.

b) The maximum CHW DP setpoint can be decreased if the following logic is true:
1) The WCAHSCD value is below the WCAH Setpoint, and is decreasing, or is more than 50 below the WCAH setpoint; and
2) The Differential Pressure Setpoint is at or below 1 PSID greater than the Mode-based Minimum Differential Pressure Setpoint; and
3) The CHWS Temperature Setpoint is within 1.5° F. of the Maximum Mode-based Setpoint Limit, or is above the Maximum Mode-based Setpoint Limit.
iv If the above logic is true, the maximum differential pressure setpoint can be lowered as described below:
a) If the WCAHSCD value is less than the WCAH setpoint minus 10, the maximum differential pressure setpoint can be lowered at the rate of 0.0011 PSID per minute.
b) If the WCAHSCD value is less than the WCAH setpoint minus 20, the maximum differential pressure setpoint can be lowered at the rate of 0.0032 PSID per minute.
c) If the WCAHSCD value is less than the WCAH setpoint minus 30, the maximum differential pressure setpoint can be lowered at the rate of 0.006 PSID per minute.
d) If the WCAHSCD value is less than the WCAH setpoint minus 40, the maximum differential pressure setpoint can be lowered at the rate of 0.012 PSID per minute.
e) If the WCAHSCD value is less than the WCAH setpoint minus 50, the maximum differential pressure setpoint can be lowered at the rate of 0.041 PSID per minute.
h. This can take the maximum Modified Setpoint down to the Maximum Mode-based Reset Limit, but not lower.
4. In one implementation, the maximum modified CHW DP setpoint can be increased if the following logic is true:
a. The CHWS temperature setpoint is within 1.1° F. of the Mode Based minimum CHWS Temperature Setpoint, AND
b. The CHW DP setpoint is greater than 2.1 PSID below the Mode-based CHW Maximum Differential Pressure limit.
c. If the above logic is true, the maximum differential pressure setpoint is increased as described in the below implementation:
i If the WCAHSCD value is greater than the WCAH setpoint plus 100, increase the maximum differential pressure (DP) setpoint at the rate of 0.012 PSID per minute.
ii If the WCAHSCD value is greater than the WCAH setpoint plus 150, increase the maximum DP setpoint at the rate of 0.031 PSID per minute.
iii If the WCAHSCD value is greater than the WCAH setpoint plus 250, increase the maximum DP setpoint at the rate of 0.043 PSID per minute.
iv If the WCAHSCD value is greater than the WCAH setpoint plus 350, increase the maximum DP setpoint at the rate of 0.067 PSID per minute.
v If the WCAHSCD value is greater than the WCAH setpoint plus 500, increase the maximum DP setpoint at the rate of 0.27 PSID per minute.
vi The maximum change from the Mode Based CHW DP Limits can be an increase of Z.Z PSID above the maximum setpoint as described by the Mode-based CHW DP Limits.
a) Mode 1—Z.Z=138% of Mode "X" Min Lo
b) Mode 2—Z.Z=142% of Mode "X" Min Lo
c) Mode 3—Z.Z=147% of Mode "X" Min Lo
d) Mode 4—Z.Z=152% of Mode "X" Min Lo
e) Mode 5—Z.Z=157% of Mode "X" Min Lo
f) Mode 6—Z.Z=155% of Mode "X" Min Lo
g) Mode 7—Z.Z=151% of Mode "X" Min Lo
h) Mode 8—Z.Z=145% of Mode "X" Min Lo
i) Mode 9—Z.Z=137% of Mode "X" Min Lo
j) Mode 10—Z.Z=154% of Mode "X" Min Lo 5. CHW Differential Pressure Setpoint Maximum Rate of Change
a. Increasing Setpoint: In some implementations, the maximum rate of change for the differential pressure setpoint when it is increasing can be 0.5 PSID per minute. This can apply to all modes except the Startup Mode. In the Startup Mode, the DP can be increased at the rate of 2 PSID per minute.
b. Decreasing Setpoint: In some implementations, the maximum rate of change for the differential pressure setpoint when it is decreasing shall be 0.15 PSID per minute. This can apply to all modes except the Startup Mode. In the startup mode, the DP can only be decreased at the rate of 0.10 PSID per minute.
6. Chilled Water (CHW) Differential Pressure Setpoint at Startup
a. In some implementations, chiller system startup is based on the time that the chiller system starts for daily cycle plant. In other implementation, chiller system startup is based on an operator selectable time (e.g., for 24/7 plants).
b. On chiller system startup (e.g., actual startup, time-based startup for 24/7 plants, etc.), the differential pressure (DP) control loop is enabled. The DP setpoint can be proportionally reset based on the average return air temperature (RAT) of the AHUs which are operating and are being monitored by the control system.
c. As the value for the average RAT varies when AHUs are started up and/or as the RAT changes, the DP setpoint can also be configured to vary on a continuous basis.
d. In some implementations, such a proportional reset mode can be used to operate the system for a designated time period (e.g., 35 minutes) following initial chiller plant start up (or TOD-based startup for 24/7 plants) to allow the system time to stabilize. Once the system time has stabilized, the reset routine can be initialized.
e. Proportional Reset Table: the DP setpoint can be proportionally reset between 5 to 20 PSID (initial values shown; actual values can be recalculated each day by the self tuning loop if that is enabled) based on the average return air temperature of the operational AHUs being between 70° F. and 78° F.
f. The initial values contained in the proportional based reset table are modified based on the WCAHSCD value as described herein.
g. The WCAHSCD-based PID reset control loops can effectively start acting on the DP setpoint from the proportionally-based reset setpoint at the end of the timer. No integral windup in this loop can be ensured.
h. If the DP setpoint has to make a major jump from the initial proportional reset startup routine to the minimum or maximum limits imposed during the WCAHSCD PID loop control routines, it is desirable to ensure that the rate of change of the setpoint is limited as described elsewhere in this sequence.
7. CHW Differential Pressure Self Tuning Loop at Startup (MODE 1)
a. In some implementations, operators can be permitted to enable or disable a self tuning loop for the DP setpoint at startup.
b. For Daily Cycle Chiller Plants:
i If the calculated HSS WCAHSCD value is greater than the sum of the WCAH Setpoint plus 200 (e.g., WCAH+200) at the 50 minute mark after the initial plant startup, the minimum and maximum chilled water differential pressure setpoints are increased in the proportional reset table by 1 PSID each for the next startup cycle.

ii If the calculated HSS WCAHSCD value is less than the sum of WCAH plus 25 (WCAH+25) at the 50 minute mark after the initial plant startup, the minimum and maximum chilled water differential pressure setpoints are lowered in the proportional reset table by 0.20 PSID each for the next startup cycle.

iii When using the self tuning loops, if one of the chilled water differential pressure setpoints reaches its respective limit, it can be desirable to not allow the setpoints to be reset in that direction any further. This can help ensure that the setpoint variables do not "collapse" on themselves.

iv These daily recalculated values can become the new proportional reset table, which may be stored each day and recalculated for the next day based on the WCAHSCD value at 50 minutes after the startup of the plant.

c. For 24/7 Chiller Plant Facilities:

i Use the same resets as described above with respect to Daily Cycle Chiller Plants.

ii However, rather than using the initial plant startup time, a time-based setpoint may be used to capture the WCAHSCD value.

iii In one implementation, as initial time-based setpoints for 24/7 facilities, 7:00 AM on Mondays, 7:30 AM Tuesdays thru Fridays, and 8:00 AM on Saturday and Sunday can be used.

iv If the calculated HSS WCAHSCD value is greater than 400 at 7:00 AM on Mondays, 7:30 AM Tuesdays thru Fridays, and 8:00 AM on Saturday and Sunday, the minimum and maximum DP setpoints can be increased in the proportional reset table by 1 PSID each.

v If the calculated HSS WCAHSCD value is less than 200 at 7:00 AM on Mondays, 7:30 AM Tuesdays thru Fridays, and 8:00 AM on Saturday and Sunday, the minimum and maximum DP setpoints can be lowered in the proportional reset table by 0.20 PSID each.

vi Under such implementations, these daily recalculated values become the new proportional reset table, which may be stored daily and recalculated for the next day based on the WCAHSCD value at 50 minutes after the startup of the plant.

vii When using the self tuning loops, if one of the chilled water differential pressure setpoints reaches its respective limit, it can be desirable to not allow the setpoints to be reset in that direction any further. This can help ensure that the setpoint variables do not "collapse" on themselves 8. CHW Differential Pressure Self Tuning Loop for Other Modes a. For each operational mode, the system can be configured to enable or disable a self tuning loop.

b. When a self tuning loop is enabled for Mode 2 or Mode 9:

i If the HSS WCAHSCD value is greater than 450 for a 15 minute period, the Target Differential Pressure % setpoint is decreased by 1.0% per every 4 minute period after the 15 minute period has been completed (e.g., 79% would be reduced to 78%, then 77%, etc.).

ii if the HSS WCAHSCD value is less than 80 for a 15 minute period, the Target Differential Pressure % setpoint is increased by 0.25% per every 8 minute period after the 15 minute period has been completed (e.g., 57% would be increased to 57.25%, then 57.50%, then 57.75%, etc).

iii The absolute minimum and maximum % value for the Target Differential Pressure % Setpoint can be 50% and 95%, respectively.

iv These daily recalculated values can become the new proportional reset table, which may be stored daily and recalculated for the next day based on the WCAHSCD value at 50 minutes after the startup of the plant.

c. When a self tuning loop is enabled for Mode 3 or Mode 4:

i If the calculated HSS WCAHSCD value is greater than 600 at the 50 minute mark after the initial plant startup, the minimum and maximum DP setpoints are increased in the proportional reset table by 1.1 PSID each.

ii If the calculated HSS WCAHSCD value is less than 200 at the 50 minute mark after the initial plant startup, the minimum and maximum DP setpoints are decreased in the proportional reset table by 0.25 PSID each.

iii The absolute minimum and maximum % value for the Target Differential Pressure % Setpoint can be 50% and 95%, respectively.

iv These daily recalculated values can become the new proportional reset table, which may be stored each day and recalculated for the next day based on the WCAHSCD value at 50 minutes after the startup of the plant.

d. When a self tuning loop is enabled for Mode 5, Mode 6, Mode 7 or Mode 8:

i The same resets as described above can be used.

ii However, rather than using the initial plant startup time, a time-based setpoint can be used to capture the WCAHSCD value.

iii In some implementations, as the initial time-based setpoints for TES based facilities, 8:00 PM can be used as the time to capture the WCAHSCD value.

9. Absolute Minimum and Maximum Chilled Water (CHW) Differential Pressure (DP) Setpoints a. The absolute minimum and maximum CHW DP reset limits can be advantageously varied.

b. In some implementations, the initial values are 2 PSID for the absolute minimum and 30 PSID for the absolute maximum setpoints.

c. When using the self tuning loops, if one of the variables reaches its limit, the system can be configured to prevent that variable from resetting in that direction any further. This can help ensure that the variables do not "collapse" on themselves.

d. For example, if the setpoint reaches its lower limit, it may not be desirable to reset the upper limit to a lower value, as that may collapse the difference between the high and low limits, especially when the setpoints are once again increased.

10. Chilled Water (CHW) Differential Pressure Range and Target Description a. CHW Differential Pressure Range:

i In one implementation, the differential pressure setpoint range is the maximum modified CHW DP setpoint minus the minimum modified CHW DP setpoint.

ii The range may vary continuously as the modes and loads are modified.

b. CHW Differential Pressure Target:

i In one implementation, the temperature of the chilled water is varied to keep the DP setpoint near the DP setpoint target.

ii Generally, as the DP setpoint increases or goes above the DP setpoint target, the CHW supply temperature is reduced (e.g., colder water needs a lower DP to meet the loads). Further, as the DP setpoint decreases or goes below the DP setpoint target, the CHW supply temperature is increased (e.g., warmer water needs a higher DP to meet the loads).

iii The system can be configured to use a DP Setpoint Target that provides adequate CHW flow to maintain the WCAHSCD values for the AHUs at the WCAH setpoint, assuming that proper chilled water supply temperatures are maintained.

a) A lower DP Setpoint Target can cause the CHW supply temperature setpoint to decrease. In such situations, the system may be attempting to reduce the amount of water required to serve a load by providing colder water. Even though colder chilled water can provide a larger "cushion" for the system, it may simultaneously waste chiller energy.

b) A higher DP Setpoint Target can cause the CHW supply temperature setpoint to increase. In such situations, the system may be attempting to increase the amount of water required to serve a load by providing warmer water. Warmer water can reduce the "cushion" for the system. However, warmer water can save chiller energy.

c) Typically, when loads are relatively light, a higher DP Target Setpoint % can be used since there is less need for a substantial cushion for system operations.

iv The DP setpoint target can be used as an input (or target) for the CHW supply temperature reset logic as discussed herein. Two sample calculations, which assume a target of 75%, follow:

a) At 91° F. Outside Air (OSA) Temperature, the maximum modified DP setpoint is 28.3 PSID, and the minimum modified DP setpoint is 6.9 PSID. The range is 21.4 PSID (28.3 PSID minus 6.9 PSID). 75% of this range equals 16.05 PSID (21.4 PSID×75%). Adding 16.05 PSID to 6.9 PSID equals the target of 22.95 PSID.

b) At 63° F. Outside Air (OSA) Temperature, the maximum modified DP setpoint is 8.5 PSID, and the minimum modified DP setpoint is 5.1 PSID. Thus, the range is 3.4 PSID (8.5 minus 5.1). 75% of this range equals 2.55 PSID (3.4 PSID× 75%). Adding 2.55 PSID to 5.1 PSID equals the target of 7.65 PSID.

c) As the minimum and maximum DP setpoints change according to operational mode, ambient temperature, WCRAT, load conditions and/or other factors, so can the reset range and the target DP setpoint.

d) Typically, at light loads, the target % can be allowed to be higher, as there is less need for a "DP cushion" to accommodate changes and variations in the load.

e) Each operational mode can have continuously variable DP Target % values based on the implementations of the variables described below:

1) Mode 1: the DP Target % is proportionally reset between 60% and 45%, based on the WCAH load value being between 0% and 80%.

2) Mode 2: the DP Target % is proportionally reset between 90% and 75%, based on the WCAH load value being between 0% and 90%.

3) Mode 3: the DP Target % is proportionally reset between 95% and 85%, based on the WCAH load value being between 0% and 88%.

4) Mode 4: the DP Target % is proportionally reset between 70% and 55%, based on the WCAH load value being between 0% and 82%.

5) Mode 5: the DP Target % is proportionally reset between 80% and 65%, based on the WCAH load value being between 0% and 81%.

6) Mode 6: the DP Target % is proportionally reset between 92% and 85%, based on the WCAH load value being between 0% and 87%.

7) Mode 7: the DP Target % is proportionally reset between 84% and 66%, based on the WCAH load value being between 0% and 70%.

8) Mode 8: the DP Target % is proportionally reset between 88% and 71%, based on the WCAH load value being between 0% and 77%.

9) Mode 9: the DP Target % is proportionally reset between 91% and 74%, based on the WCAH load value being between 0% and 83%.

10) Mode 10: the DP Target % is proportionally reset between 89% and 65%, based on the WCAH load value being between 0% and 88%.

f) Target DP % maximum rate of change: in some implementations, to reduce process upsets when operational modes are changing or when loads change relatively rapidly, the rate of change of the Target DP % can be limited to 1% per minute.

11. "No Cooling" CHW Differential Pressure Setpoints a. When there is no cooling being provided to the site from the chillers, but the chilled water pumps are operating (e.g., the system is in the low load shutdown or coastdown modes), the differential pressure setpoint can be reset proportionately to the chilled water supply temperature as follows:

i For chilled water supply temperatures between 52° F. and 75° F., the site differential pressure setpoint may be varied between 3.1 PSID and 7.9 PSID.

I. Chilled Water Supply Temperature Setpoint Control—Smaller Facilities—PID SDCC 1. Using the information from the DP reset routine, PID loops can be developed that reset the chilled water setpoint as required to maintain the DP setpoint value at its target setpoint.

2. In one implementation, two PID loops are needed to control the CHWS temperature setpoint in this mode of operation. When loads are relatively high or relatively low, an aggressive PID loop may need to be used to change the CHWS setpoint quicker.

a. To prevent jumps in the setpoint when the system transitions between aggressive and mild PID loops, it may be desirable to have one PID loop with the P, I and D gains configured as variables. Thus, when an "aggressive" PID loop is desired, the higher gains can be input into the PID loop. Alternatively, when a "mild" PID loop is desired, the lower gains can be input into the PID loop.

b. A relatively slow gain PID loop can be utilized if the DP setpoint is relatively close to the DP Target setpoint. However, a more aggressive PID loop may be desired or required under different circumstances.

i It will be appreciated that as used herein the term "aggressive" is a relative term. Relatively small changes may need to be made on a comparatively continuous basis to maintain control of the cooling loads without wild and wide swings in the chilled water supply temperature and/or the AHU supply air temperature.

a) An aggressive CHWS Temperature setpoint adjustment PID loop can be utilized to change the CHWS Temperature setpoint in larger increments under certain circumstances as described below:

b) For example, if the load is increasing, the DP setpoint is above its target, and the 20 minute average WCAHSCD value is 250 or higher (e.g., the CHW valve is 100% open and the SAT is 1.5° F. above setpoint);

c) If the load is decreasing, the DP setpoint is below its target, and the 20 minute average WCAHSCD value is 90 or lower.

ii Regardless of whether or not the load is increasing or decreasing, the more aggressively tuned loop can be advantageously used if the 20 minute average WCAHSCD value is above 500 or below 50.

iii At other times, the less aggressive "mild" loop can be utilized.

iv The bias can be set equal on such loops, so that when transferring from one loop to another, to prevent significant immediate changes in the CHWS setpoint.

3. A relatively substantial Derivative term may be needed, as once the load starts to come under control, the DP setpoint value can decrease relatively quickly. Thus, as soon as the DP setpoint value starts to change, the CHWS setpoint can start to change in the opposite direction, even if only slightly at first.

4. In some implementations, the differential pressure setpoint target is XX % of its range towards the high end. This is a variable which may be based on one or more system conditions or factors as described herein.

a. In one implementation, two PID loops can be used to control the CHWS temperature in order to maintain the DP at the desired XX % of maximum range DP setpoint, while simultaneously staying within the minimum and maximum CHWS temperature setpoints as described herein. The minimum and maximum CHWS temperature setpoints can be the total of the WCAHLoad CHWS Limits plus or minus any changes to those limits caused by the load based resets.

5. An increase in the differential pressure setpoint above the target setpoint may indicate that colder water is required to satisfy the cooling loads and/or reduce the flow and DP requirements of the system.

a. Under such a scenario, the CHW supply temperature can be decreased to reduce the flow and DP which are required to satisfy the cooling loads. As the Chilled Water Supply (CHWS) Temperature decreases, the DP required to serve the load can also decrease, thereby driving the DP setpoint towards the DP Target setpoint.

6. If the differential pressure setpoint drops below the target setpoint, warmer water may be required to satisfy the cooling loads and increase the flow and DP requirements.

a. Under such a scenario, the CHW supply temperature can be increased to increase the flow and DP which are required to satisfy the cooling loads. As the CHWS Temperature increases, the DP required to serve the load can also increase, driving the DP setpoint towards the DP Target setpoint.

J. CHW Supply Temperature Setpoint PID Loop Output Clipping

1. Under some circumstances, the PID loop outputs for the CHWS setpoint can negatively affect the operation of the system. Thus, it may be desirable to limit the output, depending on the direction in which the differential pressure setpoint is moving.

2. If the DP setpoint is below the target DP setpoint, the CHWS setpoint PID loop typically attempts to increase the CHWS setpoint, in an effort to increase the CHW flow rate. This can force the requirement for a higher DP setpoint to get it closer to the DP target.

3. If the DP setpoint is increasing (e.g., the loads are increasing) and the DP setpoint is below the target DP setpoint, it may not be desirable to increase the CHWS temperature setpoint.

4. Therefore, in one implementation, if the DP setpoint is increasing relative to the 6 minute average of the DP setpoint, the system can be configured to prevent the CHWS temperature setpoint from increasing. This can limit outputs to negative resets or zero.

5. Similarly, if the DP setpoint is above the target DP setpoint, the CHWS setpoint PID loop may normally try to decrease the CHWS setpoint. This decrease can be an attempt to force the requirement for a lower DP setpoint in order to get it closer to the DP target.

6. However, if the DP setpoint is decreasing (e.g., the loads are decreasing) and the DP setpoint is above the target DP setpoint, it may not be desirable to raise the CHWS temperature setpoint.

7. Therefore, if the DP setpoint is decreasing relative to the 6 minute average of the DP setpoint, the system can be configured to prevent the CHWS temperature setpoint from decreasing. This can limit outputs to positive resets or zero.

8. If the DP setpoint is neither increasing nor decreasing (e.g., if it is at or near the high or low limit of the DP setpoint range), the normal PID loop outputs can be advantageously be permitted to occur.

K. CHW Supply Temperature Setpoint at Startup (Mode 1)

1. For Non-24/7 Facilities:

a. On chiller system startup, in some implementations, the CHW supply temperature control loop is enabled with a CHWS temperature setpoint proportionally reset between 48° F. and 58° F. (e.g., initial values prior to self tuning loop adjustments). This may be based on the average AHU return air temperature of every operational AHU in the facility that is being monitored being between 77° F. and 70° F., respectively.

b. As the value for the average return air temperature (RAT) varies, the CHW Supply temperature setpoint can also be continuously varied.

c. Operation in this proportional reset mode can continue for a particular time period after initial chiller plant start up (e.g., 35 minutes) to allow the system to stabilize.

d. In some implementations, the minimum and maximum CHW supply setpoint limits (except for the absolute minimum and maximum setpoints) can be ignored while the system is in this mode.

e. The reset control loops can begin acting on the CHWS temperature setpoint from the setpoint in effect at the end of the timer. It may be desirable to ensure that no integral windup exists in this loop.

f. In one implementation, if the setpoint is outside of the minimum and/or maximum limits, it is advantageous to ensure that the maximum rate of change of the setpoint is in effect. This can help minimize any dramatic jumps in the setpoint as it attempts to get into within the desired minimum/maximum range.

2. For 24/7 Facilities:

a. The same logic described above with reference to the non-24/7 facilities can be used. However, instead of using "chiller system startup" as the trigger, a time-based trigger can be utilized to enable the logic.

b. In one implementation, the time can be adjusted by an operator (e.g., between 5:00 AM and 7:00 AM daily).

3. CHW Supply Temperature Setpoint Self Tuning Loop at Startup (Mode 1)

a. It may be possible for an operator to enable or disable a self tuning loop for the CHWS temperature setpoint at startup.

b. For Daily Cycle Chiller Plants:

i In some implementations, if the calculated HSS WCAHSCD value is greater than 300 at the 50 minute mark following the initial plant startup, the minimum and maximum startup temperatures can be decreased in the proportional reset table by 1° F. each.

ii If the calculated HSS WCAHSCD value is less than 200 at the 50 minute mark after the initial plant startup, the minimum and maximum startup temperature setpoints can be increased in the proportional reset table by 0.25° F. each.

iii These daily recalculated values can become the new proportional reset table, which may be stored daily and recalculated for the next day based on the WCAHSCD value at 50 minutes after the startup of the plant.

c. For 24/7 Chiller plant Facilities:

i The same resets as described above with reference to Daily Cycle Chiller Plants can be utilized.

ii However, rather than using the initial plant startup time (which may not apply to a 24/7 Facility), a time-based setpoint can be used to capture the WCAHSCD value.

iii In some implementations, as initial time based setpoints for 24/7 Facilities, 7:00 AM on Mondays, 7:30 AM Tuesdays thru Fridays, and 8:00 AM on Saturday and Sunday are used.

iv CHW Supply Temperature Setpoint Self Tuning Loop (Other Modes): it may be possible for an operator to enable or disable a self tuning loop for the chilled water supply (CHWS) temperature setpoint during other modes of operation.

d. For Modes 2, 3, 4, 9 or 10 (as described in this implementation):

i In one implementation, if the calculated HSS WCAHSCD value is greater than 400 for 30 minutes, the final value of the minimum and maximum setpoint limits are decreased by 1° F. each, every 15 minutes.

ii Further, if the calculated HSS WCAHSCD value is less than 100 for 40 minutes, the final value of the minimum and maximum setpoint limits are increased by 0.25° F. each every 15 minutes that such conditions exist.

iii The daily recalculated values can advantageously become the new proportional reset table, which may be stored daily and recalculated for the next day based on the WCAHSCD value at 50 minutes after the startup of the plant.

iv When using the self tuning loops, if one of the variables hits its limit, it may be desirable to prevent either variable from being reset in that direction any further. This can help ensure that the variables do not "collapse" on themselves.

L. Absolute Minimum and Maximum Chilled Water (CHW) Supply Temperature Setpoints a. In some preferred implementations, the absolute minimum and maximum CHW supply temperature reset limits are variable.

b. For example, the initial values can be 40° F. for the absolute minimum setpoint and 60° F. for the absolute maximum setpoint.

c. When using the self tuning loops, if one of the variables reaches its limit, it may be desirable to not allow either variable to be reset in that direction any further. This can help ensure that the variables do not "collapse" on themselves.

d. For example, if the setpoint reaches its lower limit as it is being decreased, it may not be desirable to keep resetting the upper limit lower, as this may collapse the difference between the high and low limits when the setpoints are subsequently increased.

M. SATSP and WCAHload-Based Minimum and Maximum CHW Setpoints

1. Information from the AHUs regarding their supply air temperature setpoint, the return air temperature, fan speed, "Setpoint A" (return air temperature setpoint), "Setpoint B" (fan speed setpoint), WCAH information and/or the like can be acquired.

2. In some implementations, if the supply air temperature setpoint is relatively low and the return air temperature/fan speed is relatively high, the minimum and maximum CHWS setpoints are reduced to allow the chiller system to provide colder water to the AHU system in order to satisfy the higher loads.

3. Conversely, if the supply air temperature setpoint is relatively high and the return air temperature/fan speed is relatively low, the minimum and maximum CHWS setpoints are increased to provide warmer water to the system in order to satisfy the reduced loads.

4. The use of a variable may be desirable which will serve as an indicator of load at each fan system. Such a variable can be based on the extent above the Setpoint A value each AHU is operating. In addition, the variable can be based on the amount above the fan speed setpoint that the fan speed is operating. For example:

a. A proportional table for the Setpoint A offset value can be developed: in one implementation, as the return air temperature varies between Setpoint A and the sum of Setpoint A and 2.5° F. (Setpoint A+2.5° F.), a proportional output signal which varies from 0 to 50 can be provided.

b. Further, a second proportional table for the fan speed value can be developed: as the fan speed command varies between Setpoint B and {setpoint B×1.5 or 100%, whichever is less}, a proportional output signal which varies from 0 to 50 can be provided.

c. Next, these two proportional output signals are added for a "WCAHload" calculated result.

i Example:

a) If Setpoint A is 73.5° F. for a specific AHU, and the return air temperature at that AHU is 75.5° F., the offset would be 2° F., which is 80% of the 0 to 2.5° F. range, for a value of 40 (80%×50=40).

b) If the Setpoint B value is 70%, and the fan speed is 80%, the range would be {70×1.5=105, but 100 is less}. Thus, the range would be 70 to 100 or 30. Consequently, the output from such a calculation would equal 33.3 (e.g., 10/30=33.3).

c) Adding these two values provides a WCAHload value of 73.3% (40+33.3).

d. In this implementation, the supply air temperature (SAT) setpoint information can be polled every four minutes to reduce network traffic. In addition, the RAT/fan speed information (WCAHload) can also be polled every four minutes to help data line traffic.

e. It may be possible to select which AHUs are included in this routine from a graphical page (or other interface) depicting some or all of the AHUs that are being monitored.

f. Next, a number (e.g., 2, 3, 4, etc.) of values regarding the selected AHUs can be calculated. In one implementation, three values are calculated. These include:

i The minimum selected supply air temperature setpoint;

ii The average selected supply air temperature setpoint; and iii The WCAHload value, which can be the high signal selected at the chiller plant controller and used in the following routines.

g. If an AHU is operating, calling for cooling and has been selected for inclusion in such a routine, it is included in the calculations to determine the minimum and average SAT setpoints and the WCAHload value.

h. The system can be configured so that it is possible to select which value (e.g., the Minimum SAT Setpoint, the Average SAT Setpoint, etc.) to use in the minimum and maximum CHWS setpoint reset schedule.

i. The minimum and maximum CHWS setpoint limits can be reset based on the highest WCAHload value. This can be accomplished by using either the Minimum or Average of the selected AHU SAT setpoints as the basis.

j. If the minimum SAT setpoint is selected for use in this routine, the minimum and maximum CHWS setpoints can be proportionally reset based on the highest WCAHload value of the AHUs which are operating and are included in the selection process. The minimum AHU setpoint can be used as the basis for the CHWS setpoint.

|  | WCAHload = 0 | WCAHload = 100 |
| --- | --- | --- |
| Minimum CHWS Setpoint | Minimum SAT Setpoint value, minus 4° F. | Minimum SAT Setpoint value, minus 10° F. |
| Maximum CHWS Setpoint | Minimum SAT Setpoint value, minus 1° F. | Minimum SAT Setpoint value, minus 5° F. | k. This can help tie the minimum and maximum CHWS setpoints to the supply air temperature setpoints so that the cooling system does not produce chilled water that is warmer than the coldest SAT setpoint. As the loads increase (e.g., as indicated by higher WCAHLoad values), the CHWS setpoint can be permitted to decrease.

l. Example: if the minimum SAT setpoint is equal to 57° F., the minimum and maximum reset table may be as follows:

|  | WCAHload = 0 | WCAHload = 100 |
| --- | --- | --- |
| Minimum CHWS Setpoint | 57° F. − 4° F. = 53° F. | 57° F. − 10° F. = 47° F. |
| Maximum CHWS Setpoint | 57° F. − 1° F. = 56° F. | 57° F. − 5° F. = 52° F. | i Therefore, in this implementations, if the WCAHload value is 50%, the minimum CHWS setpoint would be 50° F. and the maximum CHWS setpoint would be 54° F.

m. Example: if the minimum SAT setpoint is equal to 53° F., the minimum and maximum reset table may be as follows:

|  | WCAHload = 0 | WCAHload = 100 |
| --- | --- | --- |
| Minimum CHWS Setpoint | 53° F. − 4° F. = 49° F. | 53° F. − 10° F. = 43° F. |
| Maximum CHWS Setpoint | 53° F. − 1° F. = 52° F. | 53° F. − 5° F. = 48° F. | i Therefore, in this implementation, if the WCAHload value is 50%, the minimum CHWS setpoint would be 46° F. and the maximum CHWS setpoint would be 50° F.

n. The same reset schedule logic can also apply if the average of the selected SAT setpoints is used. In this situation, the reset table may be as follows:

|  | WCAHload = 0 | WCAHload = 100 |
| --- | --- | --- |
| Minimum CHWS Setpoint | Average SAT Setpoint value, minus 4° F. | Average SAT Setpoint value, minus 10° F. |
| Maximum CHWS Setpoint | Average SAT Setpoint value, minus 1° F. | Average SAT Setpoint value, minus 5° F. | o. Example: if the Average SAT setpoint is equal to 59° F., the minimum and maximum reset table may be as follows:

|  | WCAHload = 0 | WCAHload = 100 |
| --- | --- | --- |
| Minimum CHWS Setpoint | 59° F. − 4° F. = 55° F. | 59° F. − 10° F. = 49° F. |
| Maximum CHWS Setpoint | 59° F. − 1° F. = 58° F. | 59° F. − 5° F. = 54° F. | i Thus, in this implementation, if the WCAHload value is 50%, the minimum CHWS setpoint would be 52° F. and the maximum CHWS setpoint would be 56° F.

p. Example: if the Average SAT setpoint is equal to 66° F., the minimum and maximum reset table may be as follows:

|  | WCAHload = 0 | WCAHload = 100 |
| --- | --- | --- |
| Minimum CHWS Setpoint | 66° F. − 4° F. = 62° F. | 66° F. − 10° F. = 56° F. |
| Maximum CHWS Setpoint | 66° F. − 1° F. = 65° F. | 66° F. − 5° F. = 61° F. | i Thus, in this implementation, if the WCAHload value is 50%, the minimum CHWS setpoint would be 59° F. and the maximum CHWS setpoint would be 63° F.

q. Average SAT vs. Minimum SAT Selector Switch i A software selector switch can be included on a graphic page to allow an operator to choose between the minimum SAT setpoint and the average SAT setpoint for a particular reset routine.

ii It may be desirable to use the average setpoints, especially for facilities with relatively consistent loads (e.g., office buildings, other facilities which are not prone or less prone to immediate and short term spikes in chilled water system demands, etc.).

iii Alternatively, it may desirable to use the minimum setpoints for facilities with potentially inconsistent loads (e.g., hospitals with intermittent use Operating Suites, facilities with process cooling loads, facilities with many labs or other rooms which get turned on and shut down, facilities which are prone to immediate and short term spikes in chilled water system demands, etc.).

5. Minimum and Maximum CHW Setpoint Limit Modifiers a. In some implementations, the "Chilled Water (CHW) Supply Temperature Setpoint Self Tuning Loop" can make substantial changes in the final setpoint. Such changes may be intended to allow the loop to gain control of the loads, while limiting the potential for swings in the control loop.

b. Discussion i The following sections describe some implementations of how to develop the Minimum and Maximum Chilled Water Supply Setpoint Limit Modifiers.

ii A set of limits based proportionally on the Supply Air Temperature (SAT) setpoints and actual values, RAT/fan speed (WCAHload) setpoint and actual conditions, and the inputs from the self-tuning loop are modified based on the actual conditions and parameter related to a particular facility.

iii When the external loads are relatively high, the SAT and WCAHload-based minimum CHWS Setpoint Limit may be too high. Thus, the control system routines can be configured to lower the minimum setpoint, which may be referred to as the Modified Minimum Setpoint.

iv When the internal loads are relatively low, control system routines can be configured to reduce system cycling and promote energy conservation. Such routines can raise the SAT and WCAHload-based minimum CHWS Setpoint Limit, as well as the SAT and WCAHload based Maximum limit.

c. SAT and WCAHload based CHWS Limits i The SAT and WCAHload based CHWS temperature setpoint limits are described above.

ii The SAT and WCAHload based minimum and maximum setpoints can be modified (e.g., increased or decreased) based on actual system performance and/or on the mode of operation.

iii In some implementations, a final value which combines the SAT and WCAHload Limits with the Load Based modifiers and self tuning loop modifiers is used as the actual Minimum and Maximum limits to control the system.

d. Load-Based Modifications to the SAT and WCAHload based CHWS Limits i In one implementation, if the chiller system has been operating for greater than a particular time period (e.g., 30 minutes), the SAT and WCAHload-based Proportional CHWS Limits can be modified as described below:

a) Minimum CHWS Temperature Limit Modifiers

1) If the load is relatively light, the minimum SAT and WCAHload-based CHWS Temperature Setpoint can be increased. If the load is relatively heavy, the minimum SAT and WCAHload-based CHWS Temperature Setpoint can be decreased. The sequences below can be used to determine if the load is light or heavy.

2) The minimum SAT and WCAHload-based CHWS supply temperature setpoint can be increased, if the following logic is true:

(i) The WCAHSCD value is below the WCAH Setpoint and is decreasing, or is more than 50 below the WCAH setpoint; AND (ii) The Differential Pressure Setpoint is decreasing and is between the Minimum DP Setpoint and the Target DP Setpoint OR the Differential Pressure Setpoint is at or below 1 PSID greater than the Minimum DP Setpoint; AND (iii) The chilled water supply temperature setpoint is greater than 0.25° F. above the minimum Modified CHWS Setpoint limit (the SAT and WCAHload-based CHWS limit plus or minus the Load Based Reset Plus or minus the self-tuning-loop modifiers).

ii If the above logic is true, the minimum setpoint can be increased as described in the following implementation:

a) If the WCAHSCD value is less than the WCAH setpoint minus 10, the minimum CHWS temperature setpoint is increased at the rate of 0.01° F. per minute.

b) If the WCAHSCD value is less than the WCAH setpoint minus 20, the minimum CHWS temperature setpoint is increased at the rate of 0.08° F. per minute.

c) If the WCAHSCD value is less than the WCAH setpoint minus 30, the minimum CHWS temperature setpoint is increased at the rate of 0.16° F. per minute.

d) If the WCAHSCD value is less than the WCAH setpoint minus 50, the minimum CHWS temperature setpoint is increased at the rate of 0.33° F. per minute.

e) If the WCAHSCD value is less than the WCAH setpoint minus 70, the minimum CHWS temperature setpoint is increased at the rate of 0.49° F. per minute.

iii The rates described above can include fixed values. A final multiplier, which in some implementations is adjustable between 0.5 and 2.5, can be applied. The final multiplier can be applied using a slide bar adjuster on the graphic page or other user interface.

iv In some implementations, the maximum change from the SAT and WCAHload-based Proportional CHWS Limits is an increase of 4.1° F. above the Minimum setpoint as described by the SAT and WCAHload-based Proportional CHWS Limits.

v However, in some implementations, the Minimum Modified Setpoint limit cannot be greater than 1.5° F. below the Maximum Modified Setpoint limit.

e. In some implementations, the minimum SAT and WCAHload based CHWS supply temperature setpoint are decreased if the following logic is true:

i The CHWS temperature setpoint is within 0.5° F. of the minimum Modified CHWS Setpoint limit (The SAT and WCAHload-based CHWS limit plus or minus the Load Based Reset) for a 5 minute period plus or minus the self-tuning loop modifiers; AND ii The WCAHSCD value is above the WCAH Setpoint by a value of 100 or more, and is increasing; or the WCAHSCD value is above the WCAH Setpoint by a value of 223 or more; AND a) The Differential Pressure Setpoint is increasing and is between the Maximum DP Setpoint and the Target DP Setpoint; OR b) The Differential Pressure Setpoint is at or above 1 PSID less than at the Maximum DP Setpoint.

c) If the above logic is true, and the WCAHSCD value is greater than the WCAH setpoint, the minimum CHWS temperature setpoint can be decreased as described below:

1) If the WCAHSCD value is greater than the WCAH setpoint plus 100, the minimum CHWS temperature setpoint can be decreased at the rate of 0.01° F. per minute.

2) If the WCAHSCD value is greater than the WCAH setpoint plus 150, the minimum CHWS temperature setpoint can be reduced at the rate of 0.02° F. per minute.

3) If the WCAHSCD value is greater than the WCAH setpoint plus 250, the minimum CHWS temperature setpoint can be reduced at the rate of 0.04° F. per minute.

4) If the WCAHSCD value is greater than the WCAH setpoint plus 350, the minimum CHWS temperature setpoint can be reduced at the rate of 0.16° F. per minute.

5) If the WCAHSCD value is greater than the WCAH setpoint plus 400, the minimum CHWS temperature setpoint can be reduced at the rate of 0.35° F. per minute.

d) The rates described above can be fixed values. A final multiplier can be applied which may be adjustable between 0.5 and 2.5. In some implementations, the multiplier is applied using a slide bar adjuster on a graphic page.

e) In some implementations, the maximum change from the SAT and WCAHload based Proportional CHWS Limits can be a decrease of 7.4° F. below the Minimum setpoint as described by the SAT and WCAHload based Proportional CHWS Limits.

f. Maximum CHWS Temperature Limit Modifiers i If the load is relatively light, the maximum SAT and WCAHload based CHWS Temperature Setpoint can be raised. If the load is relatively heavy, the maximum CHWS Temperature Setpoint can be decreased to the WCAHload Maximum limit. In some implementations, the following sequences can be used to determine if the load is light or heavy.

ii The maximum CHWS supply temperature setpoint can be increased if the following logic is true:

a) The WCAHSCD Value is below the WCAH Setpoint, and is decreasing, or is more than 50 below the WCAH setpoint; AND 1) The Differential Pressure Setpoint is decreasing and is between the Minimum DP Setpoint and the Target DP Setpoint; OR 2) The Differential Pressure Setpoint is at or below 1 PSID greater than the Minimum DP Setpoint.

AND b) The CHWS Temperature Setpoint is within 0.5° F. of the Maximum SAT and WCAHload-based Setpoint Limit, or is above the Maximum SAT and WCAHload based Setpoint Limit.

c) If the above logic is true, the maximum CHWS temperature setpoint can be increased as described in the implementation below:

1) If the WCAHSCD value is less than the WCAH setpoint minus 10, the maximum CHWS temperature setpoint is increased at the rate of 0.005° F. per minute.

2) If the WCAHSCD value is less than the WCAH setpoint minus 20, the maximum CHWS temperature setpoint is increased at the rate of 0.009° F. per minute.

3) If the WCAHSCD value is less than the WCAH setpoint minus 30, the maximum CHWS temperature setpoint is increased at the rate of 0.017° F. per minute.

4) If the WCAHSCD value is less than the WCAH setpoint minus 40, the maximum CHWS temperature setpoint is increased at the rate of 0.021° F. per minute.

5) If the WCAHSCD value is less than the WCAH setpoint minus 50, the maximum CHWS temperature setpoint is increased at the rate of 0.071° F. per minute.

d) The rates described above can be fixed values. However, a final multiplier can be applied. In some implementations, such multipliers are adjustable between a value of 0.5 and 2.5, using a slide bar adjuster on the graphic page.

e) In some implementations, the maximum change from the SAT and WCAHload based Proportional CHWS Limits is an increase of 3.9° F. above the Maximum setpoint as described by the SAT and WCAHload based Proportional CHWS Limits.

f) The maximum modified CHWS supply temperature setpoint can be decreased if the following logic is true:

1) The CHWS temperature setpoint is 1.1° F. or more below the modified (SAT and WCAHload based plus or minus load based reset plus or minus the self-tuning loop modifiers) CHWS Temperature limit.

2) If the above logic is true, and the WCAHSCD values are greater than the WCAH setpoint, the maximum setpoint can be decreased as described in the implementation below:

(i) If the WCAHSCD value is greater than the WCAH setpoint plus 100, the maximum CHWS temperature setpoint is reduced at the rate of 0.015° F. per minute.

(ii) If the WCAHSCD value is greater than the WCAH setpoint plus 150, the maximum CHWS temperature setpoint is reduced at the rate of 0.029° F. per minute.

(iii) If the WCAHSCD value is greater than the WCAH setpoint plus 250, the maximum CHWS temperature setpoint is reduced at the rate of 0.047° F. per minute.

(iv) If the WCAHSCD value is greater than the WCAH setpoint plus 350, the maximum CHWS temperature setpoint is reduced at the rate of 0.079° F. per minute.

(v) If the WCAHSCD value is greater than the WCAH setpoint plus 400, the maximum CHWS temperature setpoint is reduced at the rate of 0.19° F. per minute.

3) The rates described above can be fixed values. A final multiplier may be applied which can be adjustable between 0.5 and 2.5. In some implementations, the multiplier can be adjusted using a slide bar adjuster on the graphic page.

4) Consequently, the maximum Modified Setpoint can be reduced to the Maximum SAT and WCAHload based Reset Limit.

N. CHW Supply Temperature Setpoint Final Limits

1. To reduce the potential for swings in the CHWS temperature setpoint, these final CHWS temperature setpoint limits can be installed and used as "chokes."

2. In one implementation, after the chiller plant has been operational continuously for 120 minutes, the following CHWS temperature setpoint limitations can be enabled.

3. For 24/7 facilities, the 120 minute timer can be enabled at 8:00 AM each day, enabling the limits to start to take effect at 10:00 AM.

4. The CHWS temperature setpoint command can be continuously monitored. In one implementation, a 30 minute average of the CHWS temperature setpoint command can be taken using a minimum of 15 data points to obtain the average.

5. In addition, the system can be configured to update this 30 minute average every 2 minutes so that a continuously rolling 30 minute average of the CHWS temperature setpoint can be obtained throughout the day.

6. At the 120 minute mark, the preceding 30-minute average CHWS temperature setpoint can be used as a target for the minimum and maximum CHWS temperature setpoints.

7. In some implementation, it is desirable to not invoke these limits prior to the 120 minute mark.

8. In some implementations, the CHWS temperature setpoint may not be permitted to increase above 2.1° F. greater than the continuously rolling 30 minute average value for the CHWS temperature setpoint.

9. Further, the CHWS temperature setpoint may not be permitted to decrease below 4.4° F. lower than the continuously rolling 30 minute average value for the CHWS temperature setpoint.

10. For 24/7 facilities, such limits can be disabled at 6:00 PM daily.

O. Cooling Tower Fan Variable Speed Control

1. General Discussion a. The cooling tower fan speed can be modulated to control the Condenser Water (CDW) supply temperature over a floating temperature range. In some implementations, the cooling tower fan speed can be modified if the temperature differential between the chilled water supply temperature and the condenser water supply temperature is above a fixed differential temperature setpoint, the fan kW per ton value is within its allowable limits, and the condenser water return temperature is below its limits.

b. The operational cooling tower fans can receive the same speed signal when the cooling tower is placed into operation. However, if a cooling tower has been isolated (e.g., closed), its fan(s) are desirably not being operated.

c. In some implementations, there are four separate PID control loops whose input can help control the speed of the cooling tower fans. The control loops, along with the low signal selection and high signal selection logic can be used to determine which of these four PID loops will have control of the output signal at any given time. The four control loops include:

i Minimum Condenser Water Supply Limit Loop ii Fan kW Per Ton Limit Loop iii Maximum Condenser Water Supply Temperature Control Loop iv Maximum Condenser Water Return Temperature Control Loop d. As ambient conditions and cooling loads change, the control of the output signal being sent to the Cooling Tower Fans (CTF) Variable Speed Drives (VSDs) may vary continuously between these four PID loops.

2. Transition Between the Control Loops a. In some implementations, under relatively light load and cool ambient conditions, the "Minimum CDWS Limit Loop" is likely to control the output signal being sent to the CTF VSDs.

b. As the cooling loads increase, the "Fan kW Per Ton Limit Loop" is likely to begin affecting the controlled output signal. Thus, the "Fan kW Per Ton Limit Loop" may become the limiting factor.

c. If the cooling loads continue to increase and ambient conditions warm up (or in case of a CTF failure), the "Maximum Condenser Water Supply (CDWS) Temperature Control Loop" and the "Maximum CDWR Temperature Control Loop" may control the output signal sent to the VSDs. The "Maximum CDWR Temperature Control Loop" may be the controlling factor on the output signal sent to the VSDs if the CDWS temperature sensor and/or the kW per ton logic fails.

3. How the Control Loops Work a. In some implementations, the output from the Fan kW per Ton Limit Loop and the Minimum CDWS Temperature Control Loop are continuously calculating the required output signal to meet their individual setpoints. These output signals can be continuously compared to one another. The loop with the lowest output signal (low signal selector) is preferably sent to the next logic comparison.

b. The next comparison can look at the output from the kW per ton and minimum CDWS setpoint low signal selector, and compare it to the loop output for the maximum CDWS temperature control loop. These two loops can then have their signals high signal selected and sent to the next logic comparison.

c. The next comparison can examine the output from the high signal selector logic described above and perform another high signal selection routine. In some implementations, such a routine can be performed between the Maximum CDWR temperature control loop and the output from the previous high signal selector.

d. This high signal selection from this comparison can then be sent to the CTF VSDs to control their speed.

4. Reasoning for this Logic a. The logic desirably attempts to provide the coldest condenser water possible, without negatively impacting the overall chiller plant efficiency. In one implementation, the low limit logic (minimum CDWS limit) attempts to decrease the temperature of the condenser water, and the fan kW per ton limitation logic helps ensure that that energy is not unnecessarily wasted as a result of lowering the temperature of the condenser water.

b. For example, it may be impossible to get 60° F. condenser water if the wet bulb temperature is greater than approximately 55° F. when a chiller is reasonably loaded. However, if the setpoint was maintained at 60° F. in an effort to maximize the chiller efficiency, the operation of the cooling towers can impact the system with 0.6 kW per ton or more under light loads. Therefore, this may be more energy than the chillers would use.

c. Consequently, these two control loops (e.g., the kW limit and the low temperature setpoint) are low-signal selected. This can help deliver a minimum condenser water temperature at the best possible overall plant efficiency.

d. In some implementations, it is desirable to maintain the condenser water below the maximum CDWS or CDWR temperature setpoints. In a multiple fan cooling tower system, if one fan fails, the kW per ton ratio of the remaining fans may begin to increase. This can cause the limits set by the kW per ton limitation control program to be exceeded. The kW per ton low signal selector can maintain the cooling tower fans from responding to the temperature requirements in this failure mode.

e. If the CDWS sensor fails, the cooling tower fans may tend to go to zero speed, unless another logic loop is incorporated into the control system. As a last gasp-fail safe routine, the highest signal from the {(low temperature and kW per ton) loop output and the maximum CDWS temperature control loop} output. This output can then be high signal selected with the output from the Maximum CDWR temperature control loop.

f. If the condenser water temperature leaving the cooling tower is below the maximum CDWS and CDWR limit, the high limit control loop can output a value of zero. Thus, the lowest of the low temperature limit and kW per ton limit control loops may control the fan speed.

g. If the temperature is above the maximum CDWS limit setpoint, the maximum CDWS limit loop can drive the fan speed, regardless of the fan kW per ton limitation.

h. If the temperature is above the maximum CDWR limit setpoint, the maximum CDWR limit loop can drive the fan speed, regardless of the fan kW per ton limitation or the reading from the CDWS sensor and its control loop.

5. Fan kW per Ton Demand Limit Loop a. The first PID control loop can be designed to limit the penalty of the cooling tower fan (CTF) motors on the overall plant kW per ton ratio. In one implementation, the allowable cooling tower fan kW per ton ratio is proportionally reset between 0.0213 kW/ton (minctkw-ton) and 0.0571 kW/ton (maxctkw-ton). In such an implementation, the ratio reset can be based on the measured six-minute average chiller tonnage between 101 tons (minct-tons) and 1,283 tons (maxct-tons).

b. If the cooling tower fan kW divided by the six-minute average chiller tons exceeds the allowable kW per ton ratio, the fans can be demand limited as required to maintain the kW per ton ratio at the desired setpoint.

c. If the kW per ton ratio is below the setpoint, the PID loop output can be permitted to increase until the fan kW has reached the desired limitation.

d. Example calculation: assuming the six-minute average cooling load is 473 tons, the maximum kW per ton ratio for the cooling tower fans is calculated as follows:

i (473−101=372)

ii (1283−101=1182)

iii (372/1182=0.3147; or 31.47% of the reset range)

iv (0.0571−0.0213=0.0358)

v (31.47% of this range=0.3147*0.0358=0.011266)

e. This could be added to the low range value of 0.0213 to equal 0.032566. Thus, the maximum kW per ton ratio for this implementation is 0.032566. This figure times the tonnage of 473 determines the maximum kW that the cooling tower (CT) fans are allowed to consume. For this implementation, this equals 15.4 kW (473*0.32566=15.4 kW).

f. If the actual fan kW is above this limit, the speed of the cooling tower fan can be advantageously reduced. Alternatively, if the fan kW is below this limit, this loop can be allowed to increase the cooling tower speed.

g. In some implementations, two separate PID loops can be used to limit the fan speed to the described ratios. For example, a relatively aggressive loop can be used if the kW/ton ratio is above the setpoint to decrease the fan speed. Another less aggressive loop can be used if the kW/ton is below the setpoint to increase the fan speed. This may be desirable because of the non-linear relationship between fan power and fan speed. For example, as the fan speed increases, the kW can increase to the cube of the speed increase. Thus, the power consumption related to the cooling fans can get out of control relatively easily, especially when the fan speed is comparatively high.

6. Minimum CDWS Temperature Control Loop a. The second PID control loop can be configured to reduce or minimize the condenser water supply temperature.

b. In one implementation, the PID loop can be configured to maintain the condenser water supply temperature at the higher of the following three variables:

i A fixed minimum CDWS setpoint which may be set by an operating engineer for each chiller—XX° F.;

ii The lowest CDWS temperature that will still provide a 3 PSID to 6 PSID differential between the evaporator refrigerant pressure and the condenser refrigerant pressure on the chillers;

iii The chilled water supply temperature leaving the chiller evaporator plus an adjustable offset based on the condenser water temperature differential (TD) across the chiller as follows:

a) Constant Speed Chiller: in one implementation, the adjustable offset for the constant speed chiller is calculated to be 1.25 times the condenser water temperature differential across the chiller, with a minimum offset of 6° F. and a maximum offset of 13° F. For example, if the TD across the condenser is 7.5° F., the offset would be 9.375° F. (1.25× 7.5=9.375° F.). Such an offset can be added to the chilled water supply temperature. The resulting sum or one of the other two minimums (whichever is higher) may be used as the target minimum condenser water setpoint.

b) Variable Speed Drive Speed Chiller: in one implementation, the adjustable offset for the variable speed chiller is calculated to be 0.81 times the condenser water temperature differential across the chiller, with a minimum offset of 4° F. and a maximum offset of 11° F. For example, if the TD across the condenser is measured at 7.5° F., the offset would be 6.075° F. (0.81×7.5=6.075° F.). This offset would be added to the chilled water supply temperature. The resulting sum and either this figure or one of the other two minimums (whichever is higher) can be used as the target minimum condenser water setpoint.

c. The temperature "XX° F." described herein can be based on the one or more chiller that are in operation.

i In one implementation, if a VSD centrifugal chiller is the only chiller in operation, XX° F. equals 60° F. (initial setpoint; operator adjustable).

ii If a constant speed chiller is operational, XX° F. can equal 68° F. (initial setpoint; operator adjustable).

iii Where there are multiple chiller types and they are simultaneously being operated, the highest minimum setpoint can be utilized.

d. To determine the minimum CDWS temperature associated with maintaining the refrigerant differential pressure at or above its setpoint, the refrigerant differential pressure and the CDW supply temperature entering the chiller can be advantageously monitored.

i Depending upon the chiller and the chiller interface, a need a exist to monitor the condenser refrigerant pressure and the evaporator refrigerant pressure. Under such a scenario, the evaporator refrigerant pressure can be subtracted from the condenser refrigerant pressure to obtain the refrigerant differential pressure.

ii A refrigerant differential pressure setpoint for each chiller can be created. The refrigerant differential pressure setpoint (REFDPSTPTCH#) can be a proportionally reset variable, based on the load of the chiller.

a) In one implementation, the initial values in the proportional table vary between 3 PSID and 6 PSID, based on chiller loading of 20% to 100%.

iii The minimum CDWS temperature setpoint equal can be set to 0.5° F. below the entering CDW temperature if the refrigerant differential pressure is greater than the REFDPSTPTCH# plus a 0.3 PSID offset.

a) In some implementations, if the refrigerant differential pressure is less than 0.2 PSID above the setpoint (REFDPSTPTCH# plus a 0.2 PSID offset), the minimum CDWS temperature is set equal to the chiller entering CDW temperature plus a 0.43° F. offset.

iv Such logic can be configured to continually increase the minimum CDWS setpoint in small amounts as long as the refrigerant DP is less than 0.2 PSID above the desired refrigerant DP setpoint.

v In some implementations, for chillers that have no refrigerant pressure monitoring, this value can be set equal to 0.5° F. below the entering CDWS temperature, so it will have no effect on the cooling tower controls.

a) The system can comprise an "on/off" switch to control the availability of refrigerant differential pressure monitoring.

e. Examples include (in the following examples, assume the minimum CDWS setpoint is 55° F.):

i If the chilled water supply temperature is 54° F., and the condenser water TD across the chiller is 4° F., the minimum CDWS temperature is the higher of either 55° F. or (54° F.+1.25×4° F.=59° F.). However, the minimum offset is 6° F., which is higher than 1.25×4° F. Therefore, use 6° F. (add: 54° F.+6° F.=60° F.) in the calculation. Since 60° F. is greater than 55° F., 60° F. is the minimum temperature.

ii If the chilled water supply temperature is 48° F., and the condenser water TD is 12° F., the minimum CDWS temperature is the higher of either 55° F. or (48° F.+1.25×12° F.=63° F.). However, the maximum offset is 13° F., which is less than 1.25×12° F. (48° F.+13° F.=61° F.). Thus, 61° F. is the minimum temperature.

iii If the chilled water supply temperature is 44° F., and the condenser water TD is 11° F., the minimum CDWS temperature is the higher of either 55° F. or (44° F.+1.25×11° F.=57.75° F.). However, the maximum offset is 13° F., which is less than 1.25×11° F., so 44° F.+13° F.=57° F. The minimum temperature in this example is 57° F.

iv If the chilled water supply temperature is 40° F., and the condenser water TD is 10° F., the minimum CDWS temperature is the higher of either 55° F. or (40° F.+1.25×10° F.=52.25° F.). Since 55° F. is higher than 52.25° F., the 55° F. minimum setpoint would drive the process.

7. Maximum Condenser Water Supply (CDWS) Temperature Control Loop a. In one implementation, the maximum CDWS setpoint limit PID control loop is configured to allow a maximum condenser water supply temperature of 78° F.

b. The maximum CDWS setpoint limit PID control loop can have relatively high gains associated with it, including Derivative, to gain control of the load rapidly.

c. In this implementation, in order to reduce the potential for integral windup, this PID logic can be prevented from being enabled until the CDWS temperature is within 2° F. of the maximum CDWS setpoint. The derivative term can help eliminate the integral windup as well.

8. Maximum CDWR Temperature Control Loop a. In some implementations, the maximum CDWR setpoint limit PID control loop is configured to allow a maximum condenser water return temperature of 88° F. returning to the cooling towers from any of the operational chillers.

b. The maximum CDWR setpoint limit PID control loop can have relatively high gains associated with it, including Derivative, in order to quickly gain control of a load.

i In this implementation, in order to reduce the potential for integral windup, this PID logic can be prevented from being enabled until the CDWR temperature is within 2° F. of the maximum CDWR setpoint. The derivative term can help eliminate the integral windup as well.

9. Initial Startup, Shutdown and Restart a. In some implementations, on initial system startup, the six-minute average chiller tons value is zero. Thus, there is the potential to cause high condenser water temperatures to be delivered to the chiller, which may result in nuisance trips.

b. To reduce the likelihood of this occurring, an initial PID control loop can be utilized to control the CTF fan speed. In one implementation, the setpoint can be as follows:

i 65° F. if one chiller is operational;

ii 71° F. if more than one chiller is operational.

c. In this implementation, such a control loop is used with a maximum fan speed of 61% for the first 12 minutes of chiller operation. After this initial startup period, the other sequences can be permitted to maintain control.

d. In this implementation, when the cooling tower fan speed has been below 5% commanded speed for a period of 10 minutes, the cooling tower fan VFCs can be shut off.

e. Upon realizing a 10% rise to a commanded speed setpoint, the cooling tower fan VFCs can be re-enabled.

P. Cooling Tower Cell Staging

1. The cooling tower cell capacity that is operational can be proportional to the percentage of the installed chiller capacity that is operational and the percentage load on that chiller capacity.

2. In one implementation, as the percentage of installed chiller capacity that is operational varies between 10% to 80%, the percentage of installed cooling tower capacity is configured to vary between 40% and 100%.

3. In one implementation, as the percentage load on the operational equipment varies between 50% to 100%, a stage capacity multiplier is used to increase the number of stages of cooling tower capacity that are operational.

4. In one implementation, as the load on the operational equipment varies between 50% and 100%, the number of stages that are requested by the installed chiller capacity percentage calculation are multiplied by a factor between 1 and 1.25.

Q. Chilled Water Coasting Cycle

1. It may be possible to stop the chiller plant cooling equipment (e.g., chillers, chilled water pumps, cooling tower fans, etc.) 30 to 120 minutes before the end of the day and use the stored cooling energy in the chilled water loop to provide cooling to the facility. Thus, in such implementations, all equipment, except the chilled water pumps, can be shut down.

2. When the coasting cycle is invoked, either by automatic timer or sequence set by the operator, the refrigeration equipment in the chiller plant can be stopped, except for the chilled water pumps.

3. For Primary-only or primary only-variable flow plants a. The isolation valves on the evaporators of all chillers can be opened when in this mode to reduce pressure losses across the chillers and leave the operating chilled water pumps in operation.

4. For Primary-secondary plants a. The primary pumps can be shut down, and the secondary pumps which were operating can be allowed to continue operating.

5. Shutdown Time/Temperature a. The last scheduled AHU operational time can be the "normal" shutdown time for the chillers, CDWPs and CTFs. This time can be set by either the normal or after-hours schedule, or the start/stop optimization routine. The actual shutdown time of the chillers, CDWPs and CTFs can be reset proportionately based on the worst case return air temperature from the selected AHUs that are operational.

b. In one implementation, if the worst case return air temperature from the selected operational AHUs is between 72.3° F. and 77.1° F., the chillers, CDWPs and CTFs can be permitted to shut down 120 minutes to 45 minutes prior to the normal shutdown time.

6. Pump/AHU Speed Limitation a. In one implementation, the maximum speed of the chilled water pumps are fixed at 81% of the average speed at which the pumps operated during the most recent 6-minute average prior to receiving the shutdown command, or 81% of the required speed to maintain the differential pressure setpoint, whichever is less. Otherwise, the speed of the pumps can be controlled according to the standard pump control sequences of operation (e.g., as described herein).

b. In one implementation, the maximum speed of the AHU variable speed drives are set at 85% of the average speed at which the fans operated during the most recent 6-minute average prior to receiving the shutdown command, or 85% of the required speed to maintain the static pressure setpoint, whichever is less. Otherwise, the speed of the pumps can be controlled according to the standard fan control sequences of operation.

c. If the AHU Thermal Flywheel logic is operational, the previous paragraph can be superseded by such logic.

7. System Restart a. If the load increases, and additional cooling is required, the Low Load/Coastdown Chiller Restart logic described herein can be used to restart the chiller plant.

R. Chiller Low Load Shutdown

1. In some implementations, the chillers, condenser water pumps and cooling tower fan system can be shut down if:

a. The load on the chiller plant is less than 10% of the peak design tons for 35 minutes or the load on the chiller plant is less than 5% of the peak design tons for 25 minutes; AND b. None of the return air temperatures on the AHUs which are operating are above Setpoint A plus 2.1° F.

S. Chiller/Cooling System Low Load/Coastdown Restart

1. Chiller System Restart After Shutdown a. In some implementations, if the following conditions are met, the chiller system is restarted:

i If the return air temperature on any selected AHU which is operating reaches 1.12° F. above the low load chiller shutdown setpoint and it has a call for cooling; OR ii If the site chilled water flow rate is above 600 GPM for 38 minutes, the chilled water return temperature is above 65° F. for 23 minutes and there is one AHU in operation.

2. Chiller System Restart Setpoints a. The lead chiller can be started.

b. In one implementation, when the chiller system is restarted after a low load shut down command or a coasting cycle command, the initial startup chilled water supply temperature setpoint is 55.6° F. for 30 minutes. Following this time period, normal reset strategies can be allowed to take control of the setpoint.

c. After a restart following a low load shutdown or coastdown restart, and prior to a time of day based restart, the system can be configured to not permit the chiller capacity to stage up to the next higher increment of capacity for at least 45 minutes. This can allow the initial stage of capacity to bring the load under control, if possible.

T. Chiller Plant Initial Startup Cooling Lockout

1. In one implementation, on the first chiller plant startup command for the day, the chillers are not permitted to be enabled until the following conditions have been met:

a. There is at least one AHU on and calling for cooling; AND b. Either the outside air (OSA) temperature is above 60° F. or the return air temperature is above Setpoint A plus 0.5° F.; AND c. Either the supply air temperature from an operational AHU has been 2° F. above the setpoint for 15 minutes after the fan has been enabled or the return air temperature is above Setpoint A plus 0.72° F.; AND d. The worst case cooling coil control valve is above 51% open; AND e. The worst case fan speed is above 65%.
OR
f. The time is after 10:30 AM and the supply air temperature is 2.5° F. above setpoint.

2. After the initial startup lockout has been triggered, the lockout can be disabled until the next day (e.g., after midnight), so the lockout may not be starting and stopping the plant during the day as the loads fluctuate.

U. Chilled Water Loop Precool Mode

1. In one implementation, if the highest temperature on the previous day was above 85° F., a chilled water loop precool command is initiated at the morning startup.

2. A start time for this command can be scheduled at least 30 minutes prior to the first AHU schedule command.

3. Such a routine can be set up in an optimum start stop program. Further, a CHWR temperature setpoint of 60° F. can be used as the variable to control. Thus, under such an implementation, the start time can automatically adjust depending upon the load that the plant recognizes.

4. The chilled water loop precool command can open the chilled water valves at the AHUs to 10% open and start the chiller plant.

5. In this implementation, after 5 minutes, the chilled water valves can be opened based on the return air temperature in their respective return air fan systems. As the RAT varies between Setpoint A plus 1° F. and Setpoint A plus 4° F., the CHW valve can be proportionally opened between 10% and 35% on all the units.

6. When an AHU becomes enabled, control of the AHU cooling coil control valve can be returned to the local PID loops controlling supply air temperature.

V. Chiller staging up:

1. As the control system determines that one or more of the "stage up" system setpoint have been exceeded, the chiller staging routine increases the available cooling capacity by "staging up" the chiller count. In some implementations, the setpoints include: differential pressure, tons, chiller flow, Site flow vs. primary flow, bypass flow, temperature over setpoint.

W. Chiller staging down

1. As the control system determines that one or more of the "stage down" system setpoint have been exceeded, the chiller staging routine decreases the available cooling capacity by "staging down" the chiller count. In some implementations, the setpoints include: DP, tons, chiller flow, Site flow vs. primary flow, bypass flow, etc.

X. Primary CHW Pump Speed Control

1. In one implementation, the speed of the primary chilled water pumps is controlled as required to maintain the return water temperature which enters the chiller primary loop at 1° F. below the return water temperature from the site cooling loop.

2. This can help ensure that all of the water from the site goes through the chillers, with no bypass water going past the chillers in the decoupling bypass line.

3. Since the pumps and chillers may be differently sized, each pump speed command output can be provided with an adjustable offset from the commanded signal.

a. In one implementation, the adjustable offset for pump number 1 is initially set for 95% of the commanded signal.

b. The adjustable offset for pump number 2 is initially set for 93% of the commanded signal.

c. The adjustable offset for pump number 3 is initially set for 97% of the commanded signal.

d. The adjustable offset for pump number 4 is initially set for 99% of the commanded signal.

e. The adjustable offset for pump number 5 is initially set for 91% of the commanded signal.

f. The adjustable offset for pump number 6 is initially set for 92% of the commanded signal.

g. The adjustable offset for pump number 7 is initially set for 107% of the commanded signal.

h. The adjustable offset for pump number 8 is initially set for 109% of the commanded signal.

i. The adjustable offset for pump number 9 is initially set for 101% of the commanded signal.

j. The adjustable offset for pump number 10 is initially set for 102% of the commanded signal.

Y. Secondary Chilled Water Pump Speed Control

1. The secondary chiller plant pumps can be controlled to maintain the differential pressure setpoint of the chilled water loop.

Z. Condenser Water Pump Speed Control

1. The speed of the condenser water pumps can be controlled to maintain an SS.x° F. temperature differential across the operating chiller(s).

a. If the differential temperature across the condenser barrel is too high, the pump speed can be slowly increased to reach the setpoint of SS.x° F.

b. If the differential temperature across the condenser barrel is too low, the pump speed can be slowly decreased to reach the setpoint of SS.x° F.

c. In one implementation, the condenser water temperature differential setpoint described above, SS.x° F., is varied proportionally to the cooling capacity being delivered by the chiller. As the load drops off, it may be possible to handle a higher CDW temperature differential across the chiller, as this strategy conserves pump energy. In addition, this strategy can increase cooling tower system capacity and efficiency.

d. Based on the chiller capacity being delivered to the site at 50% to 120% of the design chiller capacity, the condenser water temperature differential setpoint can be varied between 13.7° F. and 10.1° F.

e. In one implementation, the Chiller Design Capacity is 1100 tons each for Chiller No. 1 (CH-1) and Chiller No. 2 (CH-2), 1200 tons each for Chiller No. 3 (CH-3) and Chiller No. 4 (CH-4) and 600 tons for Chiller No. 5 (CH-5). In addition, each of Chiller Nos. 6 through 10 (CH-6-CH-10) is 1000 tons.

2. A proportional band (deadband) of 1° F. can be used to reduce swings in the pump speed command.

3. A fixed minimum speed of XXX HZ (to be determined in the field) set up in the VFC can be used to ensure that minimum flow requirements in the chiller condenser barrel and cooling tower fill are satisfied. In some implementations, this speed can be as low as 25%.

4. For systems that have "ganged" CDW pumps on a common header that feeds multiple chillers, the worst case temperature differential across the operating chiller(s) condenser can be used as the guiding temperature differential.

5. For CDW pumps that feed and individual chiller, the CDW Temperature Differential (TD) across that chiller can be used. If, the CDW TD is not available (e.g., failed sensor, etc.), the CDW temperature differential across the cooling tower system can be used as the guiding TD for the pump speed.

II. Calculations for System Tons, kW, kW per Ton and kWh per Ton-hour

A. The calculated flow rate across each chiller (e.g., using differential pressure across each chiller) can be used along with the temperature differential across each chiller to calculate the tons each chiller is delivering.

B. The measured kW and the calculated tons can be used for the calculations of kW/ton and kWh/ton-hour for each chiller.

C. In some implementations, the kW per ton for the chiller and for other associated equipment can be set to zero when the chillers are not in operation and for the first ten minutes following chiller startup.
  1. The kW/ton and kWh/ton-hour efficiency for the chiller system accessories can also be calculated individually:
    a. Site chilled water pumps, individually and in total
    b. Condenser water pumps, individually and in total
    c. Cooling tower fans, individually and in total
    d. Total auxiliary equipment kW/ton
    e. Chillers, individually and in total
    f. Chiller cooling system as a whole
    g. Total chiller equipment kWh per day
    h. Total chiller plant ton-hours per day
    i. Total chiller plant kWh per ton-hour
    j. Total AHU kW/ton—supply and return fans
    k. Total HVAC system kW/ton
    l. Each AHU kW (supply and return fans individually, and combined for each AHU).
    m. Main Plant meter kW
III. Minimum Live Data Graphics
  A. In some implementations, there are approximately 100 to 300 dynamic graphic pages associated with such a control scheme. As a minimum, the following graphics can be developed and implemented for use in operator interface with the system.
  B. Bar graphs depicting the actual value and the setpoint on one bar chart may be the most space efficient manner to display these data.
  C. Tables of values can also be included.
  D. AHU chilled water worst case control valve position and selections.
  E. AHU WCAHload values.
  F. AHU WCAH values and the associated multipliers for size, criticality and distance. Further, the pre- and post-multiplier values for WCAH.
  G. AHU chilled water worst case control valve position and selections.
  H. Chiller plant as a whole.
  I. Chiller/chilled water pumping system.
  J. Condenser water systems CTFs and pumps.
  K. For the plant as a whole: tonnage, flow rate, chilled water supply temperature, chilled water return temperature, chilled water differential temperature, chilled water differential pressure, total fan average speed, etc.
  L. Tuning pages with the associated variables and description of the control logic used in the sequence of operation. Each tuning page can include a detailed description of the sequence of operation for each piece of equipment or system. The configuration of the page and variables can be approved prior to developing the graphics, and may promote user understanding of the tuning and systems operations. Each system or piece of equipment can have several graphical pages linked to one another as desired or required to accurately and clearly depict the sequences and tuning ability of the system.
  M. Chilled water supply temperature setpoint reset, along with the values resulting from the intermediate calculated values.
  N. Chilled water supply differential pressure reset.
  O. Cooling tower supply temperature setpoint reset.
  P. Chiller system startup setpoints and variables.
  Q. Chiller system staging setpoints and variables.
  R. Chilled water pump system staging setpoints and variables.
  S. Condenser water pump system staging setpoints and variables.
  T. Chilled water system coasting cycle setpoints and variables.
  U. Low Load chiller shutdown/restart setpoints and variables.
  V. AHU resets and limits for static pressure, and supply air temperature, economizer limits, system lockouts, etc.
  W. The respective variables for each AHU can be displayed. Separate graphic pages are preferably provided for each AHU, and the tuning constants and sequences for each AHU.
  X. The respective variables can be displayed for each variable speed drive. A separate graphic for each VSD can be preferably provided.
  Y. The variables associated with the LONWORKS or BACnet interfaces for the equipment can be displayed. In addition, the VSDs for each piece of equipment can be shown on individual graphic pages.
  Z. The sequences of operation can be included as graphic pages.
  AA. Any other systems and equipment can also be included.
  BB. In some implementations, all data, system tuning pages and variables and control/monitoring points can be contained on easily accessible graphic pages, linked to other pages for ease of operator review.
  CC. Each point on the project can be included on a graphic page for operator accessibility and use.
IV. Trend-Logs/Trend Graphs
  A. The trended data can be configured to be available in memory for the maximum period possible. In some implementations, this period is not less than 365 days.
  B. Trend logs and trend graphs can be provided, developed and input into the system.
  C. In some implementations, variables can be trended and stored at 1-minute intervals. Such variables can have on-screen graphs depicting the real time "dynamic" variable values. In addition, historical trend graphs depicting preceding time periods (e.g., 7-day periods) can be provided for viewing by operators and others.
  D. Where more than one piece of equipment is called out, the information for each piece of equipment can be graphed separately.
  E. Cooling Tower Fan system speed command, PID loop outputs from the various loops, and the three different calculated values for the minimum CDWS setpoint.
  F. Individual Cooling Tower Fan kW demand.
  G. Total Cooling Tower Fan kW demand.
  H. Temperature of water returning to cooling towers.
  I. Temperature of water leaving the cooling towers.
  J. Cooling Tower Fan kW/system ton.
  K. Average kWh/ton-hour for the cooling tower fan system.
  L. Total Cooling Load (e.g., in tons) and individual chiller cooling load (e.g., in tons).
  M. Flow Rate (e.g., in GPM) and Refrigeration Plant kW.
  N. Site Chilled Water Supply and Return Temperatures.
  O. Chilled Water Temperature returning to the chillers.
  P. Chilled Water Differential Pressure vs. Differential Pressure Setpoint.
  Q. Common Chiller Condenser Water Supply Temperature, CH-1,2 Condenser Water Return Temperature.
  R. Chiller kW and chiller tons.
  S. Chiller kW/ton and combined chiller kW/ton.
  T. CTF kW, CTF kW/ton and Combined CTF kW/ton.
  U. CTF fan speed command.
  V. CDWP, CDWP kW/ton and Combined CDWP kW/ton.

W. CHWP kW, CHWP kW/ton and Combined CHWP kW/ton.

X. Supply and return fan speed.

Y. Supply and return fan kW.

Z. Supply fan static setpoints and actual value.

AA. Supply fan SAT setpoints and actual value.

BB. Cooling coil control valve position.

CC. Various system temperatures (e.g., chilled water, condenser water, airside, etc.).

DD. Various system setpoints and variables (e.g., chilled water, condenser water, airside, etc.).

EE. CHW DP and temperature setpoints and actual values.

FF. CHW valve position commands.

GG. WCAH values from each AHU (prior to and after the multipliers for size, criticality and location).

HH. Minimum and maximum CHW supply temperature setpoints before the min/max modifiers.

II. Minimum and maximum CHW supply temperature setpoints after the min/max modifiers have been applied.

JJ. Minimum and maximum CHW DP setpoints before the min/max modifiers.

KK. Minimum and maximum CHW DP setpoints after the min/max modifiers have been applied.

LL. Min/max modifier amounts for the CHW supply temperature setpoints.

MM. Min/max modifier amounts for the CHW DP setpoints.

NN. Bypass valve command position.

OO. Mode commands (e.g., warm-up, precool, coasting cycle, low load, Thermal Flywheel, etc.).

PP. Supply and return fan CFM and tracking offsets.

QQ. Virtual points that vary (e.g., calculated points).

RR. Daily totals (e.g., ton-hours delivered to the site, kWh consumed by the total plant, kWh consumed by the chillers, kWh consumed by the cooling tower fans, consumed by the chilled water pumps, kWh consumed by the condenser water pumps, etc.).

SS. Daily totals (e.g., ton-hours delivered to the site, kWh/ton-hour consumed by the total plant, kWh/ton-hour consumed by the chillers, kWh/ton-hour consumed by the cooling tower fans, kWh/ton-hour consumed by the chilled water pumps, kWh/ton-hour consumed by the condenser water pumps, etc.).

TT. Combined Chiller kW/ton, Combined CTF kW/ton, Combined CDWP kW/ton, Combined CHWP kW/ton, Total Plant kW/ton, total tons/1,000, total plant kW/1,000, chilled water supply temperature/100, condenser water supply temperature/100.

AHUs (Sequences of Operation, Graphics, Trendlogs, etc.)

1) General Discussion a) The system can be configured so that it is capable of using exponents in the software routines, both whole numbers and fractions (decimals, i.e. $X^{0.21}$)

PID Loop Control Required i) Preferably, the equipment provided for this project can be capable of full Proportional, Integral and Derivative (PID) loop control. In addition, adequate memory and programming capabilities are preferably provided to comply with the specifications and sequences of operations.

c) The control system can include hardware, software, interconnecting wiring, interposing relays, programming and fine tuning, commissioning, calibration and adjustments to provide for a logical sequence of operations of the chilled water generation and distribution system. In some implementations, such a system can include valves, actuators, fans, chillers, cooling towers, pumps, inlet vanes, variable speed drives and any other items.

d) Each point, either physical or virtual, can be located on a graphic screen appropriate for the point. Points used for the chiller plant sequences can be located on one of several layers of graphical screens designed to enhance the operators understanding of the use of the points.

e) For points used in the tuning of the system, a summary text on each graphic page can be included. Such summary text is preferably adequate in detail for an operator to easily understand, describing the use and nature of the various points. The system can be configured to permit an operator to pull up a graphical screen, and read a short summary of the sequence of operation being tuned. Thus, operators can better understand what needs to be done to tune the system using the variables within the graphical presentation on that page.

f) It can be possible to view the reset signals and intermediate calculation results from each individual logic routine being sent to each piece of equipment or system, to determine if the logic is actually working as intended.

g) All schedule times, time delays, temperatures, pressures, speeds, setpoints, event picks, and tuning constants can be easily adjustable through the use of the virtual points, without re-compiling and downloading the program.

h) Each PID control loop can advantageously have its own individual adjustable tuning constants for the proportional, integral and derivative terms, as well as setpoints.

i) Each system or piece of controlled equipment can have a complete set of stand-alone control loops, complete with individual setpoints.

j) In some implementations, timing constants are virtual points, adjustable from the operators workstation. A system can be reset on a "per minute" basis, meaning that the "per minute" portion of the logic is able to be adjusted in increments of seconds. This can also be applied to one or more other timing variables.

k) For testing and validation, the "per minute" value can be lowered to "per every 6 seconds" so that hours do not have to be wasted while timers time out. The "every 6 second" change in variables can show up on the dynamic trending system, to show that the system is changing as it is directed.

i) Preferably, the system is configured to ensure that the DDC panels have adequate processing power to accommodate this. In addition, the system can ensure that there is adequate bandwidth and speed in the data transmission system.

l) The operation of the system and the transition from Mode to Mode is preferably be smooth and seamless. The system can be configured to prevent causing wide flow or temperature swings that would upset the process.

m) These Sequences of Operation can cover the some, most or all of the main equipment which is being controlled by the replacement control system.

n) In some implementations, the modes of operation include chiller, condenser water pump and chilled water pump proof of status and alarm conditions associated with starting, stopping and observing the operations of a chiller unit.

o) The graphics can include all information and control and monitoring points described in the drawings and sequences of operation. In some implementations, alarm points can flash on a display screen or other user interface using a color or other identifier which is different that the surrounding graphics for easy identification.

p) The system can continuously update the backup program. Thus, if any control system failure occurs, the system can automatically restart from memory with the most recently updated information.

q) Graphical and bar chart tables of values can be developed for the setpoints and actual values for ease of operator review and modification.

r) In one implementation, the data network, instrumentation and control routines can be configured for reporting "Change Of Values" (COV) at the following rate:
  (1) Fan kW: 0.20 kW
  (2) Pump kW: 0.10 kW
  (3) CTF kW: 0.10 kW
  (4) Chiller kW: 2.0 kW
  (5) Flow rate: 3% of design
  (6) Differential Pressure—site: 0.10 PSID
  (7) Differential Pressure—chiller evaporators: 0.10 PSID
  (8) Supply air temperature: 0.10° F.
  (9) Return Air Temperature: 0.10° F.
  (10) Mixed Air Temperature: 0.10° F.
  (11) Outside Air Temperature: 0.10° F.
  (12) Outside Air RH %: 1% RH
  (13) Enthalpy: 0.05 BTU/lb.
  (14) CHWS/CHWR/CDWS/CDWR temperatures: 0.10° F.
  (15) Space Temperature: 0.10° F.

Preferably, the control routines can use the actual value of the variable at the time it is required, and not be limited by the COV.

2) Sequences
 a) PID Loop Control Required
  i) The equipment provided is preferably capable of full Proportional, Integral and Derivative (PID) loop control. In addition, adequate memory and programming capabilities can be advantageously provided to comply with the specifications and sequences of operations.
 b) Integral Windup Prevention
  i) Typical sequence for control loops: When the HVAC systems are shut down each night, and again when the systems are started up each morning, all integral terms can be zeroed out so that there is no residual "integral windup" to interfere with normal system operation.
  ii) Similarly, when time delays are invoked that lock in a specific setpoint or speed, the control system may tend to windup the integral term. When the time delay is released, the integral could drive the setpoint to one extreme or the other.
  iii) At the end of the time delay period, when the normal sequences are about to take over control of the variable, the integral term can be zeroed out as required to maintain stable system operation.
 c) Definition of "Normal" and "After-Hours"
  i) In some implementations, normal business hours can comprise the time of day between 6:00 AM and 7:00 PM Monday through Friday, and 8:00 AM to 12:00 PM, Saturday.
  ii) After-hours can comprise all other hours.
  iii) It will be appreciated that other time periods can be used. In addition, the AHU and plant schedules can be different.
  iv) Each floor can have schedules independent of every other floor.
 d) Setpoints and Virtual Points
  i) Each piece of equipment or system can have its own setpoints and virtual points so that each piece of equipment or system can be separately tuned.
 e) To Determine if a Variable is Increasing or Decreasing
  i) In some implementations, a six-minute sliding average can be developed for each variable for which it is desirable to determine whether such variable is increasing or decreasing. This may include taking six samples at the rate of one sample every 60 seconds, and comparing that to the current value of the variable.
   (1) In one implementation, if the current value of the variable is greater than the 6 minute average value of the variable, the variable is increasing.
   (2) Alternatively, if the current value of the variable is less than the 6 minute average value of the variable, the variable is decreasing.
 f) HVAC System Optimized Start/Stop
  i) The DDC control system Manufacturers standard Optimum Start/Stop (OSS) Program can be implemented to evaluate the internal heat loads, the return air temperatures, the external heat loads and the available cooling capacity. Starting the fans, boilers and chiller systems can be advantageously delayed as long as possible to satisfy the desired occupancy conditions at a particular time.
  ii) Each individual floor may be equipped with an OSS routine that can determine how far away from the desired setpoint the floor is, and how long it takes to get to the correct conditions under various ambient and internal conditions (e.g., from both a heating and cooling standpoint).
   (1) Each floor can have a separate and distinct setpoint towards which the OSS software can work.
    (a) For instance, some floors may have a target temperature setpoint at occupancy of 74.2° F., while other floors may have target setpoints from 70.2° F. to 78.1° F.
  iii) Each individual temperature control zone can be equipped with an OSS routine that will help determine how far away from the desired setpoint the zone is. In addition, the OSS routine can help determine how long it can take to get to the correct conditions under various ambient and internal conditions (e.g., from both a heating and cooling standpoint).
   (1) Each floor can have a separate and distinct setpoint towards which the OSS software can work.
    For instance, some zones (e.g., north side) may have a target temperature setpoint at occupancy of 74.2° F., while other zones on the same floor may have target setpoints from 71.12° F. to 76.3° F.
  iv) In some implementations, in order to get an accurate read of the conditions on each of the floors, it may be desirable to lock off the economizer system and enable the supply and return fans and two floors at a time for 10 minutes, starting at 4:00 AM with a 1" static pressure setpoint, to cycle air from the perimeter of the floor to the return sensors. Based on this information, the OSS routine can then determine the condition of the floor, and make proper decisions as to the best time to start each individual floor.
  v) Each floor and zone can be configured to start at different times. For example, in some implementations, if a floor or zone is very close to its desired setpoint, it may be started at 10 minutes prior to occupancy. Zones or floors that are further from their desired setpoints may have to be started sooner, with an adjustable "early start" time limit of no longer than 2 hours prior to scheduled occupancy.
 g) Worst Case Air Handler (WCAH) Control Feedback
  i) WCAH Discussion
   (1) To reduce system energy waste, while maintaining occupant comfort, each individual AHU can be examined. The, the system can determine how far above or below the desired supply air temperature setpoint the AHU is operating.
   (2) Based on the operating conditions of the AHUs, the chilled water supply differential pressure setpoint can be increased, decreased or left alone.
   (3) The control system can evaluate the actual supply air temperature and the supply air temperature setpoint, along with the position of the chilled water valve for each AHU, to determine whether an AHU is satisfied, or is in need of more or less cooling capacity.

(4) Each AHU can have a calculated value describing the chilled water valve position and the temperature offset from setpoint, which may be referred to as the Worst Case Air Handler (WCAH) value.

(5) The DDC system can be configured to poll each AHU in order to obtain its calculated WCAH value. Using this information, the system can then determine which AHU imposes the greatest need for additional cooling on the system. In some implementations, this can be accomplished by high signal selecting the WCAH information that is being fed back to the chiller plant controller from each of the individual AHU controllers.

(6) In one implementation, the AHU that is furthest from the setpoint (on the high side) is called the Worst Case Air Handler (WCAH). In such an implementation, the 3-minute average of the high signal selected WCAH value can be used as the controlling variable for the CHW DP setpoint reset routine.

(a) Since the DDC system can calculate the worst case AHU situation, any other AHUs being used in the calculation will have a smaller offset from the desired setpoint.

(7) If an AHU is stable and above its setpoint by a small margin (e.g., in one implementation, the setpoint is initially set for a ½ degree offset) and the chilled water valve is wide open, the AHU is deemed to be satisfied, and no changes to the chilled water system are made.

(8) If the WCAH value indicates that the AHU Supply Air Temperature (SAT) is above the offset value (e.g., initially set for a ½ degree offset), the DDC system can start increasing the chilled water supply DP setpoint to provide slightly more water to the AHU. Consequently, colder air can be provided by the AHU, resulting in a corresponding drop in the supply air temperature and WCAH value.

(9) If the WCAH value indicates that the AHU SAT is below the offset value (e.g., initially set for a ½ degree offset), the DDC system can start decreasing the chilled water supply DP setpoint to provide slightly less water to the AHU. In some implementations, this may cause the chilled water valve to open (e.g., if it was less than 100% open), resulting in warmer air being provided by the AHU. As a result, a corresponding increase in the WCAH value can be realized.

(ii) Calculation of the Worst Case Air Handler (WCAH) Value (1) In some implementations, it is desirable to create a calculated value that will provide an indication of the combination of the chilled water cooling coil valve position and the amount above the supply air temperature setpoint at which an AHU is operating. This value can be used as the worst case air handler or "WCAH" value for controlling the chilled water differential pressure setpoint.

(a) In one implementation, if the chilled water cooling coil control valve for an AHU is greater than 70% open, a proportional table statement for the actual supply air temperature that is below or above the supply air temperature setpoint can be developed.

(b) In one implementation, if the chilled water cooling coil control valve for an AHU is less than 70% open, the system can be configured to not include the SAT offset from setpoint in the WCAH value. Thus, that part of the WCAH calculation can be set to zero for the corresponding AHU, so that only the valve position is reported as the WCAH value.

(2) A proportional table for the actual supply air temperature minus the supply air temperature setpoint can be developed. In some implementations, if the SAT is below or above the SAT setpoint by −2° F. to 12° F., a proportional calculated value of −200 to 1200 is provided.

(a) This can relate to a proportional table statement that multiplies the setpoints on the graphic page by 100 in the programming code.

(c) In such an implementation, this calculated value of −200 to 1200 is then added to the actual chilled water cooling coil control valve position command of 0 to 100.

(d) Thus, the result can be a calculated value of −129 to +1300.

(i) In such implementations, if the valve is 0% open and the SAT is 2° F. below the setpoint, the WCAH value from that AHU will be zero (e.g., only the valve position is considered since the valve position is less than 70%).

(ii) Further, if the valve is 60% open and the SAT is 2° F. below the setpoint, the WCAH value from that AHU is 60 (e.g., only the valve position is considered since the valve position is less than 70%).

(iii) In such implementations, if the valve is 71% open and the SAT is 2° F. below the setpoint, the WCAH value from that AHU is −129 (71−200=−129).

(iv) If the valve is 80% open and the SAT is 1° F. below the setpoint, the WCAH value from that AHU is −20 (80−100=−20).

(v) Further, if the valve is 100% open and the SAT is 2° F. below the setpoint, the WCAH value from that AHU is −100 (100−200=−100).

(vi) If the valve is 100% open and the SAT is 3° F. above the setpoint, the WCAH value from that AHU is 400.

(e) Once the offset from setpoint is calculated, it can be multiplied by 100 and added to the actual valve position value. The WCAH signal can be sent to the central plant processor, where it is high signal selected. In some implementations, it may be desirable to control the chilled water supply DP setpoint in such a manner that maintains the highest WCAH signal at a value of 150. This can be the valve at 100% open and the worst case SAT at 0.5° F. above the desired setpoint for that AHU.

(f) If necessary, to reduce data line traffic, the calculated "valve position plus SAT offset" value (WCAH) from the AHU controller can be transmitted at a regular time interval (e.g., once per minute), rather than at every scan.

iii) WCAH Size, Criticality and Distance Multipliers (1) In order to provide some flexibility in system operations and to recognize that not all AHUs have the same capacity as the average AHU (or have the same level of criticalness than the average AHU on the loop, or have the same spatial orientation from the chiller plant than the average AHU), the calculated WCAH signal generated from the logic described above can include multipliers. In some implementations, such multipliers can be manipulated by operating engineers or other authorized personnel.

(2) Once the WCAH value for each AHU has been calculated based on the valve position and the difference between the supply air temperature and the supply air temperature setpoint, three final multipliers can be applied to it. That resulting value, along with the "unmultiplied value" can then be sent from the AHU controller to the central plant controllers.

(3) In some preferred implementations, these multipliers are for the size of the unit, the level of criticality of the unit and/or the distance from the cooling plant (e.g., chiller unit). In one implementation, the baseline multipliers for each of these items has a value of 1.

(4) AHU Size Multiplier—If an AHU is substantially smaller or larger than the average AHU, the operating staff can vary this multiplier between a value of 0.5 to 1.2. This can modify (e.g., increase or decrease) the effect that a unit has on the chiller plant resets.

(a) In one implementation, the effect of the 0.5 multiplier is to reduce the effect on the chiller plant. With a 0.5 multiplier, the AHU can be 2° F. above setpoint when the AHU is reporting a value of 150.

(b) In one implementation, the effect of the 1.2 multiplier is to increase the effect on the chiller plant. With a 1.2 multiplier, the AHU can be 0.25° F. above setpoint when the AHU is reporting a value of 150.

(5) AHU Criticality Multiplier—If an AHU is substantially more or less critical than the average AHU, the operating staff can vary this multiplier between a value of 0.5 and 1.5. This can modify the effect that a particular AHU has on the chiller plant resets.

(a) In one implementation, the effect of the 0.5 multiplier is to reduce the effect on the chiller plant. With a 0.5 multiplier, the AHU is 2° F. above the setpoint when the AHU is reporting a value of 150.

(b) In one implementation, the effect of the 1.5 multiplier is to increase the effect on the chiller plant. With a 1.5 multiplier, the AHU is exactly at or near the setpoint when the AHU is reporting a value of 150.

(6) AHU Distance Multiplier—If an AHU is substantially closer or further away than the average AHU, the operating staff can vary this multiplier between a value of 0.85 and 1.25. This can modify the effect that a particular AHU has on the chiller plant resets.

(a) In one implementation, the effect of the 0.85 multiplier is to reduce the effect on the chiller plant. With a 0.85 multiplier, the AHU is 0.75° F. above setpoint when the AHU is reporting a value of 150.

(b) In one implementation, the effect of the 1.25 multiplier is to increase the effect on the chiller plant. With a 1.25 multiplier, the AHU is 0.20° F. above setpoint when the AHU is reporting a value of 150.

(7) Combined effects—These multipliers provide operators with the flexibility to tune their CHW DP and CHWS supply temperature setpoints based on the nature of their site and systems.

(a) For example, if a unit is relatively small, not critical and proximal to the cooling plant (e.g., chiller), the multipliers can be combined to minimize the effects of the unit on the resets. If the unit gets far above the setpoint, it can have an effect on the operation of the cooling system. Therefore, its effect is advantageously not excluded from the reset schedule logic.

(b) Conversely, if the unit is relatively large, relatively critical and comparatively far from the chiller plant, the multipliers can be combined to allow such a unit to have a greater effect on the resets.

(8) For each of the above multipliers, limits can be provided which will not allow operators go above or below a desired range.

i) Floor Call for HVAC i) If a floor is within the scheduled occupancy time or the added early start allowance for warmup or cooldown, it shall be allowed to begin when the OSS routine determines that it needs to start to meet the desired conditions at occupancy.

ii) When the call for HVAC services has been registered, the floor isolation dampers (Supply and Return) can be commanded to open and the fan system can be permitted to start operating in the desired mode.

iii) In some implementations, warmup takes precedence over cooldown when determining fan system operation.

j) Economizer Operation i) General Discussion (1) This may remain true regardless if the damper actuators are replaced with new pneumatic damper actuators or if they are replaced with electronic damper actuators.

(2) When conditions are appropriate to use outside air for cooling a facility, the supply fans and return fans, along with the associate damper systems, can be operated as an economizer system.

(3) In one implementation, 6-minute running averages are utilized in order for the variables to reduce the effects of transient changes. For example, 10 samples can be taken at the rate of one per 36 seconds.

(4) A software switch can be provided to enable the operators to go to a graphic page (or other user interface) and switch between the dry bulb economizer sequences and the enthalpy controlled economizer sequences of operation.

ii) Dry-Bulb Temperature Differential Economizer Sequences (1) In one implementation, the dry-bulb economizer sequences can be initialized using ambient air when the outside air temp is 3° F. lower than the return airstream temperature for a 12-minute period and the economizer system is not locked out. Likewise, the economizer cycle can be stopped when the outside air temperature is above 1.5° F. less than the return air temperature for a 12 minute period.

(a) A separate PID loop can be utilized for the economizer damper controls and for the CHW cooling coil control valve. In such implementations, the damper system may have completely different response characteristics than the cooling coil.

(b) When cooling from the chiller plant is enabled at the AHU when the economizer cycle is in operation, a SAT setpoint can be used for the economizer system. In one implementations, the SAT setpoint is 2° F. below the SAT setpoint for the cooling coil.

(c) The cooling coil can receive the SAT setpoint commanded by the reset routines, and the economizer can receive a setpoint that is 2° F. lower.

(i) This can reduce the control overlap and cycling that may typically occur when an economizer and cooling coil are in simultaneous operation. Further, this can maximize the amount of "free cooling" that can be obtained from the ambient conditions.

(ii) In one implementation, the economizer cycle can be shut down whenever the ambient conditions exceed 72.3° F. for 10 minutes.

(iii) The system can be configured to refer to the cooling lockout sequences for periods during which the economizer and/or chiller plant are advantageously not locked out.

(iv) Whenever cooling assist is available from the economizer (e.g., as determined by the OSA/RAT temperature differential) and cooling is enabled, the economizer sequences can be enabled.

(v) The economizer dampers can be modulated in concert with the chilled water valve to maintain the AHU cold deck temperature setpoint.

(vi) In the AHU coasting cycle, if an economizer is available, the economizer can be used to maintain the supply air temperature setpoint.

iii) Enthalpy Based Economizer Sequences (1) In some implementations, the Enthalpy Based economizer sequences can be initiated using ambient air when the outside air heat content is 1.12 BTU per pound (adjustable) lower than the return airstream heat content for a 12-minute period and the economizer system is not locked out. The economizer cycle can be stopped when the outside air heat content is above 0.53 BTU per pound greater than the return heat content for a 12 minute period.

(a) A separate PID loop can be utilized for the economizer damper controls and for the CHW cooling coil control valve. The damper system may have completely different response characteristics than the cooling coil.

(b) If cooling from the chiller plant is enabled at the AHU when the economizer cycle is in operation, a SAT setpoint can be used for the economizer system that is 2° F. below the SAT setpoint for the cooling coil.

(c) The cooling coil can receive the SAT setpoint commanded by the reset routines, and the economizer can receive a setpoint that is 2° F. lower.

(i) In some implementations, this reduces the control overlap and cycling that typically occurs when an economizer and cooling coil are in simultaneous operation. In addition, this may maximize the amount of "free cooling" that can be obtained from the ambient conditions.

(ii) In some implementations, the economizer cycle can be shut down whenever the ambient conditions exceed 72.3° F. for 10 minutes.

(iii) The system can be configured to refer to the cooling lockout sequences to determine the periods during which the economizer and/or chiller plant is advantageously not locked out.

(iv) Whenever cooling assist is available from the economizer (e.g., as determined defined by the OSA/RAT temperature differential) and cooling is enabled, the economizer sequences can be enabled.

(v) The economizer dampers can be modulated in concert with the chilled water valve to maintain the AHU cold deck temperature setpoint.

(vi) In the AHU coasting cycle, if an economizer is available, the economizer can be utilized to maintain the supply air temperature setpoint.

k) AHU Gradual Reduction in Fan Pitch Command Signal i) When a fan system is going to be demand limited or pitch limited, a gradual reduction in the pitch command signal can be performed to reduce occupant awareness of the change in the HVAC system.

ii) The change can take place proportionally over a 5 minute period.

iii) For example, in one implementation, if an AHU is being operated at 77% fan speed, but the next stage in the daily demand limit sequence requires a maximum pitch command of 68%, the change in the maximum pitch command can be 9% (77%–68%=9%). Further, this value can be divided by 5 minutes for a reduction in maximum fan speed of 1.8% per minute.

l) AHU Gradual Increase in Fan Pitch Command Signal i) When a fan system is started or the maximum pitch command allowed is increased, a gradual increase in the fan pitch command signal can be performed to reduce occupant awareness of the change in the HVAC system. Further, this can allow time for the control loops to take control with minimum potential for overshoot.

ii) In one implementation, the change can take place over a 6 minute period.

iii) For example, in one implementation, if an AHU is being operated at 77% fan speed and slightly below the desired static pressure, the fan system may want to increase the blade pitch command. If the next stage in the daily demand limit sequence allows a higher maximum pitch command of 82%, the change in the maximum pitch command can be 5% (82%−77%=5%). This value can be divided by 6 minutes to provide a potential increase in the maximum fan speed of 0.83% per minute.

m) AHU Fan Pitch Command Proportional Multiplier i) In some implementations, there is the potential that not all of the floors will be operational at one time in the morning, evening and on weekends.

ii) Taking this into consideration, the system may include a multiplier that changes the target setpoints and fan pitch command limiters in a manner proportional to the number of floors that are enabled.

iii) For example, in one implementation, if the Fan Pitch Command % setpoint is 65%, but only half of the floors are enabled, that setpoint can be multiplied by 50%.

iv) Similarly, if a Fan Pitch Command % limit is set to 50%, but half the floors are enabled, the 50% figure can be multiplied by 50%.

v) In other implementations, if 6 out of the 8 floors are enabled, the Fan pitch command limit setpoint can be multiplied 6/8 (e.g., 75%).

n) AHU Call For Cooling Signal i) If an AHU is in warmup mode and no call for cooling has been enabled, the system can be configured to maintain the chilled water valve for that AHU closed. Further, the economizer can remain locked out.

(1) In one implementation, an AHU is considered to be calling for cooling when:

(a) The AHU has been operational for 5 minutes and is not in warmup, RAT lockout or early shutdown modes; AND (b) The chilled water cooling coil control valve has been above 41% open for 5 minutes; AND (c) The supply air temperature has been above the supply air temperature setpoint by 2.5° F. for 5 minutes.

(2) Stopping the Call For Cooling (a) In some implementations, once a call for cooling for an AHU has been enabled, the call for cooling for AHUs can be disabled when:

(i) the AHU is shut down; OR (ii) the warmup cycle for that AHU has been enabled; OR (iii) the chilled water valve has been less than 5% open for 30 minutes; OR (iv) the AHU is operating under the early shutdown routine (b) It may be possible to restart a call for cooling if the above criteria have been met.

o) AHU Warm-up Cycle i) The DDC control system manufacturers Optimum start stop program can be utilized to determine when a warm up cycle is required.

ii) For example, the system can be operated in a 100% return air cycle until occupancy if the system is in a warmup or RAT lockout cycle. At occupancy, the minimum OSA cycle can be enabled until cooling is enabled.

iii) In one implementation, during the warmup cycle, it may be desirable to not enable cooling at the AHU, either from the economizer system or the chiller plant, until the return air temperature has reached "Setpoint A" plus 0.5° F.

(1) In some implementations, "Setpoint A," which is described herein, can be equal to the desired return air temperature setpoint.

iv) When cooling is enabled, the setpoints described herein can be utilized in the sequences.

p) AHU Night Purge Cycle i) In some implementations, at 4:00 AM, the return air temperature sensors can be sampled. If any of them are greater than 2.1° F. above the desired setpoint, the use of a purge cycle can be evaluated.

ii) A floor by floor purge cycle can be enabled if the ambient conditions are 14.2° F. lower than any of the floor average return air temperatures and if the floor average return air temperature is 4.1° F. above its setpoint.

iii) The purge cycle can be configured to command the AHUs into the full economizer mode, with the maximum supply fan pitch command set to 50% and the static pressure setpoint set to 1 inch WC.

iv) According to one implementation, only those floors that exceed their return air temperature setpoints by 2.1° F. or more can be enabled.

v) The purge cycle can be terminated after one hour, or when the return air sensors indicate that they have reached the setpoint, whichever occurs first.

q) AHU Unoccupied Heating and Cooling Cycles i) The unoccupied cooling cycle can be enabled if the average return air temperature increases to 8.6° F. above the setpoints.

(1) In some implementations, if the economizer is available, it is used, with the fan pitch command limited to 48% and the static pressure setpoint at 1.1" WC.

(2) If the ambient conditions are comparatively warm for the economizer, the chilled water system can be enabled. In some implementations, the CHWS temperature setpoint can be locked in at 55° F. and the CHW DP setpoint can be locked in at 6 PSID. Further, the fan pitch command can be limited to 52%, and the OSA economizer can be locked off.

(3) In one implementation, such a cycle can remain enabled until the average return air temperature is reduced to 4.1° F. above the setpoint, or another sequence enables the AHU and chiller plant systems.

ii) The unoccupied heating cycle can be enabled if the return air temperature at any of the Temperature Control Zone (TCZ) zones decreases to 63° F.

(1) The TCZ control logic for that cold TCZ zone or zones can be enabled, along with the local zone thermostat control air, so that local temperature control may be established.

(2) The boiler system can be enabled.

(3) In some implementations, this cycle can remain enabled until the return air temperature at the TCZ reaches 68.1° F. for a 20 minute period, or another sequence enables the AHU and chiller plant systems.

r) Fan Volumetric Tracking i) The return fans can have their pitch commands controlled such that they have a fixed airflow offset (initially set for 14,000 CFM) when compared to their associated supply fans.

ii) The final value for the offset can be determined based on the quantity of exhaust fans and their design CFM, the minimum desired fresh air CFM and the like. Further, a slight offset can be used to keep the buildings positively pressurized.

s) Building Static Pressure Control i) In one implementation, there are two building static pressure sensors located in the ground floor (e.g., parking garage "Plaza" level, other locations, etc.) of the buildings.

ii) The sensors can be used in logic that will automatically accommodate return fan failures or the failure of the (Supply Fan)/(Return Fan) (SF/RF) volumetric fan tracking system.

(1) If the fan tracking system has failed, the system can be configured to default to a proportional offset return fan pitch command. In one implementation, a return fan pitch command can be provided that is 7.89% less than the pitch command that is being sent to the supply fans.

(2) This offset can be adjusted based on the building static pressure as described below.

iii) If a return fan has failed, or it has been locked in at a low CFM, the building pressure can rise.

iv) If a return fan has been locked in at a high CFM, the building pressure can drop.

v) In some implementations, the control system can be configured to evaluate the 20-minute average Building Static pressure, from each sensor.

vi) Each building can be controlled individually.

(1) In one implementation, if the 20-minute average of the Building Static pressure is greater than 0.05 in WC, the system can be informed that more air in being brought into the system than is being exhausted. Thus, it may be desirable to increase the CFM setpoints of the return air fans.

(a) When the 20-minute average of the Building Static pressure readings is above the setpoint (e.g., initially set for 0.05 in WC), the return air CFM setpoint for each of the return fan systems can be increased by 0.05% per minute.

(b) If the air flow stations are providing inaccurate information, the return fan system pitch control command offsets can be decreased by 0.05% per minute. In some implementations, this can cause an increase the fan pitch command, an increase in the return air system flowrate and a decrease in the building pressure.

(2) If the 20-minute average of the Building Static pressure is less than 0.01 in WC, the system can be informed that the more air is being exhausted than being brought in. Thus, it may be desirable to decrease the CFM setpoints of the return air fans.

(a) When the 20-minute average of the Building Static pressure readings is below the setpoint (e.g., initially set for 0.01 in WC), the return air CFM setpoint for each of the return fan systems can be decreased by 0.015% per minute.

(b) If the air flow stations are providing inaccurate information, the return fan system pitch control command offsets can be increased by 0.02% per minute. This can decrease the fan pitch command, decrease the return air system flowrate and increase building pressure.

t) AHU Static Pressure Control Loop i) Discussion (1) The static pressure control loop setpoint can be reset to minimize the static pressure that must be wasted across the zone dampers to maintain comfort.

(2) Each fan system can have separate and distinct PID loops and PID constants, setpoints and reset schedules, as they may be operated completely differently from one another.

(3) The static pressure setpoint can be controlled based on maintaining the return air temperature at the return air temperature setpoint when the system is in a cooling mode of operation.

(4) In some implementations, an operator can select the desired return air temperature setpoint (RAT Setpoint) for each individual AHU. This setpoint can be referred to as "Setpoint A".

(5) In some implementations, the operator may be able to switch between the average RAT setpoint for each floor compared to the average RAT for each floor. Alternatively, the operator can high signal select the floor that is furthest from its setpoint.

(6) It may be desirable to limit the use of the RAT and Setpoint A to floors that are enabled.

(7) In some implementations, the system can maintain the return air temperature near the RAT setpoint by changing the static pressure setpoint on each AHU. A higher static pressure can have the potential to provide greater airflow, thereby reducing the return air temperature.

(8) In one implementation, if the RAT (e.g., floor average RAT, high signal selected floor RAT, etc.) is above the RAT setpoint (e.g., Setpoint A), the static pressure setpoint can be increased to provide a greater volume of air to the spaces, and increase the cooling capacity available.

(9) If the RAT is below the RAT setpoint (e.g., Setpoint A), the static pressure setpoint can be decreased to provide a reduction in the amount of fan energy wasted across the zone terminal dampers, and reduce the CFM available to the distribution system.

(10) In order to increase the static pressure, an operator can lower the RAT setpoint (e.g., Setpoint A). If the operator finds that he or she can get by with a reduced static pressure, he or she can increase the RAT setpoint (e.g., Setpoint A).

(11) If the operator wishes a quicker system response time, a multiplier point can be increased. In some implementations, the initial setpoint is 1. However, it may be increased as high as 2. For example, a value of 2 may indicate that the system will respond twice as fast as a system with a value of 1 for this point.

(12) The response time can also be slowed down by inserting a value as low as 0.5. In some implementations, this can reduce the response amount by 50%.

(a) Command limits which will not allow setpoint changes in this point of greater than 2.0 or less than 0.5 can be installed.

(ii) Return Air Temperature Based Reset (1) If the return air temperature is increasing:

(a) The return air temperature can be compared to the 6 minute average return air temperature taking samples at the rate of every 36 seconds. If the RAT has increased, the following sequences can be performed. However, such sequences can be ignored if the RAT is not increasing.

(i) In one implementation, if the return air temperature increases above (Setpoint A minus 1° F.), the static pressure setpoint can be increased at the rate of 0.0095 in WC per minute.

(ii) In one implementation, if the return air temperature increases above (Setpoint A), the static pressure setpoint can be increased at the rate of 0.012 in WC per minute.

(iii) In one implementation, if the return air temperature increases above (Setpoint A plus 1° F.), the static pressure setpoint can be increased at the rate of 0.018 in WC per minute.

(iv) In some implementations, the "RAT Increasing" Output can be multiplied

1. The value that results from the above calculations can be multiplied to change the responsiveness of the static pressure setpoint reset.

2. According to some implementations, the initial value for each AHU can be 1.

3. However, values as high as 2 (e.g., respond twice as fast) and as low as 0.5 (e.g., respond half as fast) can be available for optional adjustment by operators or others.

4. Thus, in some implementations, command limits of 2 to 0.5 can be installed for this variable.

(2) If the return air temperature is decreasing:

(a) In some implementations, the system can be configured to compare the return air temperature against the 6-minute average return air temperature taking samples at the rate of every 36 seconds. If the RAT has decreased, the following sequences can be performed. Alternatively, if the RAT is not decreasing, such sequences may be ignored.

(i) In one implementation, as the return air temperature decreases below (Setpoint A plus 2.2° F.), the static pressure setpoint is decreased at the rate of 0.0031 in WC per minute.

(ii) In one implementation, as the return air temperature decreases below (Setpoint A plus 1.5° F.), the static pressure setpoint is decreased at the rate of 0.008 in WC per minute.

(iii) In one implementation, as the return air temperature decreases below (Setpoint A), the static pressure setpoint can be decreased at the rate of 0.0094 in WC per minute.

(iv) In some implementations, the value can be multiplied by the "RAT Decreasing" Output 1. The value that results from the above calculations can be multiplied to change the responsiveness of the static pressure setpoint reset.

2. In some implementations, the initial value for each AHU is 1.

3. However, values as high as 2 (e.g., respond twice as fast) and as low as 0.5 (e.g., respond half as fast) can be available for the operators to adjust.

4. Thus, in some implementations, command limits of 2 to 0.5 can be installed for this variable.

(3) If the return air temperature is overly warm or overly cool (a) Regardless of whether or not the return air temperature is increasing or decreasing, if the return air temperature is above (Setpoint A plus 1.5° F.), the static pressure setpoint can be increased at the rate of 0.0121 in WC per minute.

(b) Regardless of whether or not the return air temperature is increasing or decreasing, if the return air temperature is above (Setpoint A plus 1.8° F.), the static pressure setpoint can be increased at the rate of 0.0255 in WC per minute.

(c) Regardless of whether or not the return air temperature is increasing or decreasing, if the return air temperature is below (Setpoint A minus 1.2° F.), the static pressure setpoint can be decreased at the rate of 0.007 in WC per minute.

(d) Regardless of whether or not the return air temperature is increasing or decreasing, if the return air temperature is below (Setpoint A minus 1.9° F.), the static pressure setpoint can be decreased at the rate of 0.0133 in WC per minute.

(4) The RAT-Based Reset Values can be added (a) In some implementations, the values from the "Return Air Temperature Increasing," "Return Air Temperature Decreasing" and "Return Air Temperature Too Warm/Too Cool" reset routines can be added and used as an input to the AHU supply air static pressure setpoint control output.

(5) Setpoint Range:

(a) In some implementations, Setpoint A is expected to be in the range of 73° F. to 75° F.

(b) Command limits of 71° F. to 77° F. can be installed on this variable.

(c) According to some implementations, such command limits can be the operator limits. Such limits imposed by the return air Temperature Setpoint logic can be 2° F. higher and lower than these limits.

(6) Return Air Temperature Setpoint (a) Each return air sensor can include a target setpoint which may be modified by the operating engineers or others (b) For example, such a setpoint can allow engineers and others to determine the temperature at which they desire the return air to be maintained for a particular floor in a building.

(c) In some implementations, as the return air temperature continues to increase above its setpoint, the Return air target setpoint (e.g., "Setpoint A") for the AHU can be reduced, to provide a higher static pressure setpoint which will result in more air being delivered to the spaces.

(d) As the return air decreases below this setpoint, the Return air target setpoint (e.g., "Setpoint A") for the AHUs in that area can be increased to provide a lower static pressure setpoint. This can desirably result in less air being delivered to the spaces.

(7) Setpoint A Reset Based on Floor Return Air Temperatures (a) In some implementations, Setpoint A can be proportionally reset based on the direction of the temperatures and the actual temperatures in the return air, as sensed by the return air temperature sensors.

(b) In one implementation, as the return air temperature increases by 0.15° F. to 1.64° F. above the return air temperature setpoint for each unit, the RAT setpoint for the associated AHUs can be decreased by 0.63° F. to 3.56° F.

(c) In one implementation, as the return air decreases by 0.25° F. to 1.12° F. below the return air temperature setpoint for each unit, the RAT setpoint (e.g., Setpoint A) for the associated AHUs can be increased by 0.23° F. to 1.46° F.

(8) Warm-up Static Pressure Setpoint (a) When the system is in a warmup mode of operation, the static pressure setpoint can be controlled as described herein with no effect from the Fan pitch command % reset or limitation software.

iii) Minimum and Maximum Static Pressure Setpoints (1) The minimum and maximum static pressure setpoints can be proportionally reset based on the return air conditions.

(2) In some implementations, the design setpoint can be the design static pressure setpoint in the discharge ducting that is required for peak load operation on a design day. The other minimum and maximum setpoints can be automatically adjusted based on the multipliers described below, using the design setpoint as the starting point.

(3) Normal Hours Minimum and Maximum Setpoint Reset Schedule (a) In some implementations, the minimum static pressure setpoint can be reset between the design setpoint times 0.40 and the design setpoint times 0.59 based on return air conditions being between (Setpoint A minus 2° F.) and (Setpoint A plus 2° F.).

(b) In one implementation, the maximum static pressure setpoint can be reset between the design setpoint times 0.66 and the design setpoint times 1.15 based on return air conditions being between (Setpoint A minus 2° F.) and (Setpoint A plus 2° F.).

(4) After-Hours Minimum and Maximum Setpoint Reset Schedule (a) According to some implementations, the minimum static pressure setpoint is reset between the (design setpoint times 0.57) and (the design setpoint times 0.85) based on return air conditions being between (Setpoint A minus 2° F.) and (Setpoint A plus 2° F.).

(b) The maximum static pressure setpoint can be reset between (the design setpoint times 0.91) and (the design setpoint times 1.05) based on return air conditions being between (Setpoint A minus 2° F.) and (Setpoint A plus 2° F.).

iv) High Static Pressure Software Safety (1) This safety may not be configured to replace the manual reset safeties installed in the system. However, such a safety may try and keep the system from shutting off on a safety that requires a manual reset.

(2) Is some implementations, the fans can be demand limited as required to maintain a maximum static pressure of (design setpoint times 1.2). If the pressure reaches the design setpoint times 1.2, the maximum pitch command signal can be decreased to 35% and the static pressure setpoint can be decreased to the design setpoint times 0.35 for 10 minutes. Then, the system can be permitted to ramp up to the proper setpoint over a ten minute period. This can override the minimum setpoint for the 10 minute timer duration.

(3) The system can be scanned for floors that not enabled. When this safety has been enabled, the first floor that is seen as not being enabled can be enabled in order to provide another outlet for the air and reduce system static pressure.

(v) Startup Static Pressure Setpoint (1) In some implementations, the static pressure setpoint at AHU startup can be varied proportionally between design setpoint times 0.53 and design setpoint times 0.93 as the return air temperature varies between Setpoint A minus 1.1° F. to Setpoint A plus 2.1° F.

(i) According to one implementations, if the system is in a warmup or return air temperature lockout cycle, the static pressure setpoint at the AHU can be varied proportionally between design setpoint times 1.03 and design setpoint times 0.83 as the return air temperature varies between Setpoint A minus 2.1° F. to Setpoint A plus 0.43° F.

(b) This setpoint can vary continuously for the time delay period. As the RAT varies, the static setpoint can also vary.

(c) In some implementations, there can be a 25 minute time delay associated with allowing the static pressure reset routines to start working. After the fan has been started, this proportionally reset setpoint can be utilized for the first 20 minutes before the other reset routines begin working.

(d) When the system is in a return air temperature lockout cycle, or a warmup cycle, the demand limitation routines can be suspended.

(vi) Maximum Rate of Change in Static Pressure Setpoint (1) When the static pressure setpoint is going to be changed by one of the routines, the maximum rate of change for increasing or decreasing the setpoint can be 0.035 inches WC per minute to reduce occupant awareness of the change in the HVAC system.

(a) Such a scheme can be in effect when the system is going into and out of the warmup mode of operation and the global demand limit mode of operation and when the setpoint is changing by 0.35 in WC or more during the changes between modes of operation. It can also be in effect at other times.

(u) AHU Temperature Control Loop (i) Discussion (1) The supply air temperature control loop setpoint can be reset to minimize the wasted fan and chiller plant energy that is required to maintain comfort.

(2) Each fan system can have separate and distinct PID loops and PID constants, setpoints and reset schedules, as they operate completely differently from one another.

(3) The supply air temperature setpoint can thus be varied as required to keep the supply fan pitch command in a range around its operator adjusted setpoint.

(4) An increasing fan pitch command can indicate that there is more cooling load. As the load increases, the SAT setpoint can be reduced to provide a greater amount of cooling for each CFM of air that is delivered.

(5) A decreasing fan pitch command can indicate that there is less cooling load. As the load decreases, the SAT setpoint can be increased to provide a reduced amount of cooling for each CFM of air that is delivered. This can reduce the total load on the system and/or increase the chilled water supply temperature setpoint. Consequently, the chiller plant efficiency can be increased.

(a) In certain implementations, during normal occupied hours, when all floors are enabled, the fan pitch command can be advantageously maintained above 50%. This can permit occupants to feel the air movement in their spaces. This can be accomplished by raising the SAT setpoint so that the VAV boxes open up and allow additional airflow.

(6) The SAT setpoint can be controlled based on the fan pitch command setpoint when the system is in a cooling mode of operation.

(7) An operator can select the desired fan pitch command setpoint for each individual AHU. This setpoint may be referred to as "Setpoint B" in some of the following sequences.

(8) The system can desirably maintain the fan pitch command in a range near the fan pitch command setpoint by changing the SAT setpoint on each AHU.

(9) If the operator wishes a lower supply air temperature, he or she can lower the fan pitch command setpoint. If he or she determines that he or she can get by with a higher SAT, the fan pitch command setpoint can be increased.

(10) In some implementations, if the operator feels that the system needs to respond faster, a multiplier point can be adjusted. The initial setpoint for such a multiplier is 1. However, it can be increased as high as 2. In one implementation, a value of 2 indicates that the system will respond twice as fast as a system with a value of 1 for this point.

(11) Likewise, the response time can also be slowed down by inserting a value as low as 0.5. In one implementation, this will reduce the response amount by 50%.

(a) Thus, command limits of 2 to 0.5 on this "response" variable can be installed.

(12) The temperature control loops described herein (e.g., Fan Pitch Command % based) can be disabled when an AHU is in a warmup mode of operation or an AHU is in a return air temperature lockout mode. In some implementations, such logic may only be applied once a unit is out of the warmup mode or return air lockout mode of operation.

ii) Fan Pitch Command % Based Control Loop (1) After the initial 30 minute morning startup timer for the temperature control loop has elapsed, the air temperature setpoint can be controlled to reduce the energy waste of the HVAC systems, while simultaneously minimizing the amount of heat required and promoting adequate airflow to maintain tenant comfort.

(2) The supply air temperature setpoint can be reset based on the Fan Pitch Command % of the supply fans at each AHU.

(3) In one implementation, Setpoint B can be the low end target for the Fan Pitch Command signal. It is expected to be in the 55% to 70% range.

(a) In some implementations, the reset range can be limited to 45% to 79% to prevent the operators and others from mistakenly selecting settings that drive the system outside a desired operational range.

(4) The setpoints disclosed herein can be proportionally changed based on the actual number of floors that are in operation.

(a) For example, if a reset command is intended to be triggered when the fan pitch command is "above Setpoint B minus 5%," but only 50% of the floors are enabled, the actual command that would be implemented is "above Setpoint B minus 2.5%".

(5) Fan Pitch Command % Based Reset (a) If the Fan Pitch Command % of the fan is increasing:

(i) The instantaneous Fan Pitch Command % of the fan systems can be compared to the 6-minute average Fan Pitch Command % of the fan systems taking samples at the rate of every 36 seconds. In some implementations, if the Fan Pitch Command % has increased, the following sequences can be performed. If the Fan Pitch Command % has not increased, such sequences can be ignored.

1. In one implementation, if the Fan Pitch Command % of the fan system is above Setpoint B minus 5%, the leaving air temperature setpoint can be decreased at the rate of 0.017° F. per minute.

2. In one implementation, if the Fan Pitch Command % of the fan system is above Setpoint B, the leaving air temperature setpoint can be decreased at the rate of 0.022° F. per minute.

3. In one implementation, if the Fan Pitch Command % of the fan system is above Setpoint B plus 6%, the leaving air temperature setpoint can be decreased at the rate of 0.041° F. per minute.

4. This value can be multiplied by the "Fan Pitch Command % of the fan is increasing" Output a. The value that results from the "Fan Pitch Command % of the fan is increasing" calculation can be multiplied to change the responsiveness of the static pressure setpoint reset.

b. In one implementation, the initial value for each AHU is 1.

c. However, values as high as 2 (e.g., respond twice as fast) and as low as 0.5 (e.g., respond half as fast) can be available for the operators to adjust.

d. The maximum and minimum values for this setpoint can be optionally limited to 2 and 0.5.

(6) The setpoints used herein can be proportionally changed based on the actual number of floors that are in operation.

(a) For example, if a reset command is intended to occur when the fan pitch command is "below Setpoint B plus 10%," but only 25% of the floors are enabled, the actual command that would be implemented is "below Setpoint B+2.5%".

(b) If the Fan Pitch Command % of the fan is decreasing:

(i) In some implementations, the instantaneous Fan Pitch Command % of the fan systems can be compared to the 6-minute average Fan Pitch Command % of the fan systems taking samples at the rate of every 36 seconds. If the Fan Pitch Command % has decreased, the following sequences can be performed. However, if the Fan Pitch Command % has not decreased, such sequences can be ignored.

1. In one implementation, if the Fan Pitch Command % of the fan system is below Setpoint B+25%, the leaving air temperature setpoint is increased at the rate of 0.011° F. per minute.

2. In one implementation, if the Fan Pitch Command % of the fan system is below Setpoint B+10%, the leaving air temperature setpoint is increased at the rate of 0.023° F. per minute.

3. In one implementation, if the Fan Pitch Command % of the fan system is below Setpoint B, the leaving air temperature setpoint is increased at the rate of 0.027° F. per minute.

4. This value can then be multiplied by the "Fan Pitch Command % of the fan is decreasing" Output a. The value that results from the "Fan Pitch Command % of the fan is decreasing" calculation can be multiplied to change the responsiveness of the static pressure setpoint reset.

b. In some implementations, the initial value for each AHU is 1.

c. However, values as high as 2 (e.g., respond twice as fast) and as low as 0.5 (e.g., respond half as fast) can be available for the operators to adjust.

d. In some implementations, the maximum and minimum values for this setpoint can be limited to 2 and 0.5.

(c) If the Fan Pitch Command % of the fan is too high or too low:

(i) In some implementations, regardless of whether or not the Fan Pitch Command % of the fan system is increasing or decreasing, if the Fan Pitch Command % is above Setpoint B+18%, the leaving air temperature setpoint can be decreased at the rate of 0.052° F. per minute.

(ii) In some implementations, regardless of whether or not the Fan Pitch Command % of the fan system is increasing or decreasing, if the Fan Pitch Command % is above Setpoint B+24%, the leaving air temperature setpoint can be decreased at the rate of 0.078° F. per minute.

(iii) In some implementations, regardless of whether or not the Fan Pitch Command % of the fan systems is increasing or decreasing, if the Fan Pitch Command % of the fan system is below Setpoint B−10%, the leaving air temperature setpoint can be increased at the rate of 0.033° F. per minute.

(iv) In some implementations, regardless of whether or not the Fan Pitch Command % of the fan systems is increasing or decreasing, if the Fan Pitch Command % of the fan system is below Setpoint B−28%, the leaving air temperature setpoint can be increased at the rate of 0.112° F. per minute.

(d) The Fan Pitch Command %-Based Reset Values can be added:

(i) In some implementations, the values from the "Fan Pitch Command % Increasing," "Fan Pitch Command % Decreasing" and "Fan Pitch Command % Too High/Too Low" reset routines can be advantageously added and used as an input into the AHU supply air temperature setpoint control output.

(v) AHU Temperature Setpoint at Startup (i) In some implementations, two potential supply air temperature setpoints can be used during the startup of the AHU. One setpoint can be in control if the AHU is coming out of a warmup or RAT lockout cycle, and the other setpoint can be in control if the AHU is not coming out of a warmup or RAT lockout cycle.

(1) Startup Setpoint After Warmup/RAT Lockout Cycle (a) According to one implementation, if the system is coming out of a warmup cycle or return air temperature lockout cycle, the supply air temperature setpoint can be initially set for 3.17° F. below the return air temperature.

(b) After cooling has been enabled, this setpoint can be locked in for the first 15 minutes of cooling system operation. Then, the Fan Pitch Command % based reset schedule or other reset schedules can take effect.

(2) Startup Setpoint Without Warmup/RAT Lockout Cycle (a) In some implementations, after cooling has been enabled, the SAT setpoint can be proportionally varied for the first 30 minutes of system operation. Then, the Fan Pitch Command % based reset schedule or other reset schedules can take effect, and the proportional reset can be disabled.

(b) The setpoint can be continuously proportionally varied between 72° F. and 53° F. based on the return air conditions being between (Setpoint A−2.12° F.) and (Setpoint A+3.13° F.) until the 30 minute "cooling enabled" timer has elapsed.

(3) Sequences Typical for Both Setpoints (a) In some implementations, the supply fan pitch command Command % based supply air temperature setpoint reset logic may not be enabled unless the cooling system is enabled (e.g., the AHU SAT setpoint may not be reset until the system is out of a warmup cycle and the return air temperature lockout is no longer in effect).

(b) If the AHU is in a warmup mode of operation or return air temperature lockout, the supply air temperature setpoint reset software for the AHUs may not be enabled, and the PID loops shall be zeroed.

(c) The startup setpoint can take effect once cooling has been enabled. If the cooling system is locked out due to return air temperature or some other sequence, the setpoint reset routine may have no effect and the system can be in a return air mode of operation.

(d) The Fan Pitch Command % based reset and other supply air temperature reset strategies can start the prescribed time after cooling has been enabled.

(e) To ensure that large jumps in the SAT setpoint do not occur, it may desirable to ensure that the maximum setpoint rate of change logic incorporated correctly.

(w) Supply Air Temperature Maximum Reset Rate (i) According to one implementation, the maximum rate of increase for the supply air temperature setpoint is 0.210° F. per minute.

(ii) In one implementation, the maximum rate of decrease for the supply air temperature setpoint can be 0.291° F. per minute.

(x) AHU Minimum and Maximum Supply Air Temperature Setpoints (i) In some implementations, when in a cooling mode of operation, the minimum leaving air temperature setpoint is 53° F., while the maximum leaving air temperature setpoint is 77° F., with the following intermediate limits.

(1) Maximum Setpoint: 77° F.

(2) Stage 1 high limit: 70° F.

(a) The setpoint can only go above 70° F. when:

(i) the ambient conditions are below 60° F. for five minutes; OR (ii) if the return air temperature is below (Setpoint A minus 1° F.) for 5 minutes; OR (iii) the system is in a warmup mode or the cooling is locked off.

(3) Stage 2 low limit: 62° F.

(a) In some implementations, the setpoint can only go below 62° F. when:

(i) the return air temperature is above Setpoint A plus 0.5° F. for five minutes; AND (ii) the Fan Pitch Command is greater than 73% for 5 minutes (adjusted for the "floor enabled" count, as appropriate).

(4) Stage 3 low limit: 58° F.

(a) In some implementations, the setpoint can only go below 58° F. when:

(i) the return air temperature is above Setpoint A plus 1.1° F. for five minutes; AND (ii) the Fan Pitch Command % is greater than 82% for 5 minutes (adjusted for the "floor enabled" count, as appropriate).

(5) Stage 4 low limit: 56° F.

(a) In some implementations, the setpoint can only go below 56° F. when:

(i) the ambient temperature is above 82° F. for five minutes; OR (ii) the return air temperature is above Setpoint A plus 1.65° F. for 5 minutes, and the Fan Pitch Command is greater than is greater than 86% for 5 minutes (adjusted for the "floor enabled" count, as appropriate).

(6) Minimum Setpoint: 53° F.

(y) AHU Cooling System Return Air Temperature and Warmup Cycle Lockout (i) In some implementations, it may be desirable to not allow cooling (e.g., economizer operation, chilled water valve operation or SAT reset logic) for the individual AHU until:

(1) the return air temperature has been above 73.12° F. for five minutes, after the fan has been running; OR (2) during a warmup cycle (ii) In some implementations, such lockouts may remain in effect until 11:30 AM each day.

(iii) When cooling to the AHU is locked out, none of the AHU supply air temperature setpoint reset strategies can be enabled, and the SAT setpoint can match (or follow) the SAT temperature leaving the unit to prevent integral windup.

(z) Temperature Control Zone Routines (i) Each Temperature Control Zone (TCZ) can have its own start and stop setpoints, and its own start and stop schedules to reflect the different natures of the various floors and the various exposures.

ii) Each TCZ can have its own optimum start/stop (OSS) routine to reflect the different natures of the various floors and the various exposures.

iii) In some implementations, the TCZs are used in the heating mode and may act as a skin system.

iv) In some implementations, each TCZ may have a return air (RA) sensor located in close proximity to it. Such RA sensors, along with a start stop time schedule, the local thermostat and the like, can facilitate the control of the TCZ.

v) If the OSS routine is calling for the TCZ to run, and the local thermostat control is also calling for the TCZ to run, the control system can be configured to permit the TCZ to run.

vi) If the schedule calls for the TCZ to stop, it can be stopped.

vii) When the TCZ is operational, it can be under local temperature control.

aa) WCAHload Description (1) WCAH Load f ("Worst Case Air Handler—Load") can be an indicator of the cooling load at each of the main AHUs. Essentially, the system examines the blade pitch command % and the return air temperature. In some implementations, a higher blade pitch command and return air temperature can indicate a higher load than would be indicated with a lower blade pitch command % and a lower return air temperature.

(2) The system can obtain information from the AHUs regarding their supply air temperature setpoints, the return air temperatures, the fan blade pitch command % (accounting for the number of floors enabled), "Setpoint A" information, WCAH information and/or the like.

(3) A variable can be developed that provides an indicator of load at each fan system. In some implementations, such a variable can be based on extent above the Setpoint A that each AHU is operating and the fan blade pitch command % (e.g., Setpoint B) as follows:

(a) A proportional table can be developed for the Setpoint A offset value: In one implementation, as the return air temperature varies between Setpoint A and (Setpoint A plus 2.5° F.), a proportional output signal of 0 to 50 can be provided.

(b) In some implementations, a second proportional table for the fan blade pitch command % can be developed: As the fan blade pitch command % varies between Setpoint B and 90%, a proportional output signal of 0 to 50 can be provided.

(c) These two signals can be added together for a "WCAHload" calculated result.

(d) Example: If Setpoint A is 73.5° F. for a specific AHU and the return air temperature at that AHU is 75° F., the offset would be 2° F., which is 80% of the 0 to 50 range, for a value of 40. If the Setpoint B value is 70%, and the fan blade pitch command % is 80%, it is halfway between the high and low limits for the proportional table. Thus, the resulting output of 25% can be derived from this calculation.

(i) Adding these two values provides a WCAHload value of 65%.

bb) AHU Thermal Flywheel Routines (i) AHU Thermal Flywheel Discussion (1) If the AHU is in a cooling mode of operation, it can be possible to reduce the cooling capacity being delivered to the space being served, depending upon the cooling load of the AHU. The cooling load of the AHU can be estimated based on evaluating the WCAHload values, described earlier. A higher return air temperature and fan pitch command can be taken as a higher load, and a low return air temperature and fan pitch command can be taken as a lower load.

(ii) AHU Thermal Flywheel Definition (1) In some implementations, the AHU Thermal Flywheel comprises limiting the cooling capacity as required to deliver a minimum supply air temperature setpoint of 67.1° F., if the AHU is not equipped with an economizer.

(a) In some implementations, if the AHU is equipped with an economizer and the OSA temperature is less than 65° F., the chilled water valve can be shut. Further, the economizer can be used to satisfy the "normal" supply air temperature setpoint.

(b) In some implementations, if the AHU is equipped with an economizer and the OSA temperature is greater than 65° F., the economizer and the chilled water valve can be used to satisfy the supply air temperature setpoint described in these sequences.

(c) In such a mode, the supply air temperature setpoint can be proportionally reset based on the cooling load on the specific AHU that is being evaluated. AHUs with higher cooling loads as indicated by higher WCAHload values can be provided with slightly cooler air than AHUs with lesser WCAHload values.

(d) As the cooling load on the AHU increases or decreases during the Thermal Flywheel routine, the supply air temperature setpoint can be allowed to follow the load (within set limits for this mode), proportionally decreasing the SAT setpoint as the cooling load increases (WCAHload increases) and proportionally increasing the SAT setpoint as the cooling load decreases (WCAHload decreases).

(e) In some implementations, this can help reduce the cooling capacity required by the AHU, and may temper the air without major noticeable impacts to a facility's occupants. The cooling capacity (e.g., chilled water valve position) can be permitted to modulate as the control logic deems necessary to maintain its setpoint.

(iii) Thermal Flywheel Description (a) In some implementations, the Thermal Flywheel time can be based on the scheduled shutdown time of the affected AHU. The actual Thermal Flywheel time for the specific AHU can be proportionately reset based on the WCAHload value from that individual AHU.

(b) In one implementation, if the WCAHload value from the AHU is between 0 and 100, the AHU Thermal Flywheel can be permitted to occur between 84 minutes to 47 minutes before the scheduled shutdown time for that specific AHU.

(c) In one implementation, the supply air temperature setpoint is proportionally reset between the minimum SAT setpoint and 73.2° F., based on return air temperatures of (Setpoint A+1.13° F.) and (Setpoint A−2.14° F.).

(d) In some implementations, in order to prevent the fan kW from escalating due to warmer supply air temperatures, the maximum Fan Pitch Command % of the AHU can be fixed at 87% of the average Fan Pitch Command % the AHU ran during the most recent 6 minute average prior to receiving the Thermal Flywheel command. Otherwise, the pitch/volume of the fans can be controlled per the standard AHU control sequences of operation.

(i) This portion of the sequences may also take effect when the chiller plant coastdown routine has been enabled.

(ii) The chiller plant coasting cycle can be utilized to take advantage of the chilled water that remains in the loop after the chillers are shut down. In some implementations, the signal is either 1 or 0 and is sent according to some predestinated time frequency (e.g., 10 minutes, etc.)

(e) When a floor or floors are disabled, the maximum fan pitch command % can be proportionally decreased to reflect the reduced amount of area to be air conditioned.

(f) If the cooling load increases and cooling is required, the control system can be configured to refer to the AHU Thermal Flywheel Restart logic described herein for directions on how to re-enable cooling for the AHU.

(iv) AHU Thermal Flywheel Restart (1) If the following conditions are met, the AHU cooling system can be restarted:

(a) In some implementations, if the AHU Return Air Temperature reaches the maximum shutdown temperature described above plus an offset of 1.21° F., cooling to the AHU can be restarted. This may take affect if there is longer than 41 minutes left prior to scheduled AHU shutdown.

(2) AHU Thermal Flywheel Restart Setpoints (a) In some implementations, the control loop can be enabled with a SAT setpoint of 60° F. to 70° F. based on the average RAT temperature being between 77° F. to 73° F. when the system is not in a warmup mode of operation. If the system is in a warmup mode of operation, the morning startup demand limitation routine can be ignored.

(1) Demand limit sequences with individual setpoints can be developed for the supply fan system.

|  | AHU Number | | | | | | | | | |
|---|---|---|---|---|---|---|---|---|---|---|
|  | 4:00 AM to 4:30 AM | 4:30 AM to 5:00 AM | 5:00 AM to 5:30 AM | 5:30 AM to 6:00 AM | 6:00 AM to 6:30 AM | 6:30 AM to 7:00 AM | 7:00 AM to 7:30 AM | 7:30 AM to 8:00 AM | 8:00 AM to 8:30 AM | 8:30 AM to 9:00 AM |
| AH ZZ | a % pitch cmnd | b % pitch cmnd | c % pitch cmnd | d % pitch cmnd | e % pitch cmnd | f % pitch cmnd | g % pitch cmnd | h % pitch cmnd | i % pitch cmnd | j % pitch cmnd |

(2) The system can be configured to proportionally change the setpoints used above based on the actual number of floors that are in operation, as described herein.

(a) For example, if a fan pitch command is supposed to be limited to 49%, but only two out of eight floors have been enabled at that time, the 49% limitation can be multiplied by the operational floor ratio of 2/8 for a resultant 12.25% maximum blade pitch command. If the system is operating with a 12.25% limitation due to two floors running and another floor is enabled, the ratio can be changed to 18.375% (49%×3/8=18.375%).

(dd) AHU Demand Limit—Daytime (i) A 30-minute by 30-minute demand limit schedule can be included for each of the AHUs for the entire day. Each AHU can have separate and independent setpoints.

|  | AHU # | | | | | | | | | | | | | | |
|---|---|---|---|---|---|---|---|---|---|---|---|---|---|---|---|
|  | 9 AM to 930 AM | 930 AM to 10 AM | 1030 AM to 11 AM | Each half hour | Typ | Typ | Typ 3:00 to 3:30 | Typ | Typ | Typ | Typ | Typ | 230 AM to 300 AM | 300 am to 330 am | 330 AM to 400 AM |
| AH ZZ | k % pitch cmnd | l % pitch cmnd | m % pitch cmnd | n % pitch cmnd | 0% pitch cmnd | p % pitch cmnd | q % pitch cmnd | r % pitch cmnd | s % pitch cmnd | t % pitch cmnd | u % pitch cmnd | v % pitch cmnd | w % pitch cmnd | x % pitch cmnd | y % pitch cmnd | coming off of a cooling shutdown restart. The AHU can remain with this setpoint for a period of up to 30 minutes, or until the RAT is reduced to the point that it reaches the maximum setpoint used to determine the Thermal Flywheel time, whichever occurs first. After this period, the cooling can be put into the Thermal Flywheel mode again (e.g., setpoint raised to AA° F.) until the Thermal Flywheel restart setpoint is once again attained.

(b) The AHU can remain demand limited the entire time it is operating under the Thermal Flywheel and Thermal Flywheel restart routines. The effects of reduced floor counts can be included as floors are dropped off when performing the demand limitation function.

(c) In one implementation, if the return air temperature does not drop below the Thermal Flywheel restart setpoint, the restart can be maintained enabled until it drops below the setpoint or another mode of operation takes control.

(cc) AHU Demand Limit—Morning Startup (i) A demand limit schedule for each AHUs can be included which will be in effect during the morning startup routine if (1) The system can be configured to proportionally change the setpoints used above based on the actual number of floors that are in operation, as described herein.

(a) For example, if a fan pitch command is supposed to be limited to 64%, but only six out of eight floors have been enabled at that time, the 64% limitation can be multiplied by the operational floor ratio of 6/8 for a resultant 48% maximum blade pitch command. If the system is operating with a 48% limitation due to six floors running and another floor is disabled, the ratio can be changed to 40% (64%×5/8=40%).

(ee) System Demand Limitations (1) In some implementations, a three-stage demand limitation program can be developed that may be manually invoked by an operator to coincide with the three stages of the electrical system infrastructure electrical demand alerts.

(2) Stage 1

(a) In some implementations, the AHUs can be limited as follows:

(i) Maximum fan pitch command: 70%;

(ii) Maximum static pressure setpoint: 0.70 in WC;

(iii) Maximum supply air temperature setpoint: 55° F.;
(iv) Boilers can be shut off if they were enabled, and HW pumps can be stopped 15 minutes later.

(3) Stage 2

(a) In some implementations, the AHUs can be limited as follows:
(i) Maximum fan pitch command: 62%;
(ii) Maximum static pressure setpoint: 0.61 in WC;
(iii) Maximum supply air temperature setpoint: 53° F.;
(iv) Boilers can be shut off if they were enabled, and HW pumps can be stopped 15 minutes later.

(4) Stage 3

(a) In some implementations, the AHUs can be limited as follows:
(i) Maximum fan pitch command: 41%;
(ii) Maximum static pressure setpoint: 0.32 in WC;
(iii) Maximum supply air temperature setpoint: 51° F.;
(iv) Boilers can be shut off if they were enabled, and HW pumps can be stopped 15 minutes later.

Although this invention has been disclosed in the context of certain preferred implementations and examples, it will be understood by those skilled in the art that the present invention extends beyond the specifically disclosed implementations to other alternative implementations and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the implementations may be made and still fall within the scope of the invention. Accordingly, it should be understood that various features and aspects of the disclosed implementations can be combined with or substituted for one another in order to form varying modes of the disclosed invention. Thus, it is intended that the scope of the present invention herein disclosed should not be limited by the particular disclosed implementations described above, but should be determined only by a fair reading of the claims that follow.

What is claimed:

1. An air conditioning control system comprising:
a main processor adapted to monitor and manage the operation of a cooling system of a facility according to an optimization routine executed by the main processor based on air conditioning data received through one more connections from a plurality of local field control panels of the cooling system that are distributed about the facility, the main processor being adapted to generate one or more control signals to manage the operation of the cooling system, at least one of the one or more control signals representing one or more operational setpoints of the cooling system, the one or more operational setpoints being determined based on the optimization routine and being selected from the group of operational setpoints that consists of: a chilled water system differential pressure setpoint, a chilled water supply temperature setpoint, a condenser water temperature setpoint, a condenser water flowrate setpoint, a condenser water temperature differential setpoint, a supply air static pressure setpoint, and a supply air temperature setpoint.

2. An air conditioning control system in accordance with claim 1, further comprising a translator system adapted to communicate control information from the main processor in a native computer language of each of the plurality of local field control panels.

3. An air conditioning control system in accordance with claim 1, further comprising an interface unit adapted to provide the air conditioning data to the main processor from the plurality of local field control panels.

4. An air conditioning system in accordance with claim 1, further comprising an operator interface unit for providing a graphical representation of the operation of the cooling system based on signals received from the main processor.

5. A cooling system for a facility, the cooling system comprising:
a control system adapted to evaluate a cooling load value at an air handling unit to calculate at least one operational setpoint for the cooling system based on an optimization routine executed by the control system to improve the energy efficiency of the cooling system, the control system comprising a main processor configured to receive cooling system operational data from at least one local control panel of the cooling system, to calculate the at least one setpoint for the cooling system based on the cooling system operational data and according to the optimization routine, and to transmit an operational instruction to the at least one control panel, the at least one operational setpoint being selected from the group of operational setpoints that consists of: a chilled water system differential pressure setpoint, a chilled water supply temperature setpoint, a condenser water temperature setpoint, a condenser water flowrate setpoint, a condenser water temperature differential setpoint, a supply air static pressure setpoint, and a supply air temperature setpoint.

6. A cooling system in accordance with claim 5, further comprising a translator system adapted to communicate control information from the main processor in a native computer language of each of the at least one local field control panel.

7. A cooling system in accordance with claim 6, further comprising an interface unit adapted to provide air conditioning data to the main processor from the at least one local field control panel.

8. A cooling system in accordance with claim 7, further comprising an operator interface unit for providing a graphical representation of the operation of the cooling system based on signals received from the main processor.

9. A method for controlling a cooling procedure performed at a facility, the method comprising:
receiving, through one more connections, operational data from a plurality of local field control panels distributed about the facility; and
transmitting, to at least one of the plurality of field control panels and/or cooling equipment, an operational instruction to control the cooling equipment based on the operational data;
the operational instruction including an operational setpoint for the cooling equipment, wherein the operational setpoint is selected from the group of operational setpoints that consists of: a chilled water system differential pressure setpoint, a chilled water supply temperature setpoint, a condenser water temperature setpoint, a condenser water flowrate setpoint, a condenser water temperature differential setpoint, a supply air static pressure setpoint, and a supply air temperature setpoint.

10. A method in accordance with claim 9, further comprising executing an optimization routine on the operational data to produce the operational instruction according to the optimization routine.

11. A method in accordance with claim 9, further comprising generating a graphical representation of the operational data obtained from the plurality of local field control panels.

12. A method in accordance with claim 9, further comprising calculating at least one setpoint for the cooling system based on the cooling system operational data.

* * * * *

UNITED STATES PATENT AND TRADEMARK OFFICE
CERTIFICATE OF CORRECTION

| | | |
|---|---|---|
| PATENT NO. | : 7,890,215 B2 | Page 1 of 1 |
| APPLICATION NO. | : 11/959294 | |
| DATED | : February 15, 2011 | |
| INVENTOR(S) | : Scot M. Duncan | |

It is certified that error appears in the above-identified patent and that said Letters Patent is hereby corrected as shown below:

At column 85, line 44, claim 1 should read --based on air conditioning data received through one or more connections--

Signed and Sealed this
Tenth Day of April, 2012

David J. Kappos
*Director of the United States Patent and Trademark Office*